(12) United States Patent
Isobe et al.

(10) Patent No.: US 10,527,642 B2
(45) Date of Patent: Jan. 7, 2020

(54) ACCELERATION SENSOR

(71) Applicant: HITACHI, LTD., Chiyoda-ku, Tokyo (JP)

(72) Inventors: Atsushi Isobe, Tokyo (JP); Noriyuki Sakuma, Tokyo (JP); Chisaki Takubo, Tokyo (JP); Yuudai Kamada, Tokyo (JP); Takashi Shiota, Tokyo (JP)

(73) Assignee: HITACHI, LTD., Tokyo (JP)

( * ) Notice: Subject to any disclaimer, the term of this patent is extended or adjusted under 35 U.S.C. 154(b) by 282 days.

(21) Appl. No.: 15/511,444

(22) PCT Filed: Nov. 11, 2014

(86) PCT No.: PCT/JP2014/079895
§ 371 (c)(1),
(2) Date: Mar. 15, 2017

(87) PCT Pub. No.: WO2016/075761
PCT Pub. Date: May 19, 2016

(65) Prior Publication Data
US 2017/0292970 A1    Oct. 12, 2017

(51) Int. Cl.
*G01P 15/12* (2006.01)
*G01P 15/125* (2006.01)

(52) U.S. Cl.
CPC ............................. *G01P 15/125* (2013.01)

(58) Field of Classification Search
CPC .................................................. G01P 15/125
USPC ......................................................... 73/514.32
See application file for complete search history.

(56) References Cited

U.S. PATENT DOCUMENTS

| 5,719,336 A * | 2/1998 | Ando .................... G01P 15/125 |
| | | 73/514.32 |
| 6,196,067 B1 * | 3/2001 | Martin ................ G01P 15/0802 |
| | | 73/514.32 |
| 6,497,149 B1 | 12/2002 | Moreau et al. |
| 8,508,003 B2 | 8/2013 | Yoshida |
| 2006/0213269 A1 | 9/2006 | Ruohio et al. |
| 2008/0173091 A1 | 7/2008 | McNeil et al. |
| 2011/0192229 A1 | 8/2011 | Chen et al. |

(Continued)

FOREIGN PATENT DOCUMENTS

| JP | 10-22514 A | 1/1998 |
| JP | 2001-272415 A | 10/2001 |
| JP | 2008-513800 A | 5/2008 |

(Continued)

*Primary Examiner* — Tarun Sinha
(74) *Attorney, Agent, or Firm* — Miles & Stockbridge, PC

(57) ABSTRACT

An acceleration sensor (1) includes a fixed portion (33), a movable portion (31) connected to the fixed portion (33), a lower electrode (11) that is disposed to face a lower surface of the movable portion (31), and an upper electrode (21) that is disposed to face an upper surface of the movable portion (31). A distance in an x-axis direction between an end portion (41) of the lower electrode (11) and the fixed portion (33) is shorter than a distance in the x-axis direction between an end portion (51) of the upper electrode (21) and the fixed portion (33). Further, a distance in the x-axis direction between an end portion (42) of the lower electrode (11) and the fixed portion (33) is shorter than a distance in the x-axis direction between an end portion (52) of the upper electrode (21) and the fixed portion (33).

3 Claims, 22 Drawing Sheets

(56) References Cited

U.S. PATENT DOCUMENTS

2013/0042684 A1   2/2013  Yoda
2013/0319117 A1  12/2013  McNeil et al.

FOREIGN PATENT DOCUMENTS

| JP | 2010-517014 A | 5/2010 |
| JP | 2013-040856 A | 2/2013 |
| JP | 2013-519880 A | 5/2013 |
| WO | WO 2010/122953 A1 | 4/2010 |

* cited by examiner

[Fig. 1]
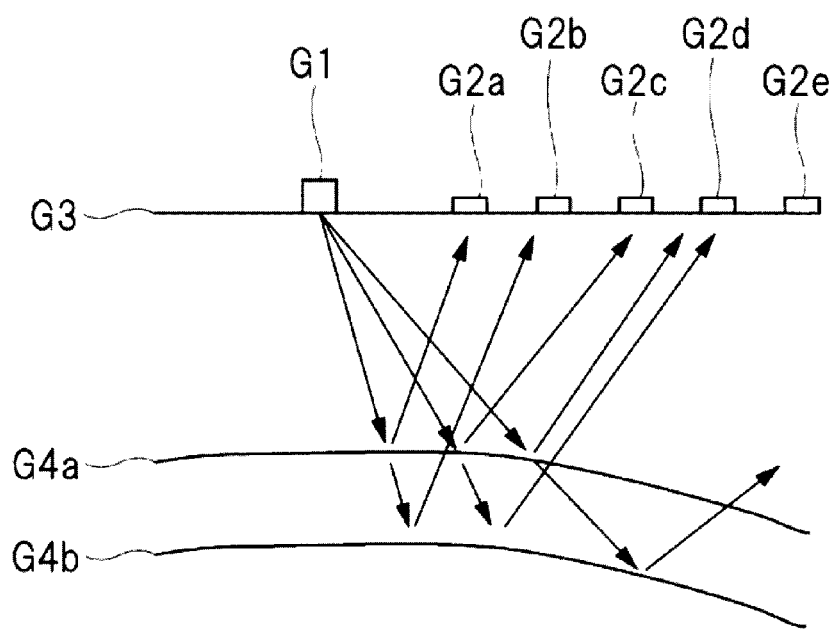

[Fig. 2]
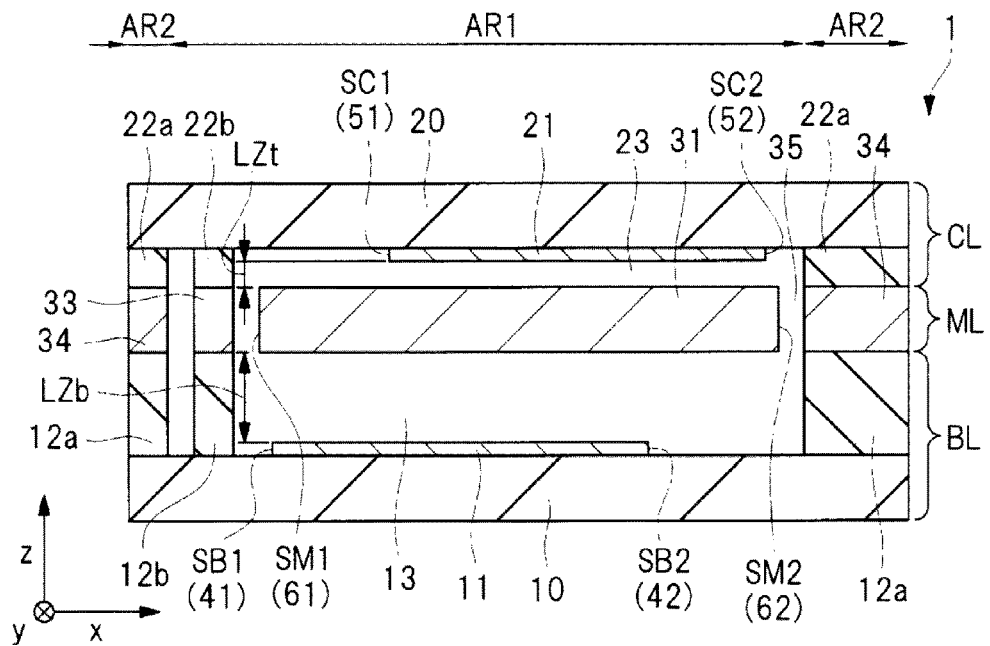
[Fig. 3]
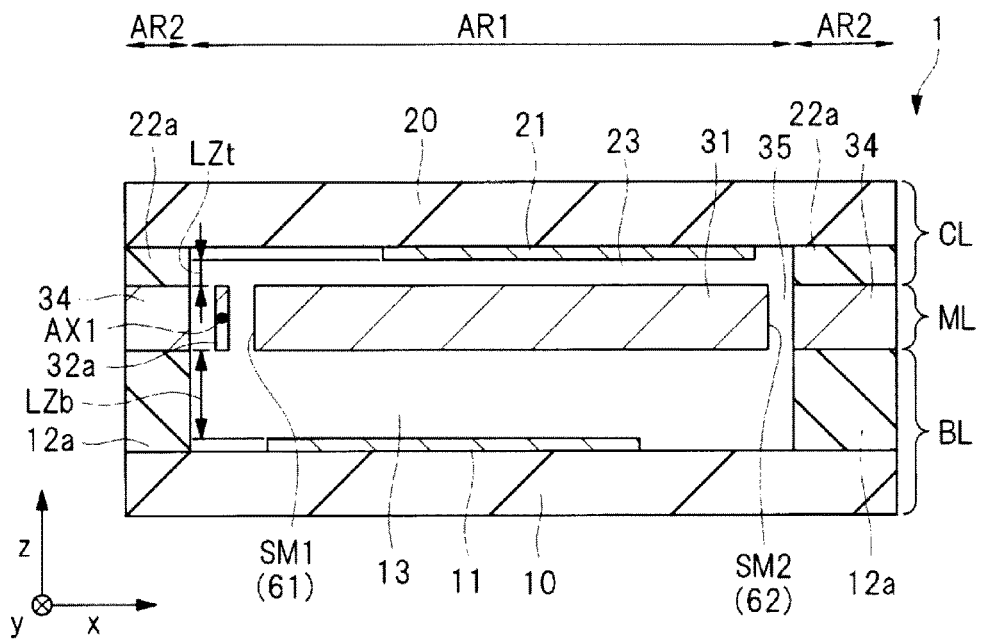

[Fig. 4]
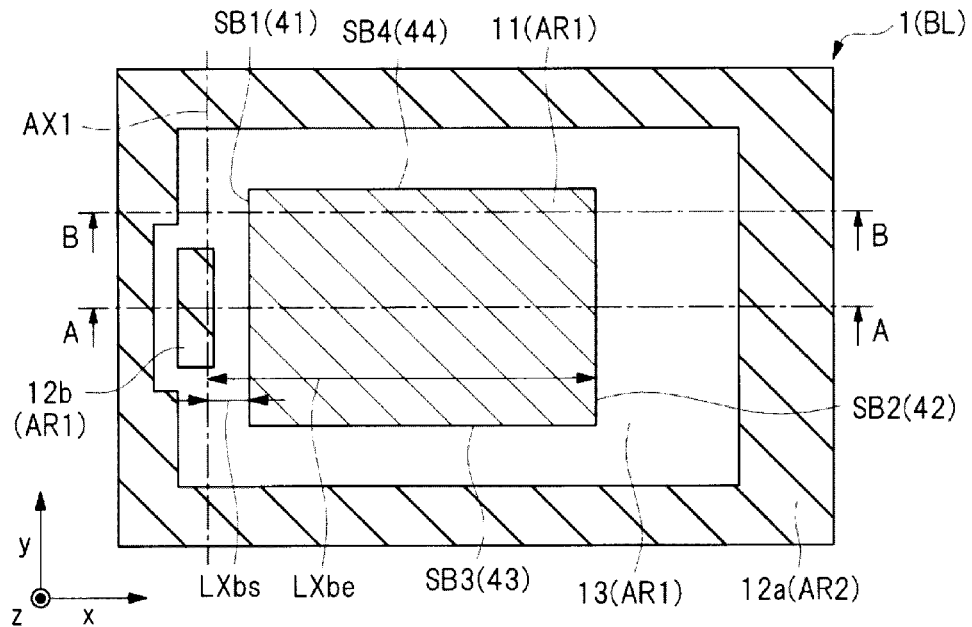
[Fig. 5]
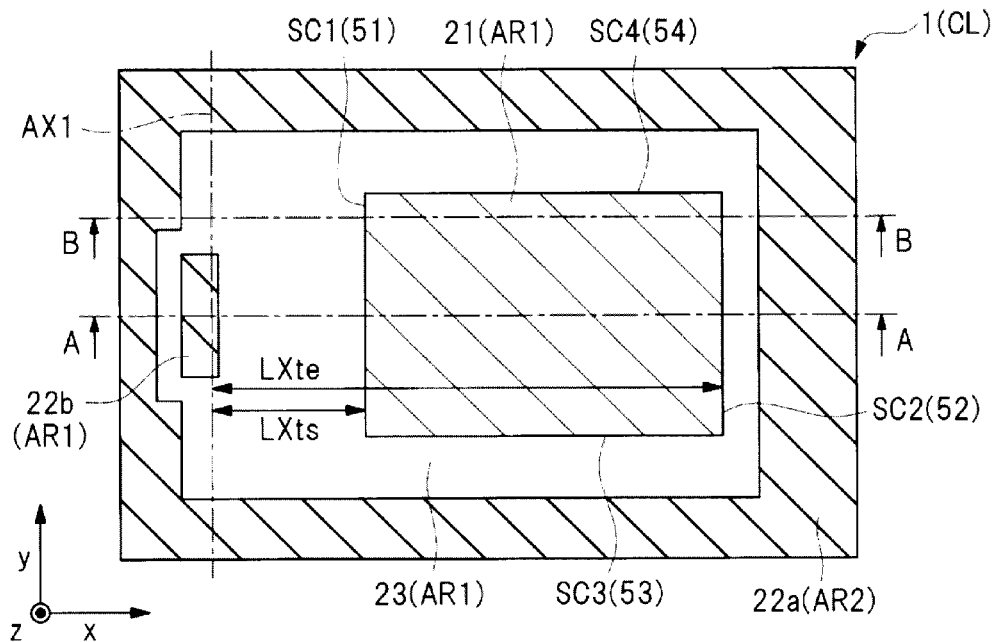

[Fig. 6]
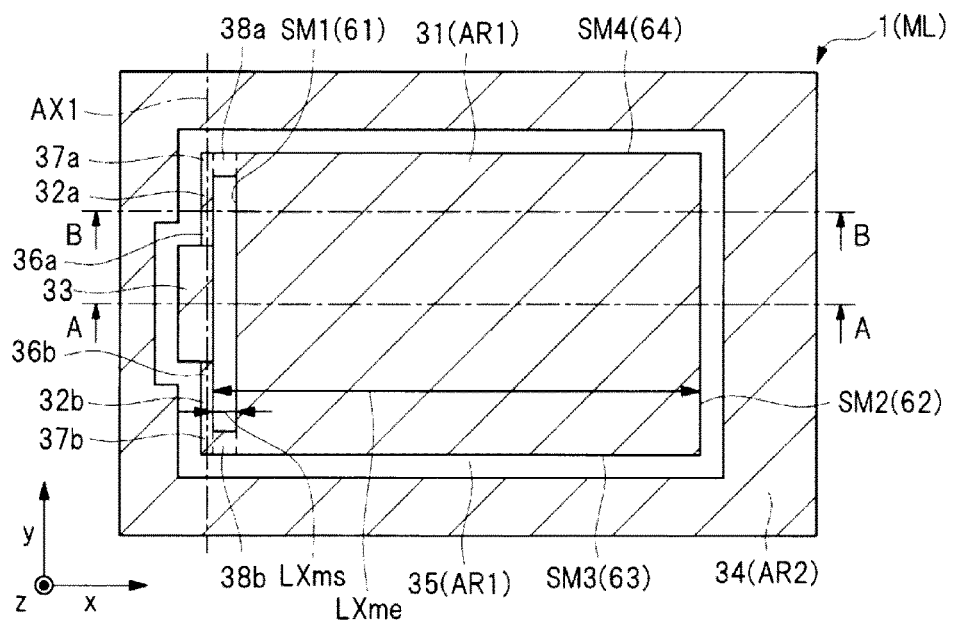
[Fig. 7]
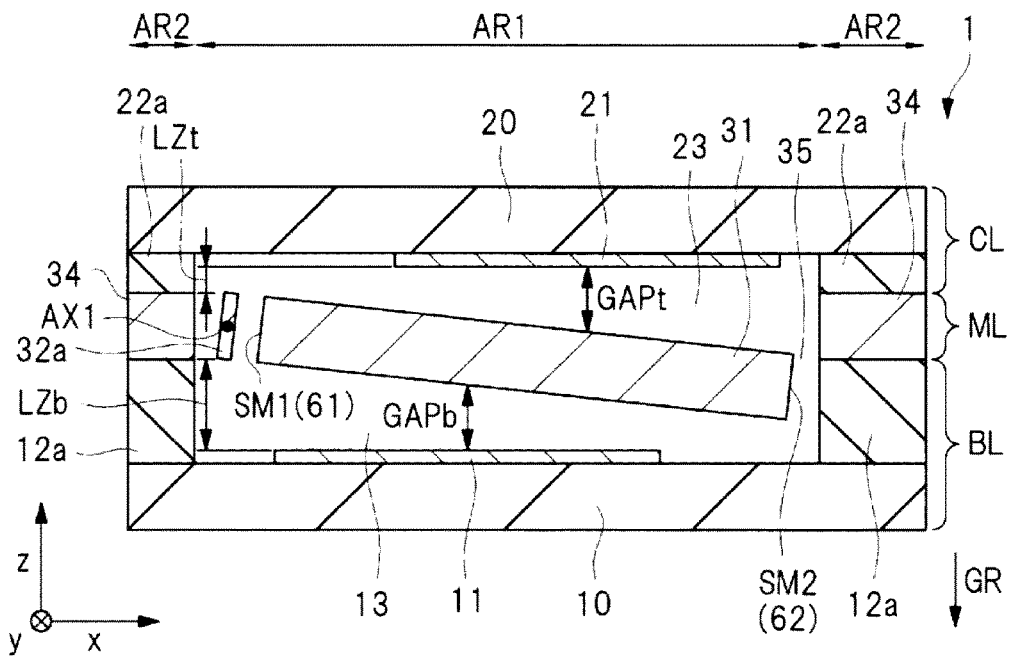

[Fig. 8]
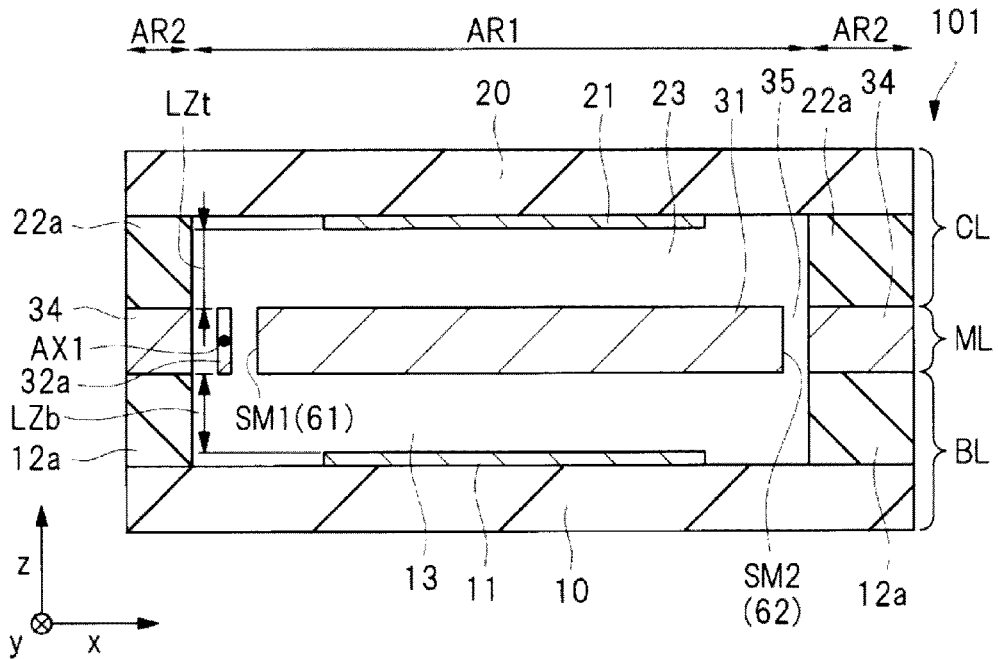
[Fig. 9]
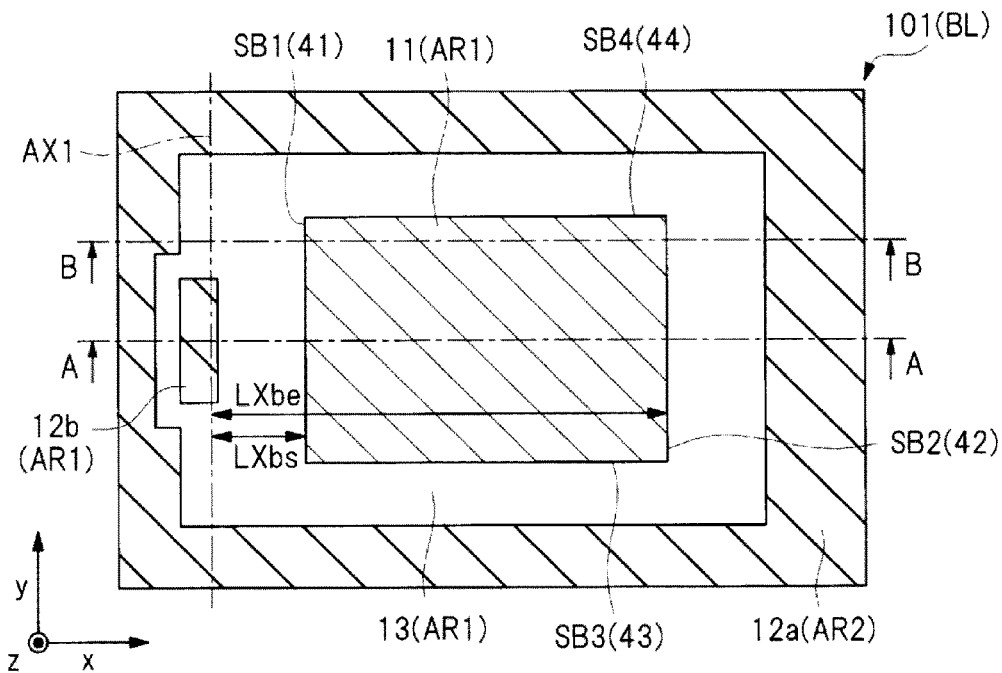

[Fig. 10]
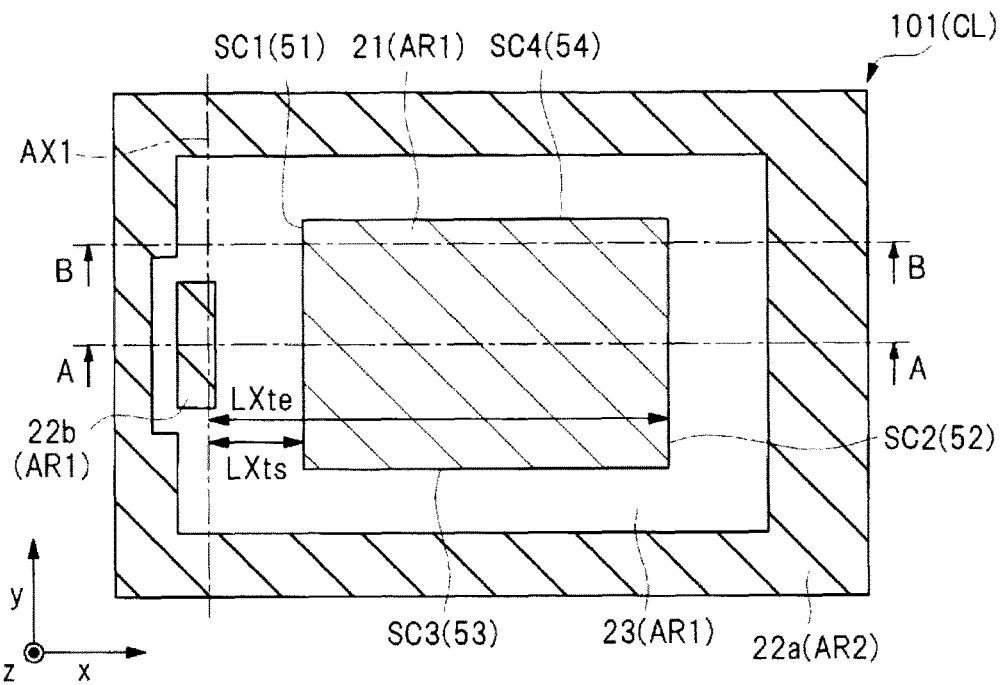
[Fig. 11]
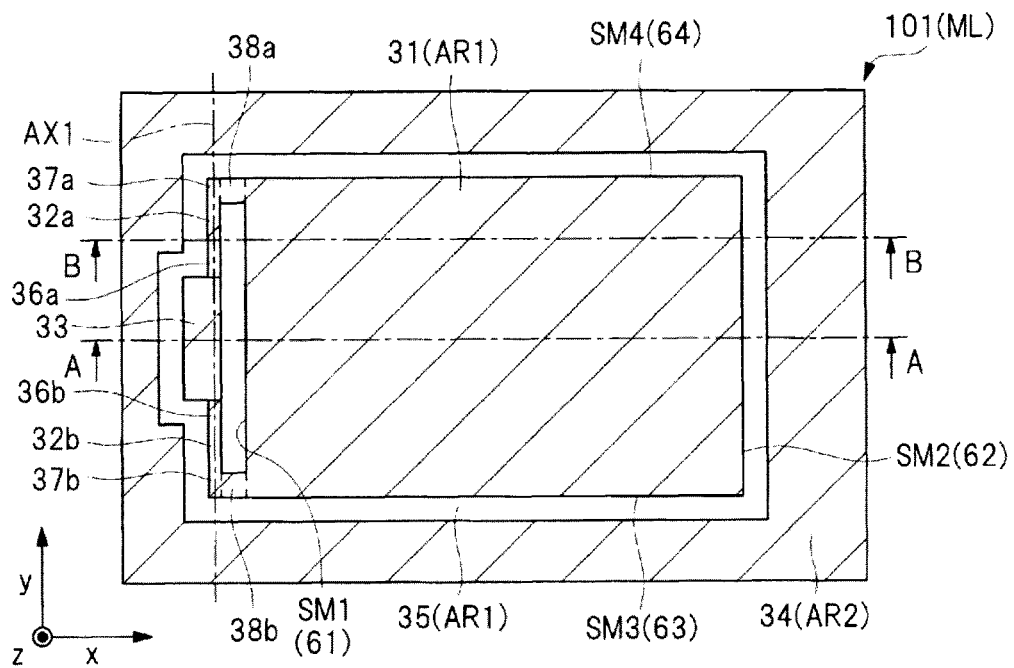

[Fig. 12]
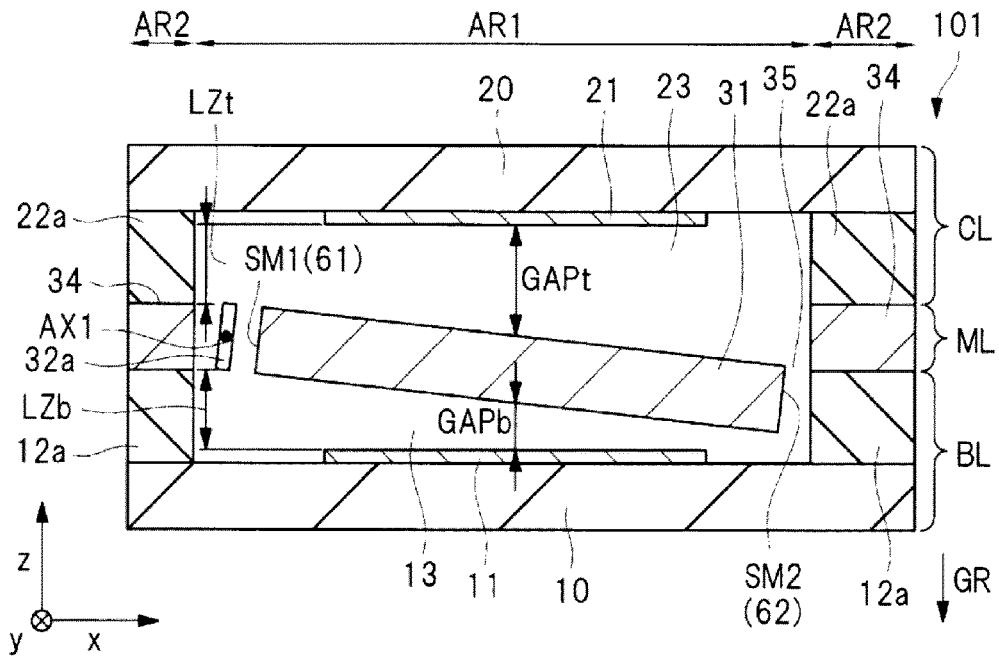
[Fig. 13]
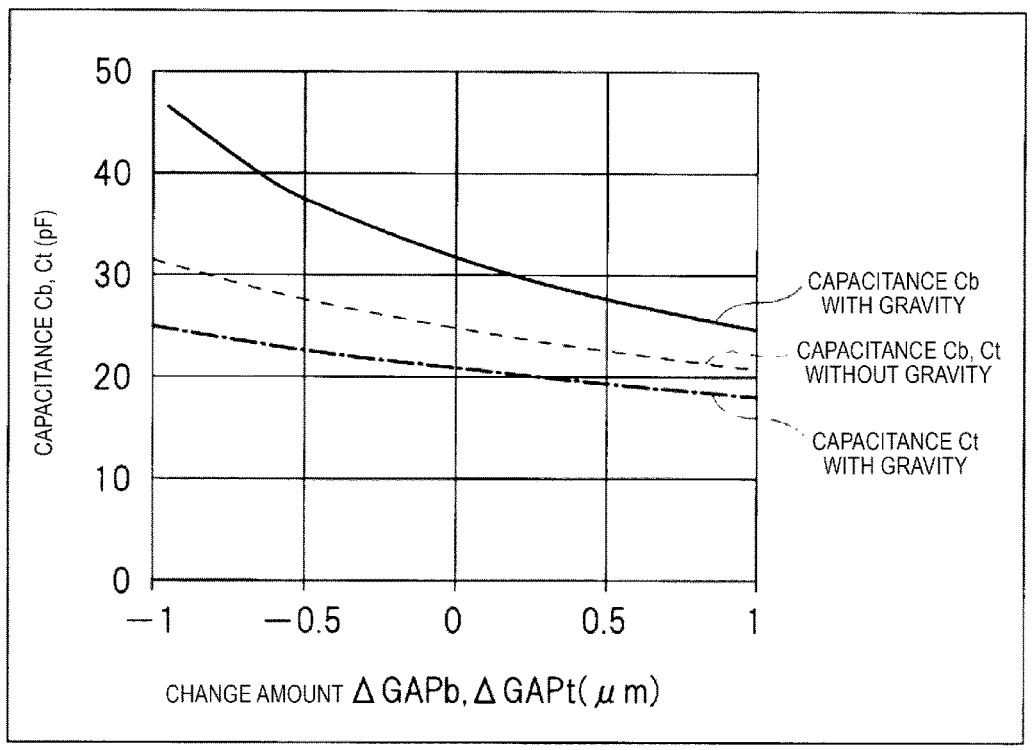

[Fig. 14]
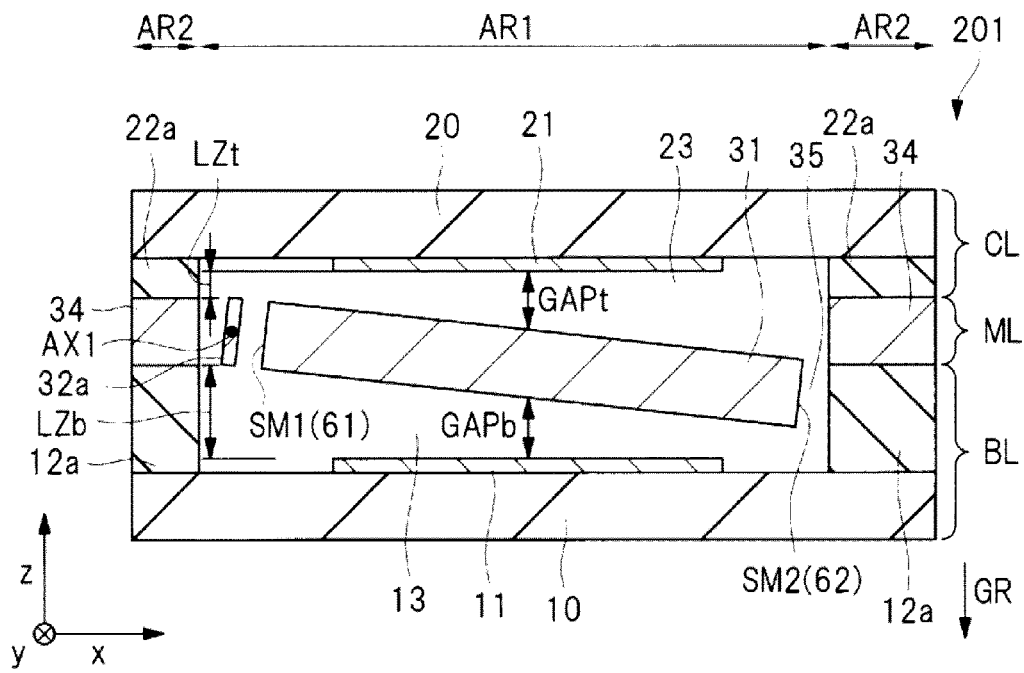
[Fig. 15]
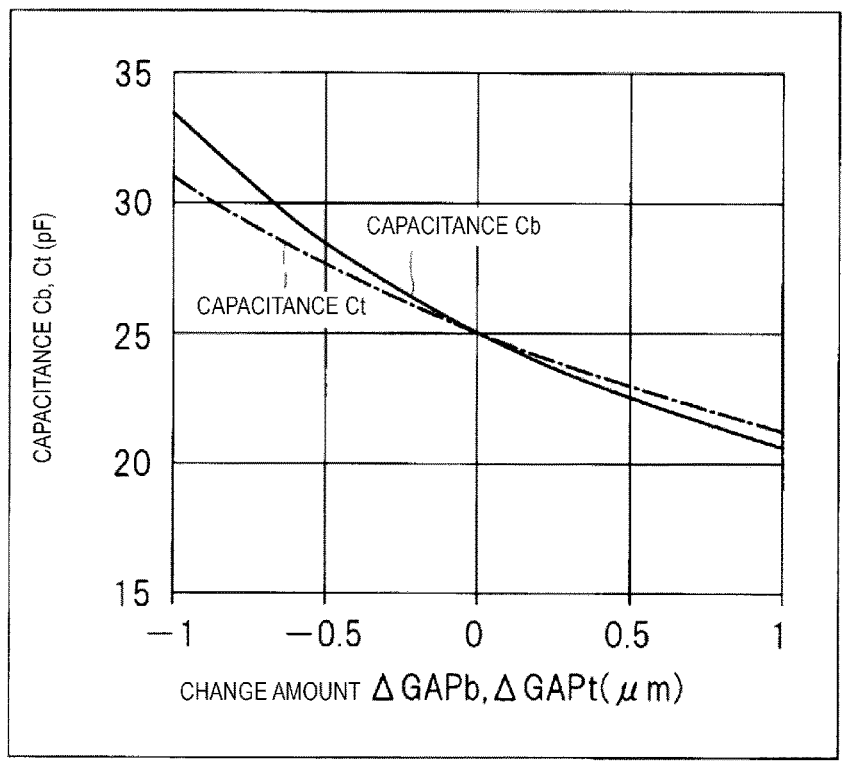

[Fig. 16]
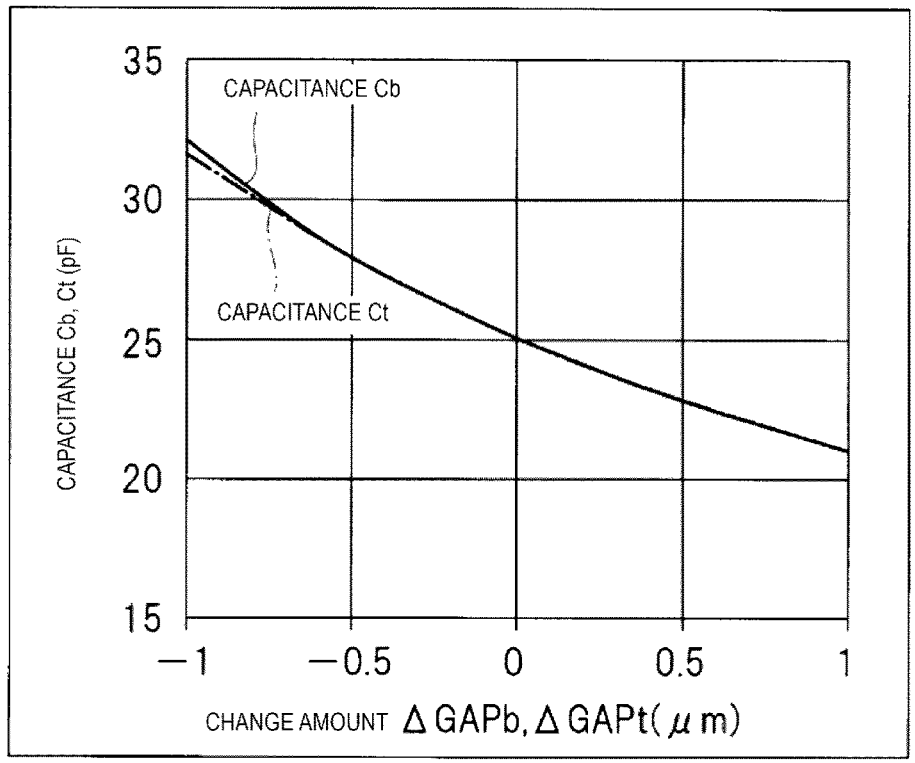
[Fig. 17]
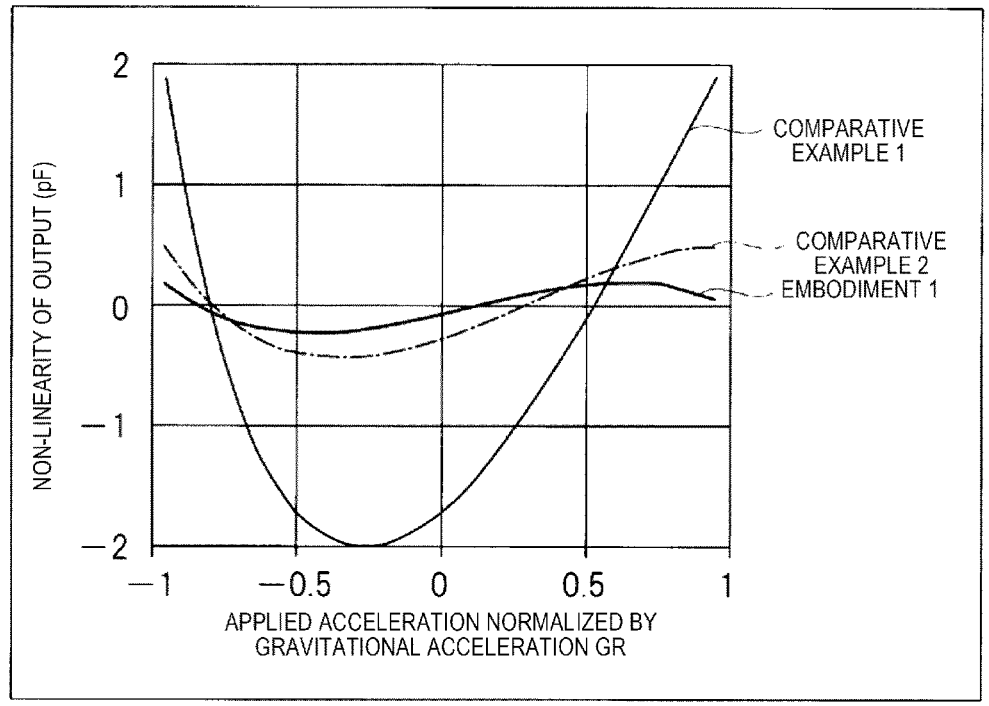

[Fig. 18]
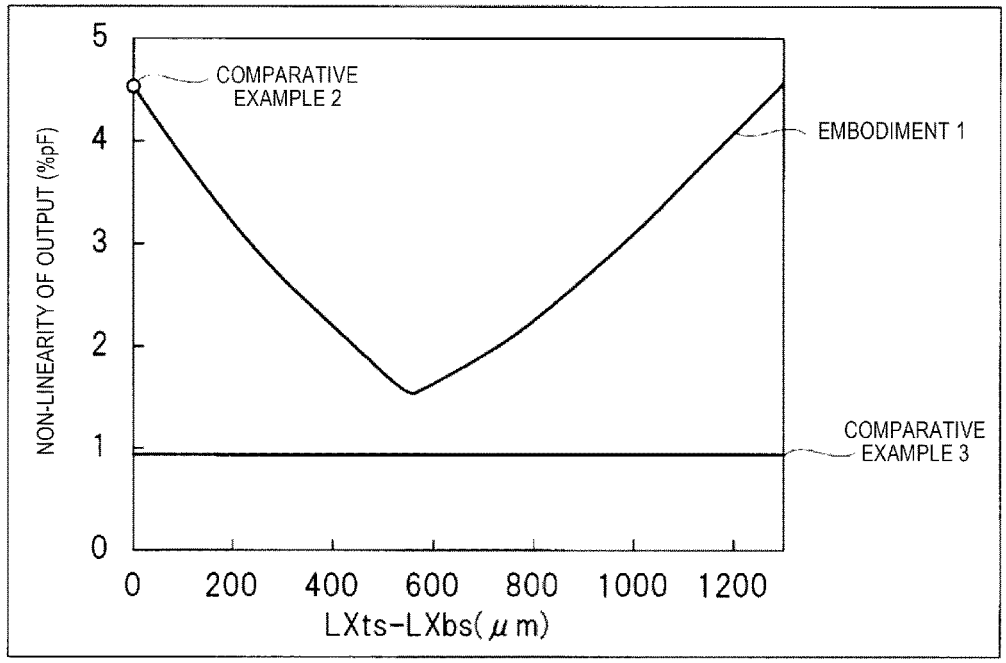
[Fig. 19]
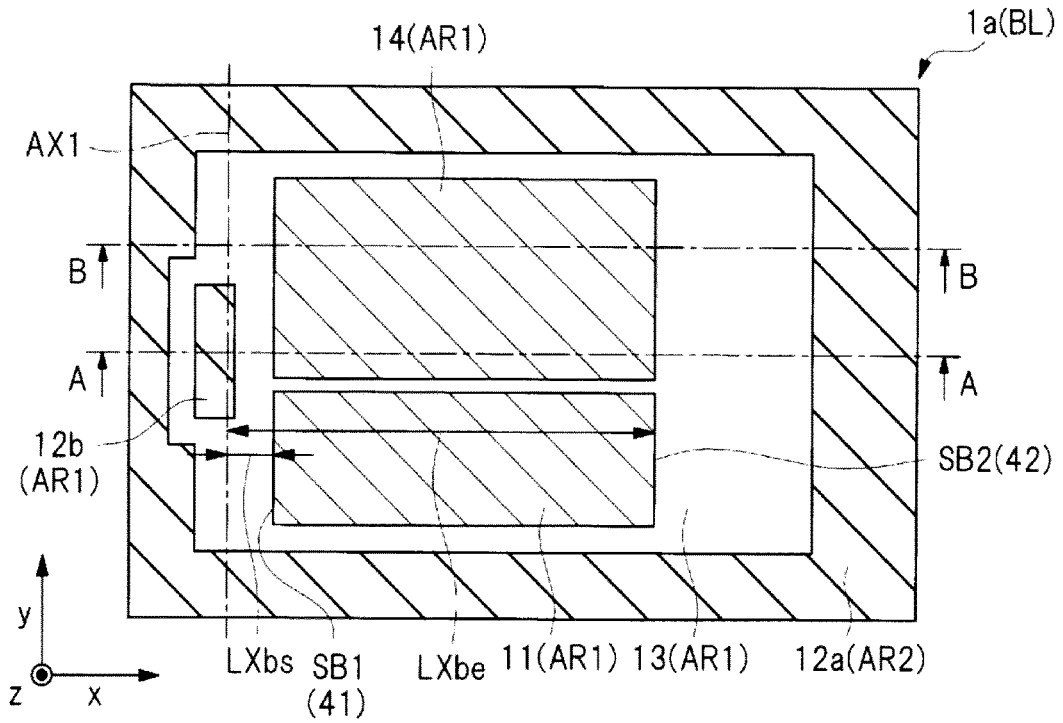

[Fig. 20]
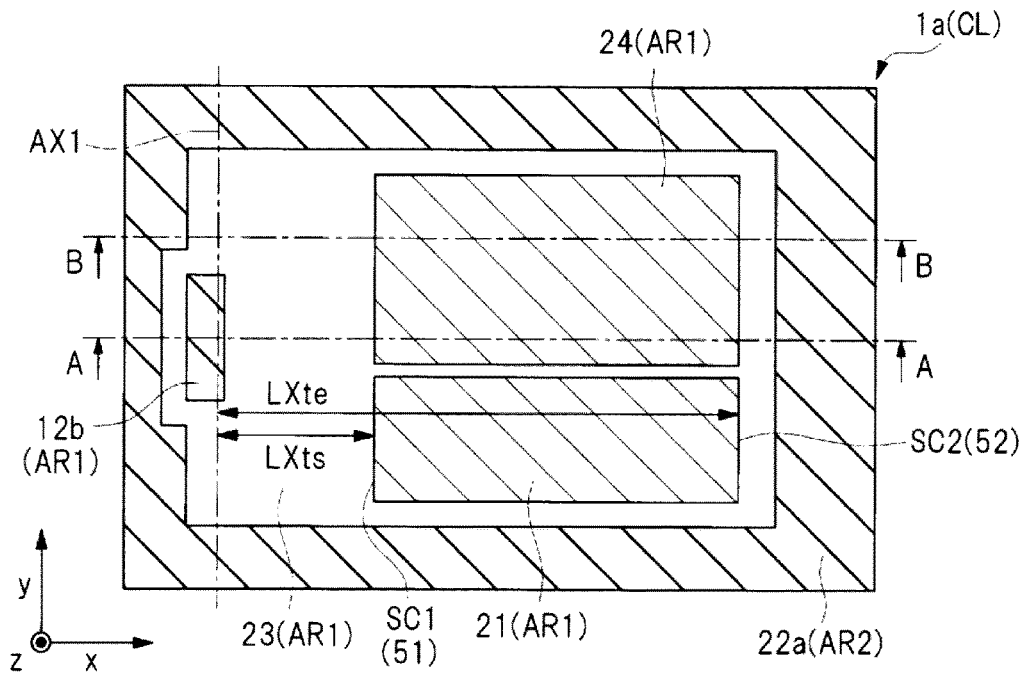
[Fig. 21]
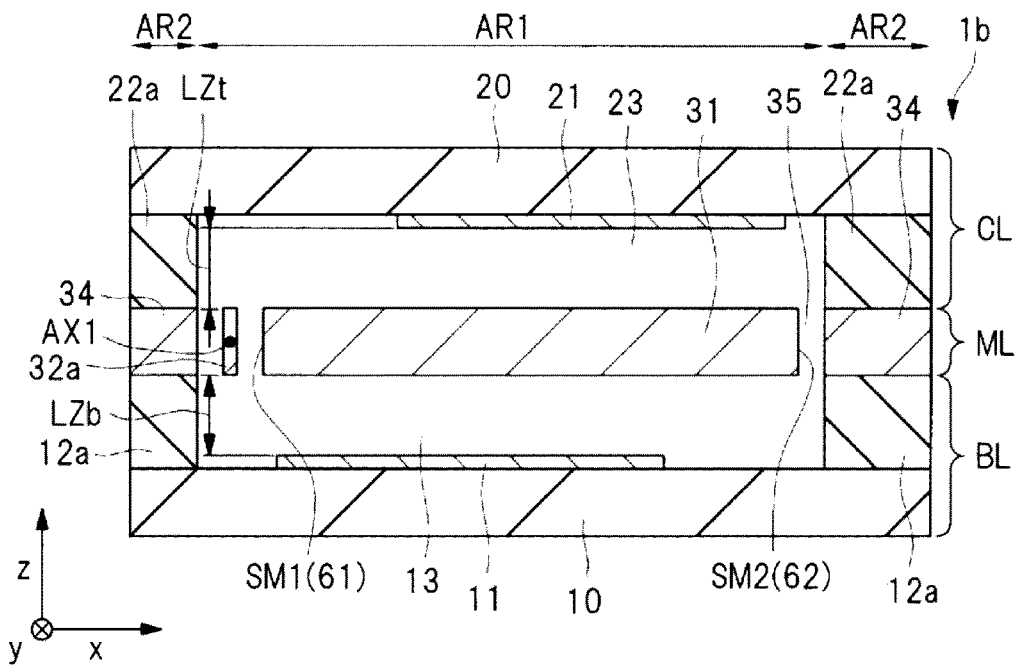

[Fig. 22]
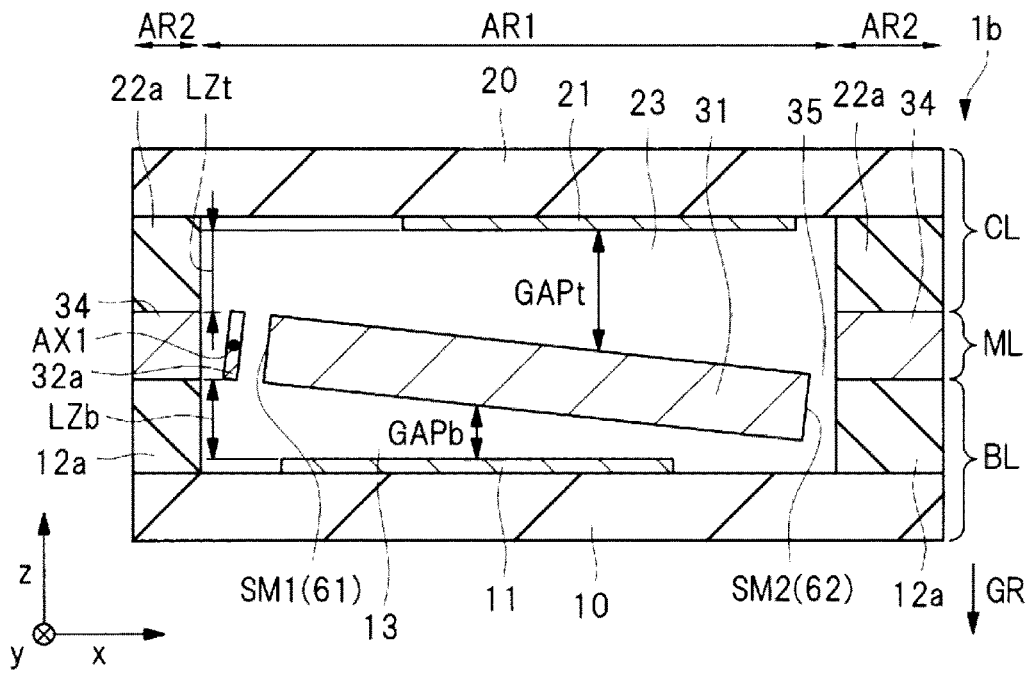
[Fig. 23]
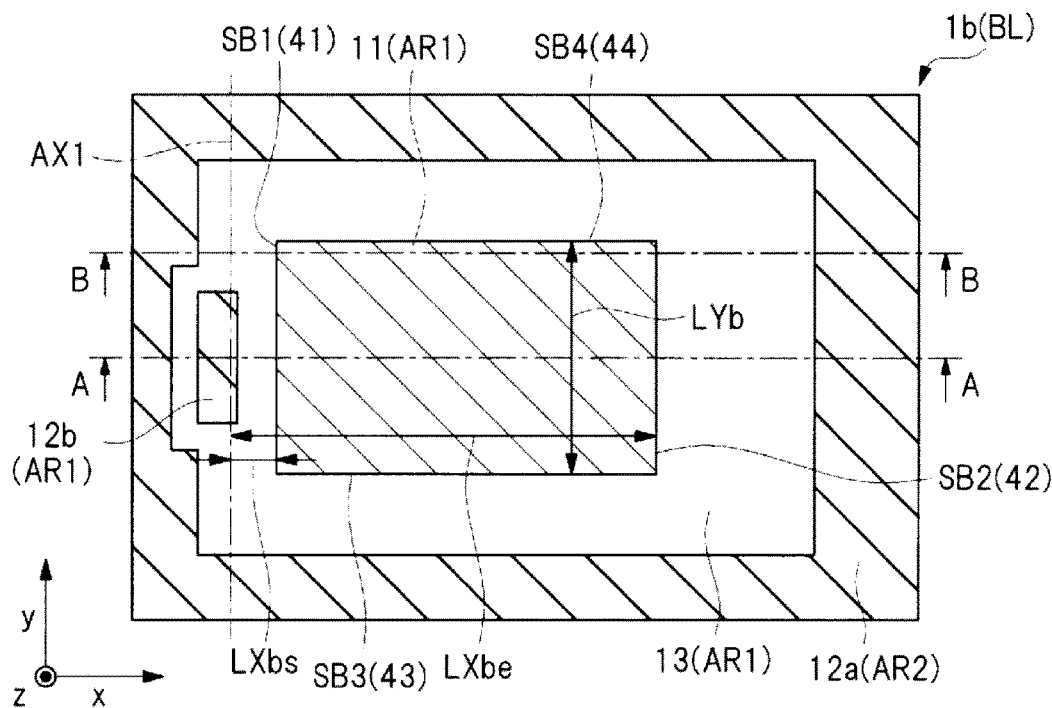

[Fig. 24]
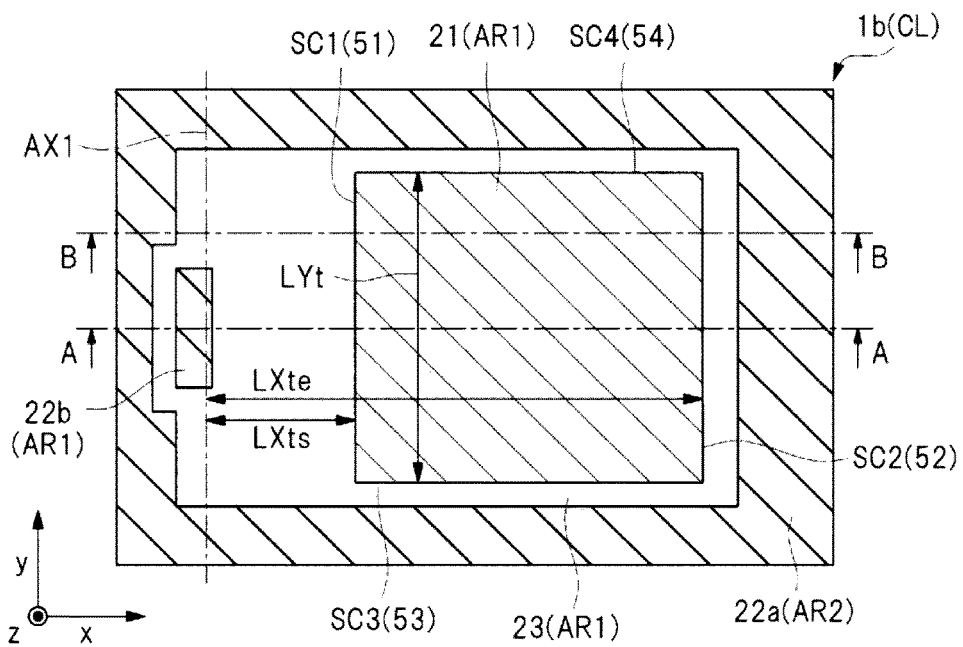
[Fig. 25]
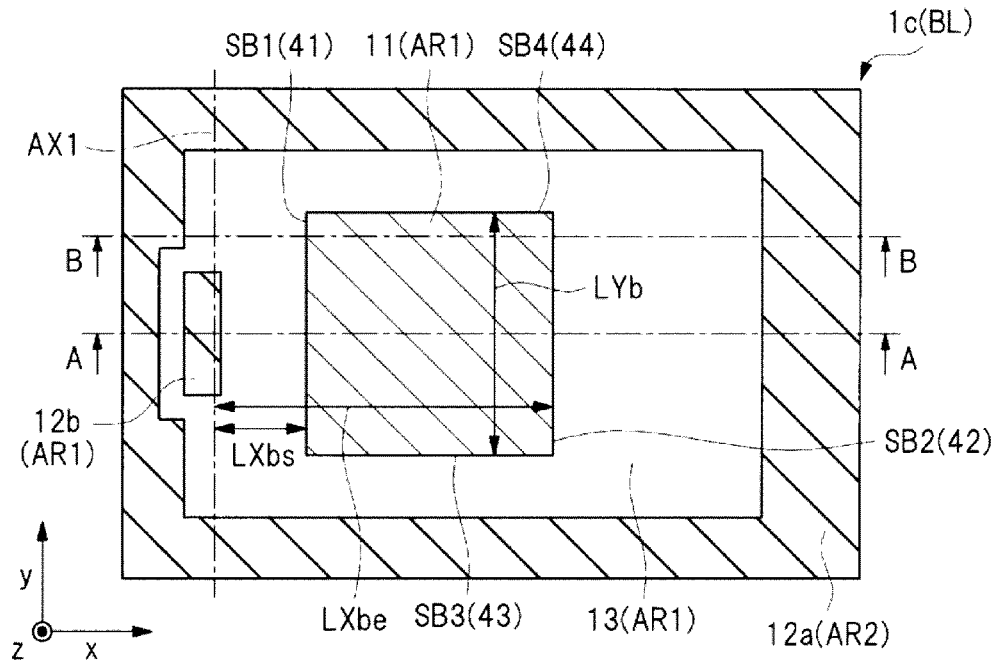

[Fig. 26]
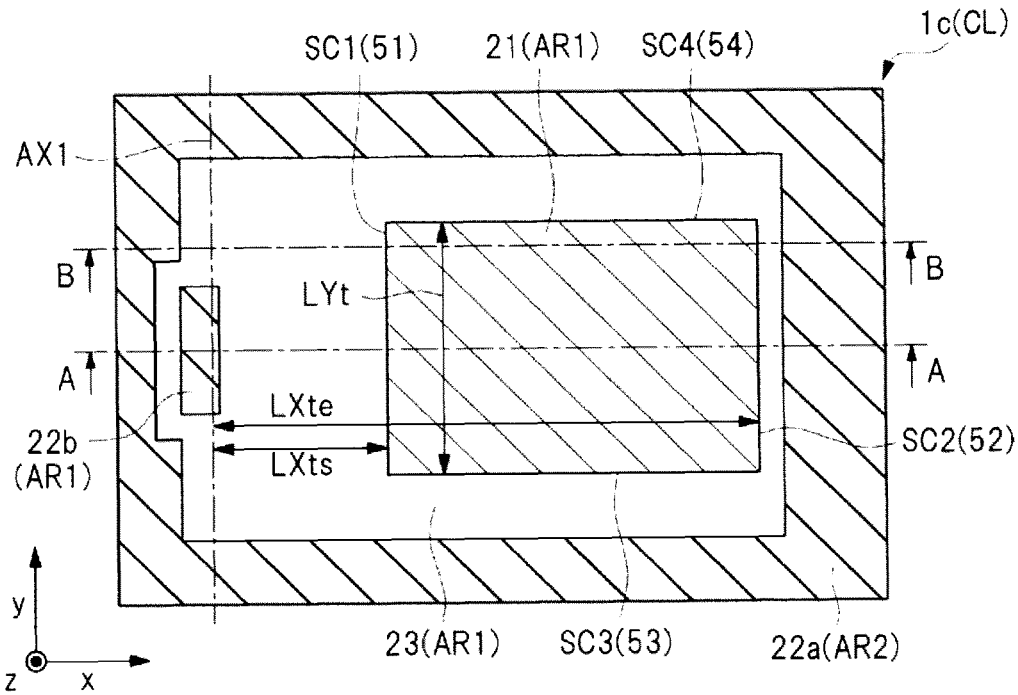
[Fig. 27]
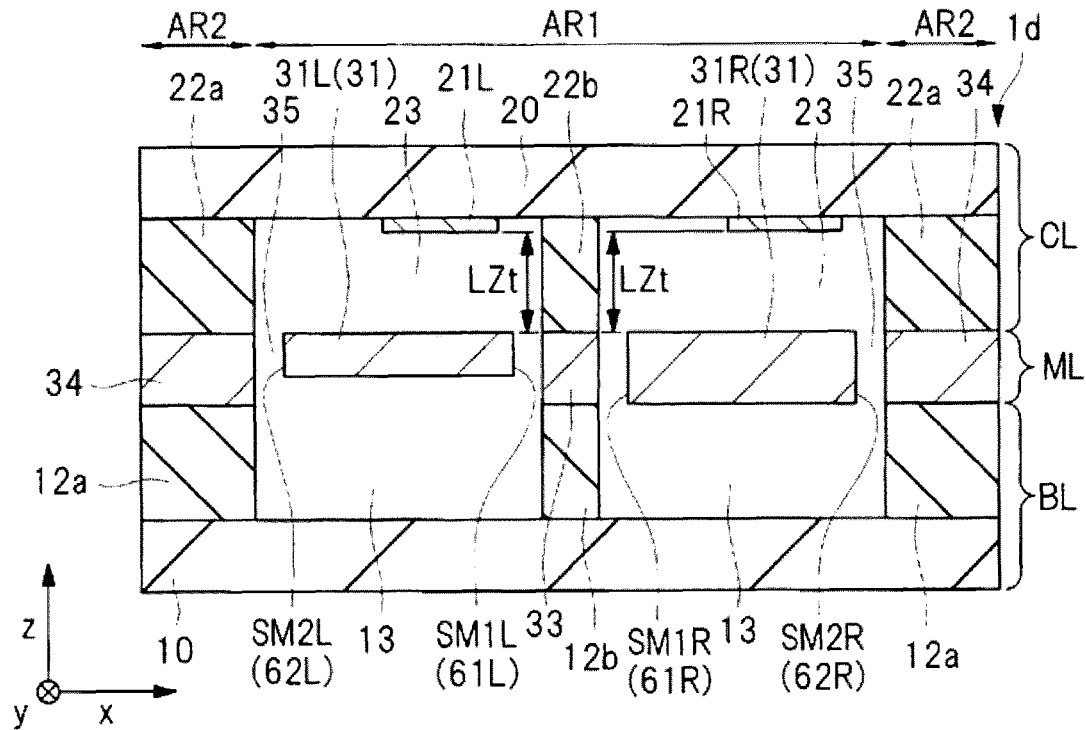

[Fig. 28]
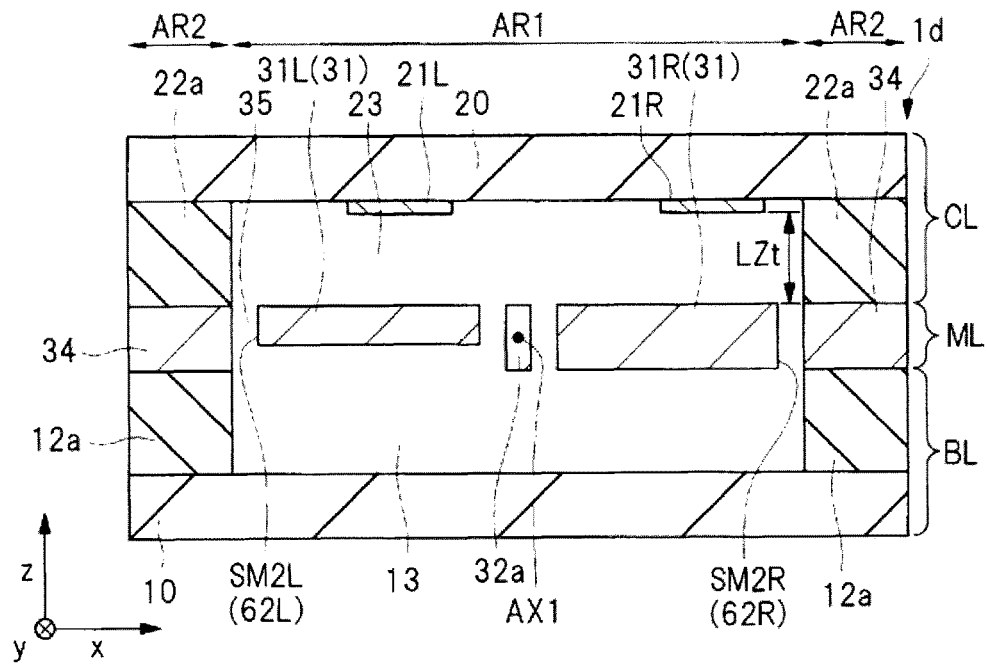
[Fig. 29]
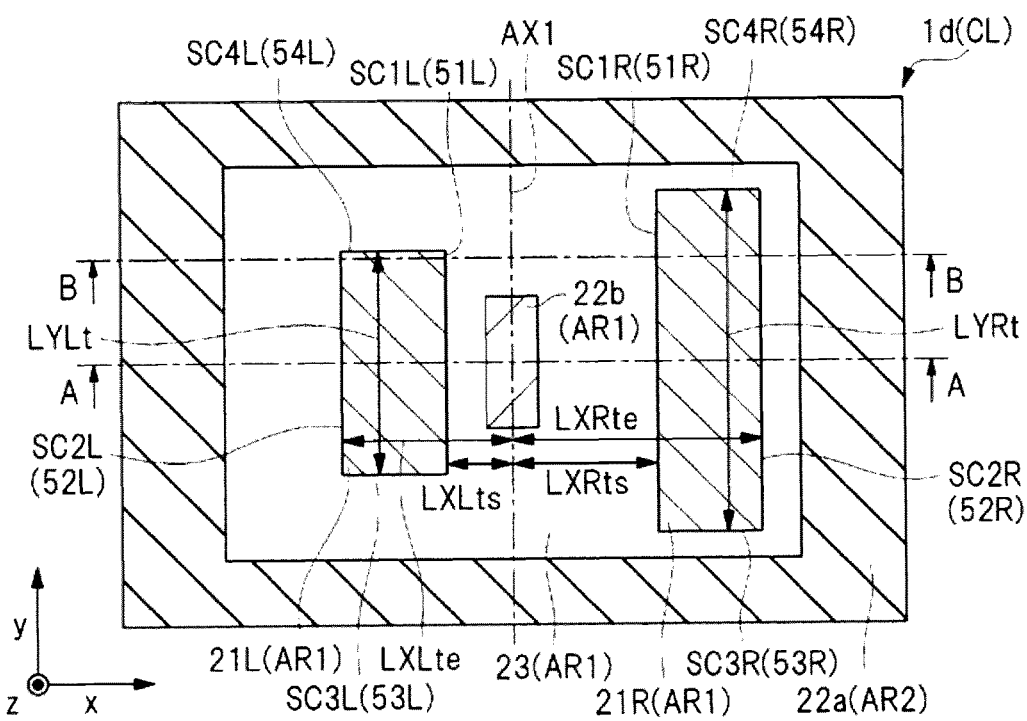

[Fig. 30]
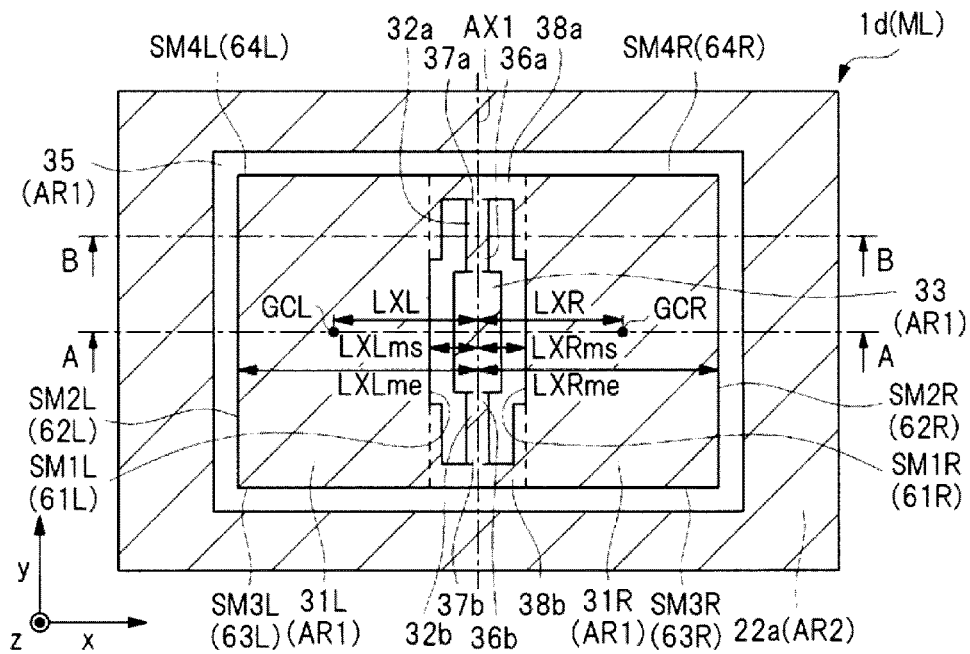
[Fig. 31]
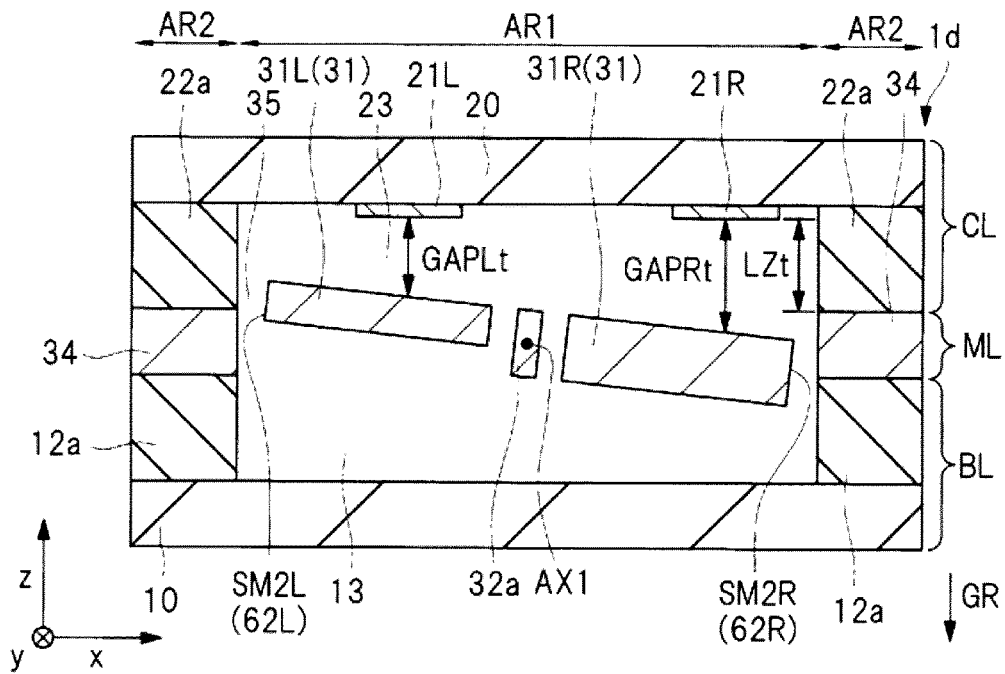

[Fig. 32]
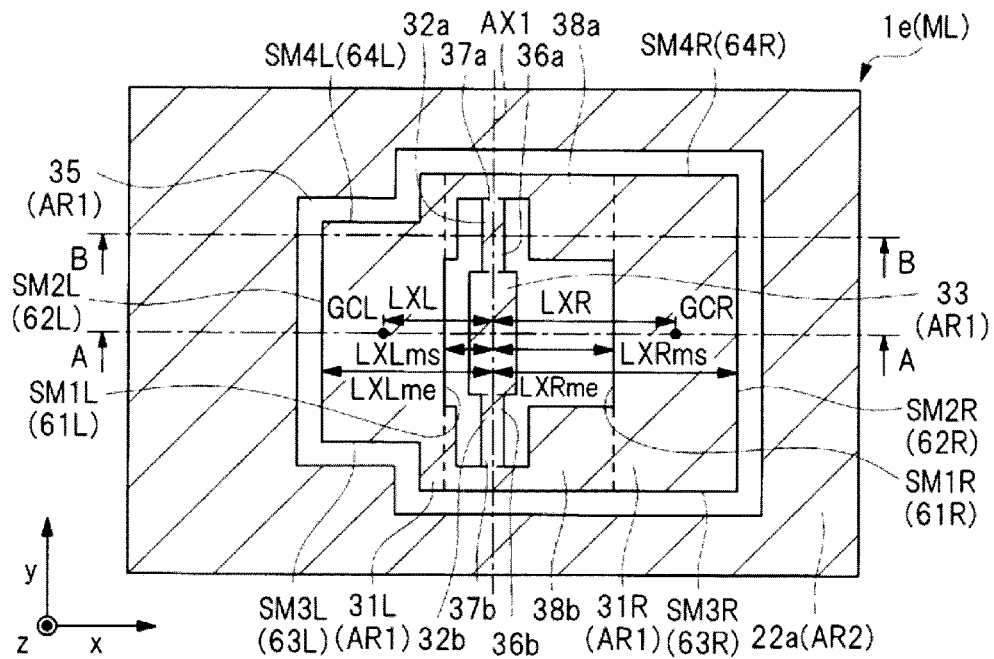
[Fig. 33]
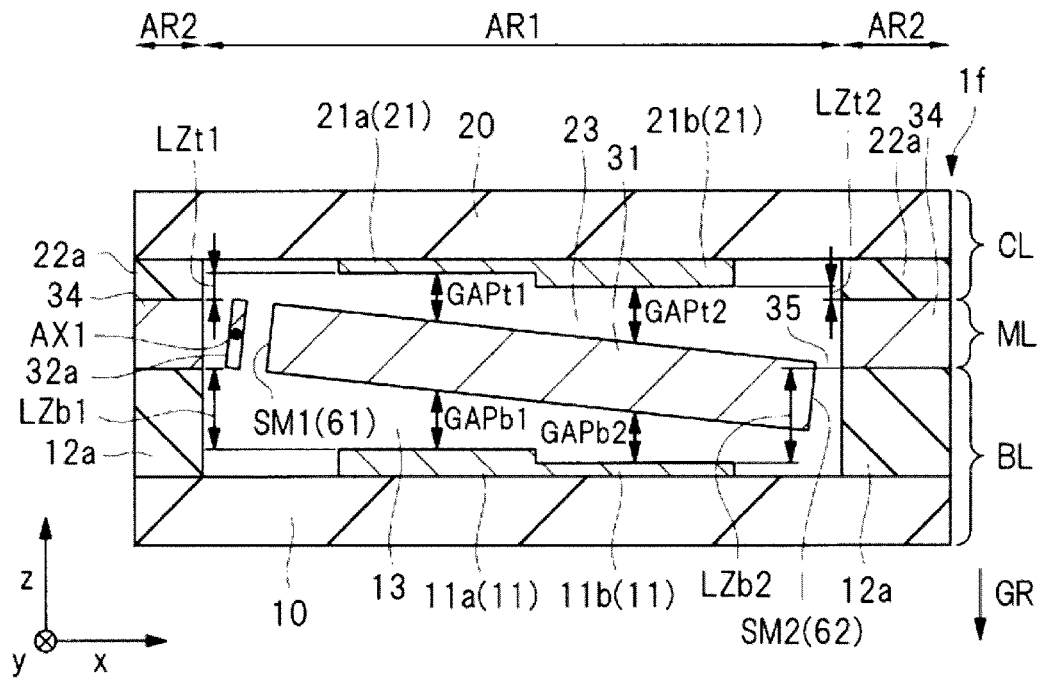

[Fig. 34]
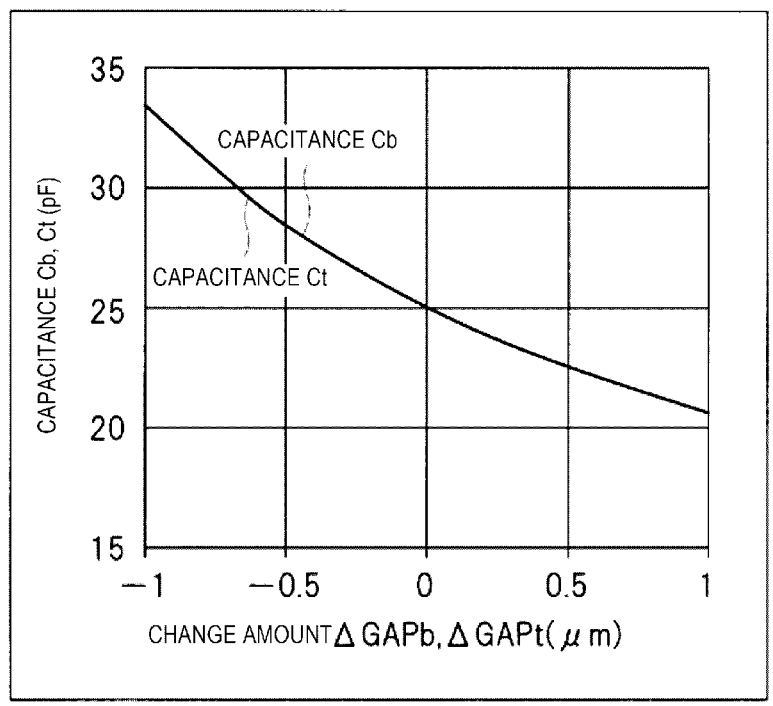
[Fig. 35]
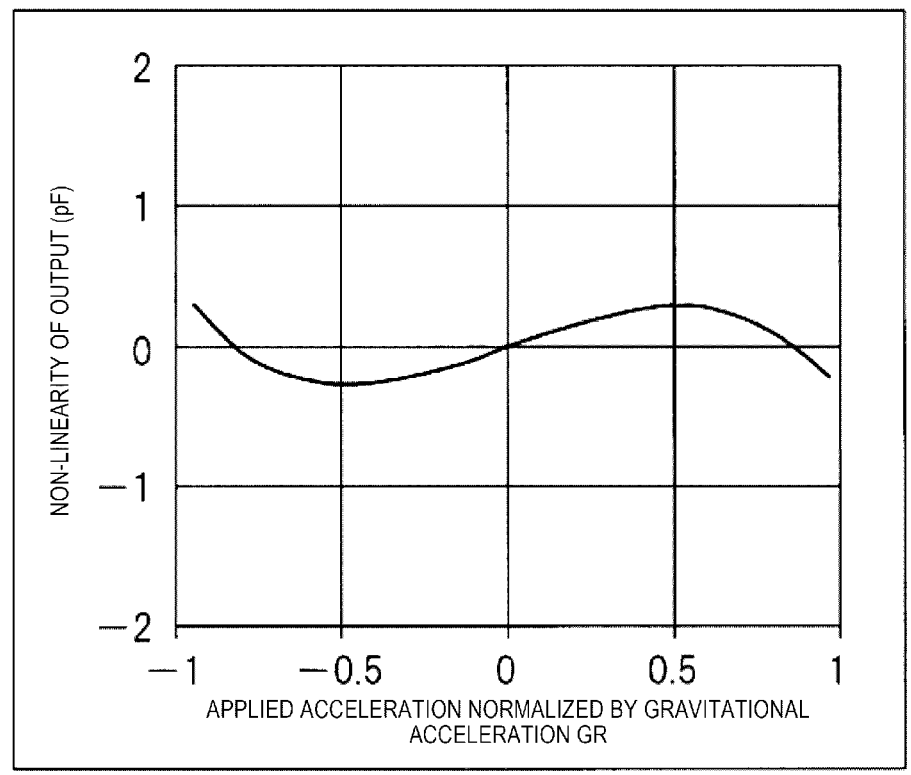

[Fig. 36]
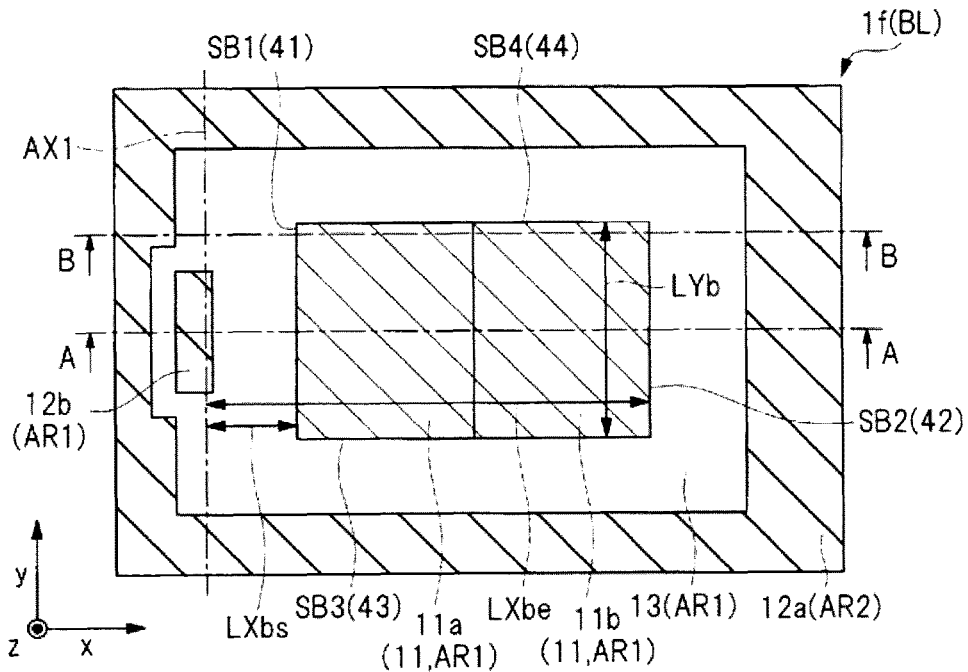
[Fig. 37]
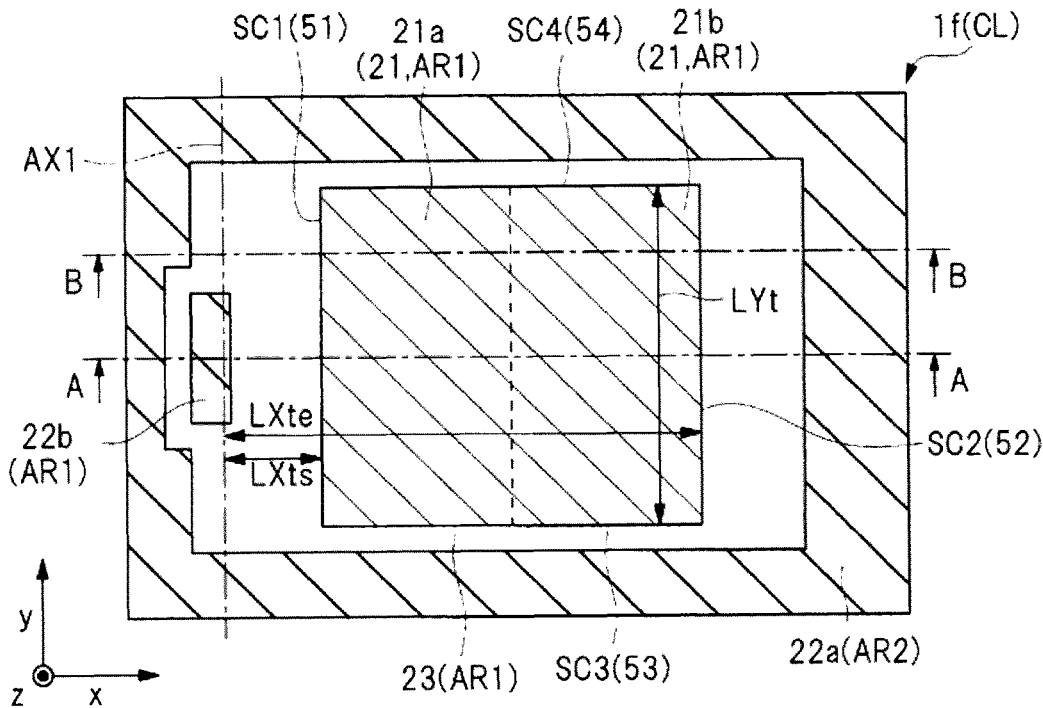

[Fig. 38]
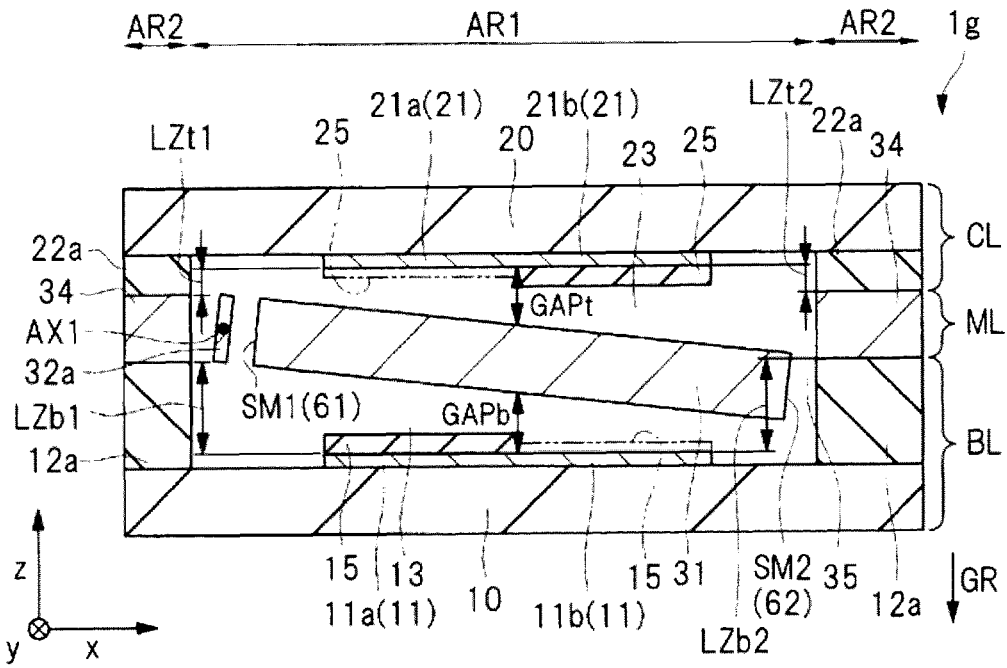
[Fig. 39]
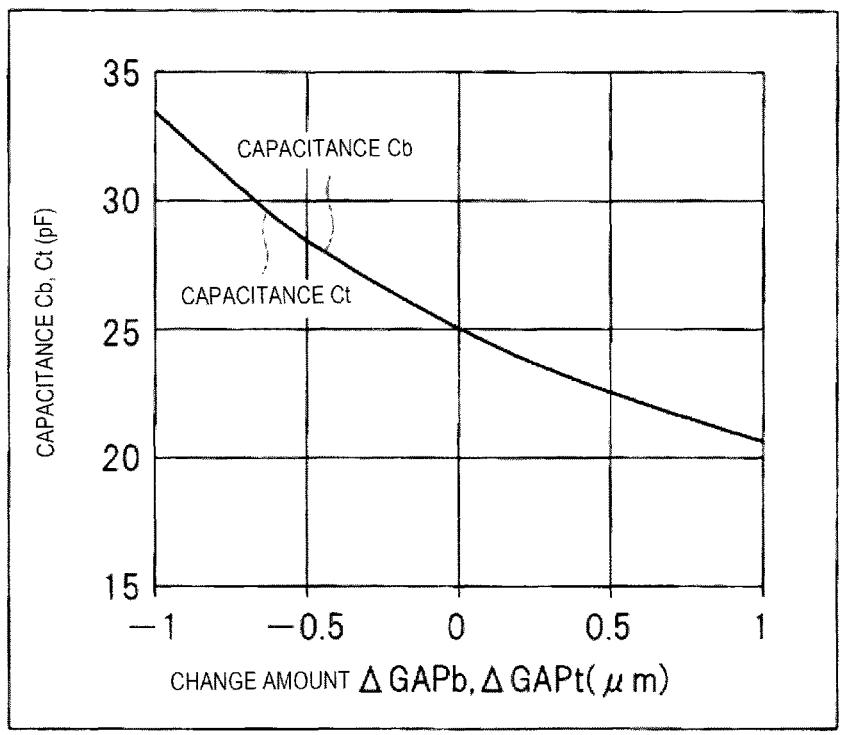

[Fig. 40]
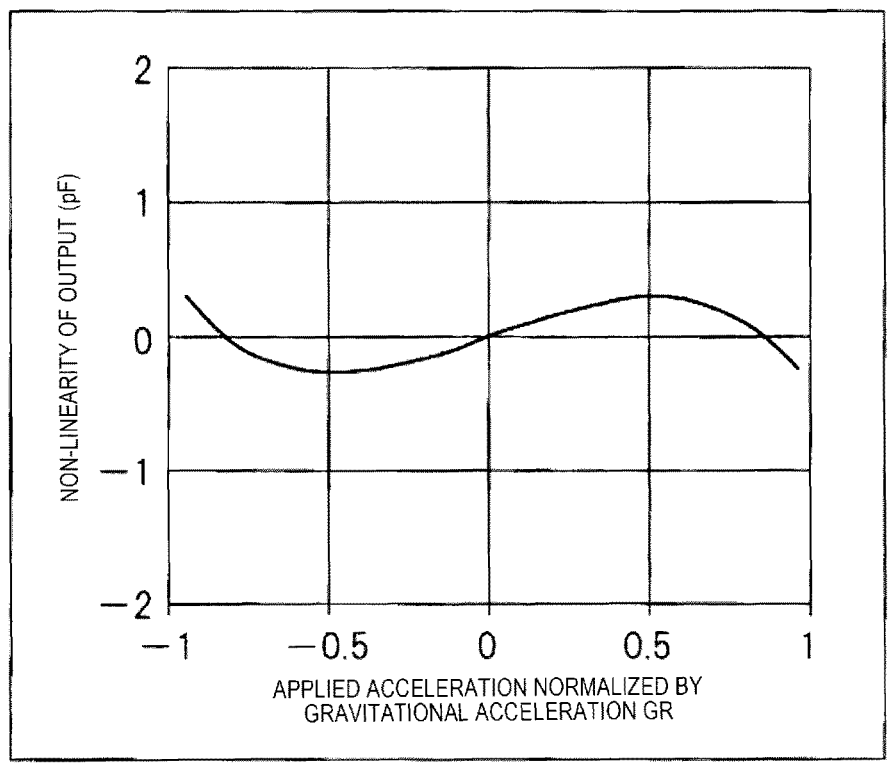
[Fig. 41]
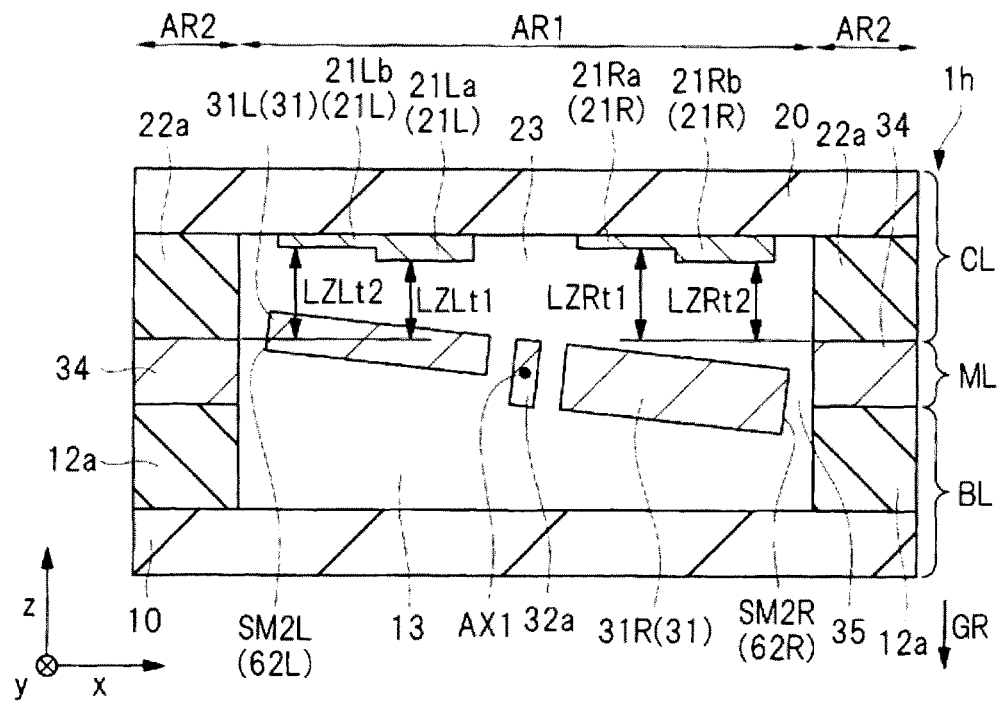

[Fig. 42]
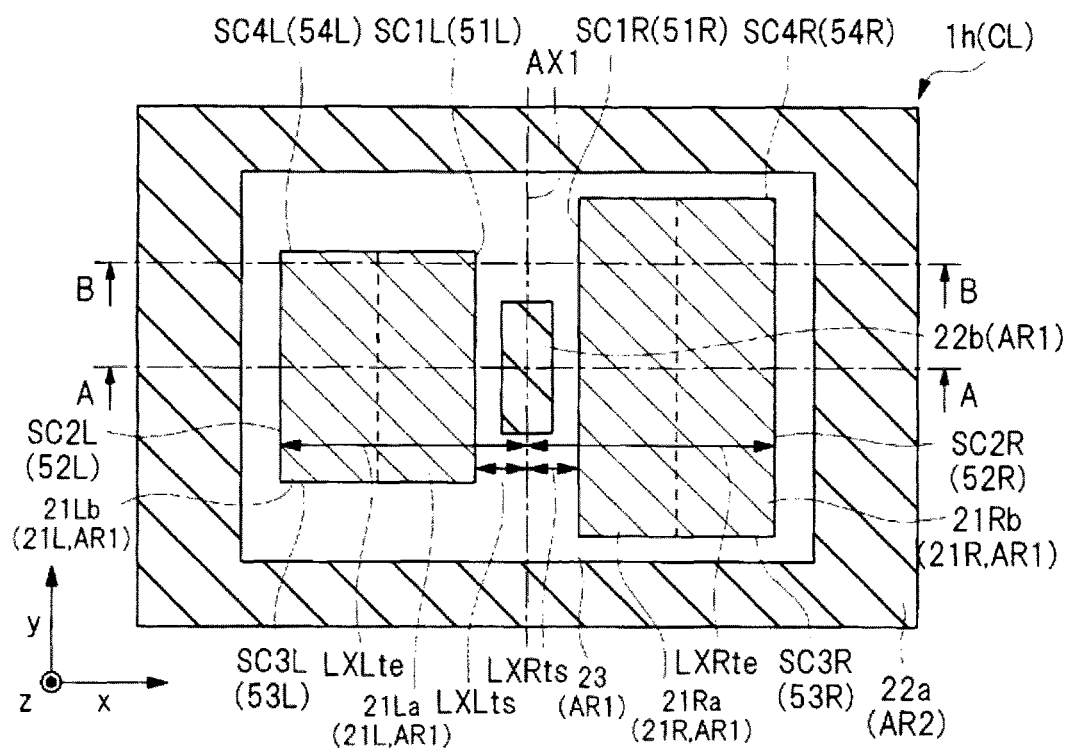

ACCELERATION SENSOR

TECHNICAL FIELD

The present invention relates to an acceleration sensor, and relates to, for example, an acceleration sensor for detecting fine vibration acceleration.

BACKGROUND ART

Seismic reflection method using an acceleration sensor is executed in the field of underground resource exploration. The seismic reflection method is a type of geophysical exploration, and is a method of artificially generating elastic waves, capturing reflected waves rebounded from underground by geophones placed on the surface of the earth, and clarifying an underground structure by analyzing the result.

In the seismic reflection method, elastic waves are excited to the ground from a vibration source placed on the surface of the earth, and the elastic waves reflected at the boundaries of strata are sensed by a geophone placed on the surface of the earth. Elastic waves excited in various directions propagate into the ground with large attenuation, are reflected at a plurality of strata, propagate again into the ground with large attenuation, diffuse to a wide region, and return to the surface of the earth. Therefore, the acceleration sensor used for the seismic reflection method needs to detect acceleration which is applied in the vertical direction, that is, in the same direction as of the gravitational acceleration, and is smaller than gravitational acceleration. That is, in the acceleration sensor used in the seismic reflection method, it is necessary to improve the sensitivity of acceleration in the vertical direction.

Such an acceleration sensor may include a substrate, a fixed portion fixed to the substrate, and a movable portion with one end portion connected to the fixed portion, and an electrode disposed to face the movable portion, and detecting acceleration, based on a capacitance between the movable portion and the electrodes.

Pamphlet of International Publication No. 2010/122953 (PTL 1) discloses a technique for an acceleration sensor which is a micro electro mechanical systems (MEMS) element, and the acceleration sensor includes a substrate, a fixed portion fixed to the substrate, a movable portion provided with a gap from the substrate, and a support beam connecting the movable portion and the fixed portion. JP-A-2001-272415 (PTL 2) describes a technique for a detection device for a differential type semiconductor acceleration sensor, which includes two sets each having a movable electrode and a fixed electrode, and detects acceleration, based on a difference in respective values of capacitance generated between both electrodes. U.S. Pat. No. 6,497,149 (PTL 3) describes an accelerometer including a pair of fixed electrodes, and a movable electrode, and uses a change in a capacitance in order to detect mass movement.

CITATION LIST

Patent Literature

PTL 1: Pamphlet of International Publication No. 2010/122953
PTL 2: JP-A-2001-272415
PTL 3: U.S. Pat. No. 6,497,149

SUMMARY OF INVENTION

Technical Problem

In the acceleration sensor used for the above-described seismic reflection method, the mass of the movable portion may be increased, or the spring constant of the elastic deformation portion connecting the movable portion to the fixed portion may be reduced, to improve the sensitivity of acceleration.

However, the movable portion having one end portion connected to the fixed portion is tilted by its own weight. The present inventors have found that in a case where acceleration smaller than the gravitational acceleration applied in the vertical direction is detected in a state where the movable portion is inclined due to its own weight, the power consumption of the acceleration sensor increases or the linearity of the output of the acceleration sensor with respect to the applied acceleration decreases.

An object of the present invention is to provide an acceleration sensor with high sensitivity, low power consumption, and high output linearity with respect to applied acceleration.

The above and other objects and novel features of the present invention will become apparent from the description of this specification and the accompanying drawings.

Solution to Problem

A brief description about the overview of representative of the invention disclosed in the present application is as follows.

An acceleration sensor according to a representative embodiment includes a substrate, a fixed portion fixed on the main surface of the substrate, a movable portion that is disposed on a first side of the fixed portion in a first direction, in plan view, a first electrode that is disposed to face a lower surface of the movable portion, and a second electrode that is disposed to face an upper surface of the movable portion. A first end portion on the fixed portion side of the movable portion is connected to the fixed portion, and acceleration is detected, based on a first capacitance between the movable portion and the first electrode, and a second capacitance between the movable portion and the second electrode. A distance in the first direction between a second end portion on the fixed portion side of the first electrode and the fixed portion is set to a first distance, and a distance in the first direction between a third end portion on an opposite side of the fixed portion side of the first electrode and the fixed portion is set to a second distance. Further, a distance in the first direction between a fourth end portion on the fixed portion side of the second electrode and the fixed portion is set to a third distance, and a distance in the first direction between a fifth end portion on an opposite side of the fixed portion side of the second electrode and the fixed portion is set to a fourth distance. In this case, the first distance is shorter than the third distance and the second distance is shorter than the fourth distance.

Further, an acceleration sensor according to a representative embodiment includes a substrate, a fixed portion fixed on the main surface of the substrate, a movable portion that is disposed on a first side of the fixed portion in a first direction, in plan view, a first electrode that is disposed to face a lower surface of the movable portion, and a second electrode that is disposed to face an upper surface of the movable portion. A first end portion on the fixed portion side of the movable portion is connected to the fixed portion, and acceleration is detected, based on a first capacitance between the movable portion and the first electrode, and a second capacitance between the movable portion and the second electrode. The first electrode includes a first region, and a second region disposed on an opposite side of the fixed portion with the first region interposed therebetween, in plan view, and the second electrode includes a third region, and a fourth region disposed on an opposite side of the fixed portion with the third region interposed therebetween, in plan view. The height of the upper surface of the first region is higher than the height of the upper surface of the second region, and the height of the lower surface of the third region is higher than the height of the lower surface of the fourth region.

Further, an acceleration sensor according to a representative embodiment includes a substrate, a fixed portion fixed on the main surface of the substrate, a first movable portion that is disposed on a first side of the fixed portion in a first direction, in plan view, and a second movable portion that is disposed on an opposite side of the first movable portion with the fixed portion interposed therebetween, in plan view. Further, the acceleration sensor includes a first electrode that is disposed to face an upper surface of a first movable portion, and a second electrode that is disposed to face an upper surface of a second movable portion. A first end portion on the fixed portion side of the first movable portion is connected to the fixed portion, a second end portion on the fixed portion side of the second movable portion is connected to the fixed portion, and the first movable portion and the second movable portion are integrally rotatable and displaceable about an axis along a second direction crossing the first direction, in plan view, with respect to the fixed portion. Acceleration is detected, based on a first capacitance between the first movable portion and the first electrode, and a second capacitance between the second movable portion and the second electrode. A distance in the first direction between a third end portion on the fixed portion side of the first electrode and the axis is set to a first distance, and a distance in the first direction between a fourth end portion on an opposite side of the fixed portion side of the first electrode and the axis is set to a second distance. Further, a distance in the first direction between a fifth end portion on the fixed portion side of the second electrode and the axis is set to a third distance, and a distance in the first direction between a sixth end portion on an opposite side of the fixed portion side of the second electrode and the axis is set to a fourth distance. In this case, the first distance is shorter than the third distance and the second distance is shorter than the fourth distance.

Advantageous Effects of Invention

The following is a brief description of effects obtained from the representative of the invention disclosed in the present application.

According to a representative embodiment, it is possible to provide an acceleration sensor with high sensitivity, low power consumption, and high output linearity with respect to applied acceleration.

BRIEF DESCRIPTION OF DRAWINGS

FIG. 1 is a schematic cross-sectional view of the surface of the earth that illustrates an overview of seismic reflection method.

FIG. 2 is a cross-sectional view of an acceleration sensor of Embodiment 1.

FIG. 3 is a cross-sectional view of the acceleration sensor of Embodiment 1.

FIG. 4 is a plan view of the acceleration sensor of Embodiment 1.

FIG. 5 is a plan view of the acceleration sensor of Embodiment 1.

FIG. 6 is a plan view of the acceleration sensor of Embodiment 1.

FIG. 7 is a cross-sectional view of the acceleration sensor of Embodiment 1.

FIG. 8 is a cross-sectional view of an acceleration sensor of Comparative example 1.

FIG. 9 is a plan view of the acceleration sensor of Comparative example 1.

FIG. 10 is a plan view of the acceleration sensor of Comparative example 1.

FIG. 11 is a plan view of the acceleration sensor of Comparative example 1.

FIG. 12 is a cross-sectional view of the acceleration sensor of Comparative example 1.

FIG. 13 is a graph illustrating gap length dependence of a capacitance between a movable electrode and a lower electrode, and a capacitance between the movable electrode and an upper electrode, in Comparative example 1.

FIG. 14 is a cross-sectional view of an acceleration sensor of Comparative example 2.

FIG. 15 is a graph illustrating gap length dependence of a capacitance between a movable electrode and a lower electrode, and a capacitance between the movable electrode and an upper electrode, in Comparative example 2.

FIG. 16 is a graph illustrating gap length dependence of a capacitance between a movable electrode and a lower electrode, and a capacitance between the movable electrode and an upper electrode, in Embodiment 1.

FIG. 17 is a graph illustrating non-linearity of an output ΔC when acceleration is applied to each of the acceleration sensors of Embodiment 1, Comparative example 1, and Comparative example 2.

FIG. 18 is a graph illustrating a relationship between the output ΔC and a difference (LXts−LXbs) between a distance LXts and a distance LXbs.

FIG. 19 is a plan view of an acceleration sensor of a modification example of Embodiment 1.

FIG. 20 is a plan view of the acceleration sensor of the modification example of Embodiment 1.

FIG. 21 is a cross-sectional view of an acceleration sensor of Embodiment 2.

FIG. 22 is a cross-sectional view of the acceleration sensor of Embodiment 2.

FIG. 23 is a plan view of the acceleration sensor of Embodiment 2.

FIG. 24 is a plan view of the acceleration sensor of Embodiment 2.

FIG. 25 is a plan view of an acceleration sensor of a modification example of Embodiment 2.

FIG. 26 is a plan view of the acceleration sensor of the modification example of Embodiment 2.

FIG. 27 is a cross-sectional view of an acceleration sensor of Embodiment 3.

FIG. 28 is a cross-sectional view of the acceleration sensor of Embodiment 3.

FIG. 29 is a plan view of the acceleration sensor of Embodiment 3.

FIG. 30 is a plan view of the acceleration sensor of Embodiment 3.

FIG. 31 is a cross-sectional view of the acceleration sensor of Embodiment 3.

FIG. 32 is a plan view of an acceleration sensor of a modification example of Embodiment 3.

FIG. 33 is a cross-sectional view of an acceleration sensor of Embodiment 4.

FIG. 34 is a graph illustrating gap length dependence of a capacitance between a movable electrode and a lower electrode, and a capacitance between the movable electrode and an upper electrode, in Embodiment 4.

FIG. 35 is a graph illustrating non-linearity of an output ΔC when acceleration is applied to the acceleration sensor of Embodiment 4.

FIG. 36 is a plan view of the acceleration sensor of Embodiment 4.

FIG. 37 is a plan view of the acceleration sensor of Embodiment 4.

FIG. 38 is a cross-sectional view of an acceleration sensor of a second modification example of Embodiment 4.

FIG. 39 is a graph illustrating gap length dependence of a capacitance between a movable electrode and a lower electrode, and a capacitance between the movable electrode and an upper electrode, in the second modification example of Embodiment 4.

FIG. 40 is a graph illustrating non-linearity of an output ΔC when acceleration is applied to the acceleration sensor of the second modification example of Embodiment 4.

FIG. 41 is a cross-sectional view of an acceleration sensor of a third modification example of Embodiment 4.

FIG. 42 is a plan view of the acceleration sensor of the third modification example of Embodiment 4.

DESCRIPTION OF EMBODIMENTS

The following embodiments will be described by being separated into a plurality of sections or embodiments if necessary for the sake of convenience, but unless otherwise specified, they are not unrelated to each other, and one is related to the modification example, details, supplementary explanation, or the like of a part or the whole of the other.

Further, in the following embodiments, in a case of referring to the number of elements (including number, numerical value, quantity, range, or the like), except for a case where it is expressly specified, and a case where it is obviously limited to a specific number in principle, or the like, it is not limited to the specific number, and it may be the specific number or more, or the specific number or less.

Furthermore, in the following embodiments, it goes without saying that the constituent elements (including element steps or the like) are not essential, except for a case where they are expressly specified or a case where they are considered to be obviously essential in principle.

Similarly, in the following embodiments, when referring to shapes, positional relationships, or the like, except for a case where they are expressly specified and a case where they are not considered to be obvious in principle, shapes which are substantially similar or similar to its shape and the like are included. This is also applied to the above numerical value and range.

Hereinafter, embodiments of the present invention will be described in detail with reference to the drawings. In addition, in all of the drawings for describing the embodiments, the same reference numerals will be given to the members having the same functions, and the repetitive description thereof will be omitted. In the following embodiments, the description of the same or similar parts will not be repeated in principle unless it is particularly necessary.

In the drawings used in the embodiments, hatching may be omitted in order to make the drawings easy to see even in cross-sectional views. In addition, in some cases even in a plan view hatching in order to make the drawings easy to see. Even in a plan view, hatching may be added to make a drawings easy to see.

In the following embodiments, a range indicated as A to B denotes A or more and B or less, unless otherwise stated.

Embodiment 1

<Seismic Reflection Method>

At the beginning, a description will be given on seismic reflection method using an acceleration sensor, which is executed in the field of underground resource exploration. The seismic reflection method is a type of geophysical exploration, and is a method of artificially generating elastic waves, capturing reflected wave rebounded from underground by geophones placed on the surface of the earth, and clarifying a underground structure by analyzing the result.

FIG. 1 is a schematic cross-sectional view of the surface of the earth, which illustrates an overview of the seismic reflection method.

As illustrated in FIG. 1, in the seismic reflection method, elastic waves (arrows in FIG. 1) are excited to the ground from a vibration source G1 placed on the surface G3 of the earth, elastic waves reflected at any one of boundaries G4$a$ and G4$b$ of strata are sensed by any one of geophones G1$a$, G2$b$, G1$c$, G2$d$, and G2$e$ placed on the surface G3 of the earth. Since the general vibration source G1 vibrates in a direction vertical to the surface of the earth, P waves are efficiently excited in a direction close to the vertical direction. Therefore, in the seismic reflection method, P waves are used. Further, since the elastic waves returning again to the surface of the earth are P-wave propagating from the direction close to the vertical direction, the geophone needs to detect elastic vibration in the vertical direction.

Elastic waves excited in various directions propagate into the ground with large attenuation, are reflected at the boundaries G4$a$ and G4$b$ of a plurality of strata, propagate again into the ground with large attenuation, diffuse to a wide region, and return to the surface of the earth. It is necessary to use an acceleration sensor which is highly sensitive in the vertical direction, as the geophones G2$a$, G2$b$, G2$c$, G2$d$ and G2$e$, in order to detect weak elastic vibration. Therefore, an acceleration sensor of Embodiment 1 to be described below is desirably used as the geophones G2$a$, G2$b$, G2$c$, G2$d$ and G2$e$.

<Configuration of Acceleration Sensor>

Next, the configuration of the acceleration sensor of Embodiment 1 will be described with reference to the drawings.

FIG. 2 and FIG. 3 are cross-sectional views of the acceleration sensor of Embodiment 1. FIG. 4 to FIG. 6 are plan views of the acceleration sensor of Embodiment 1. FIG. 7 is a cross-sectional view of the acceleration sensor of Embodiment 1.

FIG. 2 is a cross-sectional view taken along line A-A of FIG. 4 to FIG. 6, and FIG. 3 and FIG. 7 are cross-sectional views taken along line B-B of FIG. 4 to FIG. 6. FIG. 2 and FIG. 3 illustrate a state where gravitational acceleration is not applied in the z-axis direction, and FIG. 7 illustrates a state where gravitational acceleration GR is applied in the −z-axis direction. That is, FIG. 7 illustrates a state in which the movable electrode 31 is rotationally displaced about the rotation axis AX 1 by the gravitational acceleration GR.

FIG. 4 illustrates the state of the upper surface of the base layer, in a state where the cap layer CL and the membrane layer ML are removed and seen through. FIG. 5 illustrates the state of the lower surface of the cap layer. FIG. 6 illustrates the state of the membrane layer, in a state where the cap substrate 20 is removed and seen through. In addition, the base substrate 10 is not illustrated in FIG. 5 and FIG. 6.

As illustrated in FIG. 2 and FIG. 3, the acceleration sensor 1 of Embodiment 1 includes a base layer BL, a membrane layer ML, and a cap layer CL.

As illustrated in FIG. 2 to FIG. 4, the base layer BL includes a base substrate 10 which is a base, a lower electrode 11, gap adjusting films 12a and 12b, and a space 13.

The base substrate 10 has a region AR1 which is a region of the upper surface as the main surface of the base substrate 10 and a central region on the center side of the base substrate 10, and a region AR2 which is a region of the upper surface of the base substrate 10 and is a peripheral region on the peripheral side of the base substrate 10 rather than the region AR1.

The two directions which intersect with each other, preferably are perpendicular to each other, in plan view, are set to the x-axis direction and the y-axis direction, and a direction perpendicular to the main surface of the base substrate 10 is set to the z-axis direction. Further, in the specification of the present application, the term "in plan view" means the case of viewing from the z-axis direction which is the direction perpendicular to the upper surface as the main surface of the base substrate 10.

The gap adjusting film 12a is formed, on the upper surface of the base substrate 10, that is, on the base substrate 10, in the region AR2. Further, the gap adjusting film 12b is formed in the same layer as the gap adjusting film 12a, on the upper surface of the base substrate 10, that is, on the base substrate 10, even in some regions of the region AR1.

On the other hand, the gap adjusting film 12b is not formed but rather the lower electrode 11 is formed, on the upper surface of the base substrate 10, that is, on the base substrate 10, in a region other than the region where the gap adjusting film 12b is formed, of the region AR1. The lower electrode 11 is disposed on one side (left side in FIG. 4) of the gap adjusting film 12b in the x-axis direction, in plan view, in the region AR1. The lower electrode 11 is disposed to face the lower surface of the movable electrode 31 which is the movable portion.

The thickness of the gap adjusting films 12a and 12b is greater than the thickness of the lower electrode 11. Therefore, in the region AR1, the space 13 is formed on the lower electrode 11 and the base substrate 10. That is, the gap adjusting films 12a and 12b are used for forming the space 13 on the lower electrode 11. The space 13 is filled with gas having sufficiently lower pressure than the atmospheric pressure.

The base substrate 10 is made of a single crystal silicon substrate and a silicon oxide film (not illustrated) formed on the surface of the single crystal silicon substrate. The lower electrode 11 is electrically insulated from the single crystal silicon substrate of the base substrate 10, through the silicon oxide film. In addition, the lower electrode 11 is electrically connected to, for example, a detection circuit through an electrical connection line (not illustrated).

As illustrated in FIG. 2, FIG. 3, and FIG. 5, the cap layer CL includes a cap substrate 20 which is a base, an upper electrode 21, gap adjusting films 22a and 22b, and a space 23.

The region AR1 is a region of the lower surface as the main surface of the cap substrate 20, and is also the region of a central region on the center side of the cap substrate 20. Further, the region AR2 is a region of the lower surface of the cap substrate 20, and is also the region of a peripheral region on the peripheral side of the cap substrate 20 rather than the region AR1. Further, the x-axis direction and the y-axis direction are two directions which intersect with each other, preferably are perpendicular to each other, in the lower surface as the main surface of the cap substrate 20, and the z-axis direction is a direction perpendicular to the lower surface of the cap substrate 20.

The gap adjusting film 22a is formed, under the lower surface of the cap substrate 20, that is, under the cap substrate 20, in the region AR2. Further, a gap adjusting film 22b is formed in the same layer as the gap adjusting film 22a, under the lower surface of the cap substrate 20, that is, under the cap substrate 20, in some regions of the region AR1.

On the other hand, the gap adjusting film 22b is not formed but rather the upper electrode 21 is formed, under the lower surface of the cap substrate 20, that is, under the cap substrate 20, in a region other than the region where the gap adjusting film 22b is formed, of the region AR1. The upper electrode 21 is disposed on one side (right side in FIG. 5) of the gap adjusting film 22b in the x-axis direction, in plan view, in the region AR1. The upper electrode 21 is disposed to face the upper surface of the movable electrode 31 which is the movable portion.

The thickness of the gap adjusting films 22a and 22b is greater than the thickness of the upper electrode 21. Therefore, in the region AR1, a space 23 is formed under the upper electrode 21 and the cap substrate 20. That is, the gap adjusting films 22a and 22b are used for forming the space 23 under the upper electrode 21. The space 23 is filled with gas having sufficiently lower pressure than the atmospheric pressure.

The cap substrate 20 is made of a single crystal silicon substrate and a silicon oxide film (not illustrated) formed on the surface of the single crystal silicon substrate. The upper electrode 21 is electrically insulated from the single crystal silicon substrate of the cap substrate 20, through the silicon oxide film. In addition, the upper electrode 21 is electrically connected to, for example, a detection circuit through an electrical connection line (not illustrated).

As illustrated in FIG. 2, FIG. 3, and FIG. 6, the membrane layer ML includes a movable electrode 31 which is a movable portion, torsion springs 32a and 32b, a fixed portion 33, and a frame 34. All of the movable electrode 31, the torsion springs 32a and 32b, the fixed portion 33, and the frame 34 are made of a single crystal silicon substrate with low resistance, and they are formed by etching the single crystal silicon substrate using deep reactive ion etching (DRIE), for example, in a thickness direction (z-axis direction) to form a hole penetrating the single crystal silicon substrate. Incidentally, a space 35 is formed between an outer surface of the movable electrode 31 and the inner surface of the frame 34.

The fixed portion 33 is sandwiched between the gap adjusting film 12b and the gap adjusting film 22b, as illustrated in FIG. 2. The lower end of the fixed portion 33 is mechanically connected to the gap adjusting film 12b, and the upper end of the fixed portion 33 is mechanically connected to the gap adjusting film 22b. Since the gap adjusting film 12b is mechanically connected to the base substrate 10, the fixed portion 33 is mechanically fixed to the base substrate 10 after all. That is, the fixed portion 33 is fixed on the upper surface which is the main surface of the base substrate 10. Further, since the gap adjusting film 22b is mechanically connected to the cap substrate 20, the fixed portion 33 is mechanically fixed to the cap substrate 20 after all. The fixed portion 33 is electrically connected to, for example, a detection circuit through an electrical connection line (not illustrated).

The torsion spring 32a extends in the y-axis direction, the end portion 36a on one side in the y-axis direction of the torsion spring 32a is connected to the fixed portion 33, and the end portion 37a on the other side in the y-axis direction of the torsion spring 32a is connected to the end portion 61 of the movable electrode 31. Further, the torsion springs 32b extends in the y-axis direction, the end portion 36b of one side in the y-axis direction of the torsion spring 32b is connected to the fixed portion 33, and the end portion 37b on the other side in the y-axis direction of the torsion spring 32b is connected to the end portion 61 of the movable electrode 31.

The torsion spring 32a is provided such that the end portion 37a is rotatable and displaceable about the rotation axis AX1 along the y-axis direction, with respect to the end portion 36a, by the torsion spring 32a being elastically deformed, and the end portion 37a being twisted with respect to the end portion 36a. The torsion spring 32b is provided such that the end portion 37b is rotatable and displaceable about the same rotation axis AX1 as the rotation axis AX1 of the torsion spring 32a, with respect to the end portion 36b, by the torsion spring 32b being elastically deformed, and the end portion 37b being twisted with respect to the end portion 36b. Therefore, each of the torsion springs 32a and 32b is an elastic deformation portion.

Preferably, the thickness in the z-axis direction of the torsion spring 32a is greater than the width in the x-axis direction of the torsion spring 32a. Thus, the end portion 37a can easily be twisted with respect to the end portion 36a. Further, preferably, the thickness in the z-axis direction of the torsion spring 32b is greater than the width in the x-axis direction of the torsion spring 32b. Thus, the end portion 37b can easily be twisted with respect to the end portion 36b.

The movable electrode 31 is disposed on one side (right side in FIG. 6) of the fixed portion 33 in the x-axis direction, in plan view, in the region AR1 as illustrated in FIG. 6. Two torsion springs 32a and 32b which are rotatable and displaceable about the rotation axis AX1 extending in the y-axis direction are connected to the end portion 61 on the rotation axis AX1 side of the movable electrode 31, by being separated from each other in the y-axis direction. Therefore, the end portion 61 on the fixed portion 33 side of the movable electrode 31 is connected to the fixed portion 33, through the torsion springs 32a and 32b. Further, the movable electrode 31 is rotatable and displaceable about the rotation axis AX1 of the torsion springs 32a and 32b, with respect to the fixed portion 33.

The movable electrode 31 has, for example, a rectangular shape, as viewed from the z-axis direction. That is, the movable electrode 31 includes, for example, a side surface SM1 and a side surface SM2 perpendicular to the x-axis direction, and a side surface SM3 and a side surface SM4 perpendicular to the y-axis direction. The side surface SM1 is an end portion 61 on the rotation axis AX1 side of the movable electrode 31, and the side surface SM2 is an end portion 62 on the opposite side of the rotation axis AX1 side of the movable electrode 31. In other words, the side surface SM1 is the end portion 61 on the negative side in the x-axis direction of the movable electrode 31, and the side surface SM2 is the end portion 62 on the positive side in the x-axis direction of the movable electrode 31. Further, the side surface SM3 is the end portion 63 on the negative side in the y-axis direction of the movable electrode 31, and the side surface SM4 is the end portion 64 on the positive side in the y-axis direction of the movable electrode 31.

As an example, the planar dimension of the movable electrode 31 as viewed from the z-axis direction can be set to 4.0 mm (x-axis direction)×3.9 mm (y-axis direction). Further, the thickness of the movable electrode 31 in the z-axis direction can be set to 0.25 mm.

A distance in the x-axis direction between the end portion 61 (side surface SM1) on the rotation axis AX1 side of the movable electrode 31 and the rotation axis AX1 is set to a distance LXms. Further, a distance in the x-axis direction between the end portion 62 (side surface SM2) on the opposite side of the rotation axis AX1 side of the movable electrode 31 and the rotation axis AX1 is set to a distance LXme. In this case, the distance LXms can be set to 200 μm, and the distance LXme can be set to 4200 μm.

Further, in the example illustrated in FIG. 6, the movable electrode 31 is connected to the end portion 37a of the torsion spring 32a through the connecting portion 38a, and is connected to the end portion 37b of the torsion spring 32b through the connecting portion 38b, and the lengths of the connecting portions 38a and 38b in the x-axis direction can be made extremely short. In this case, since a slit with a very narrow width in the x-axis direction is formed between the movable electrode 31 and the torsion springs 32a and 32b, or between the movable electrode 31 and the fixed portion 33, the distance LXms can be regarded as approximately zero.

Further, the movable electrode 31 can be connected to the fixed portion 33 without a torsion spring. In such a case, "the rotation axis AX1 side of the movable electrode 31" corresponds to the "fixed portion 33 side of the movable electrode 31", and the "the opposite side of the rotation axis AX1 side of the movable electrode 31" corresponds to the "opposite side of the fixed portion 33 side of the movable electrode 31". Further, "the distance in the x-axis direction between the end portion 61 (side surface SM1) on the rotation axis AX1 side of the movable electrode 31 and the rotation axis AX1" corresponds to "the distance in the x-axis direction between the end portion 61 (side surface SM1) on the fixed portion 33 side of the movable electrode 31 and the fixed portion 33". Further, "a distance in the x-axis direction between the end portion 62 (side surface SM2) on the opposite side of the rotation axis AX1 side of the movable electrode 31 and the rotation axis AX1" corresponds to "a distance in the x-axis direction between the end portion 62 (side surface SM2) on the opposite side of the fixed portion 33 side of the movable electrode 31 and the fixed portion 33".

The acceleration sensor 1 of Embodiment 1 is able to detect fine vibration acceleration applied in ±z-axis direction with high accuracy, in a state where gravitational acceleration GR (9.8 ms$^2$) is applied in a direction (−z-axis direction) perpendicular to the upper surface of the base substrate 10 or the lower surface of the cap substrate 20, that is, the xy plane. The vibration in ±z-axis direction can be detected with highest accuracy, by installing the acceleration sensor 1 in such a manner that the z-axis direction is parallel to the vertical direction, that is, −z-axis direction matches the direction in which the gravitational acceleration GR is applied, as illustrated in FIG. 7.

In the acceleration sensor 1 of Embodiment 1, the mass of the movable electrode 31 and the spring constant of the torsion springs 32a and 32b are adjusted such that in a state where the gravitational acceleration GR (see FIG. 7) is applied, the end portion 62 on the opposite side of the rotation axis AX1 side of the movable electrode 31 is displaced by 2 μm to the negative side in the z-axis direction, compared to a state where the gravitational acceleration GR is not applied.

The gap length GAPb is the thickness in the z-axis direction of the space 13 located between the movable electrode 31 and the lower electrode 11, and is the distance in the z-axis direction between the movable electrode 31 and the lower electrode 11. Since the movable electrode 31 is tilted by being rotated about the rotation axis AX1, the thickness in the z-axis direction of the space 13, that is, the distance in the z-axis direction between the movable electrode 31 and the lower electrode 11 varies depending on each position in the x-axis direction. Here, the thickness in the z-axis direction of the space 13 at the center position of the lower electrode 11 in the x-axis direction is defined as a gap length GAPb. That is, the distance in the z-axis direction between the movable electrode 31 and the lower electrode 11 at the center position of the lower electrode 11 in the x-axis direction is defined as a gap length GAPb.

The gap length GAPt is the thickness in the z-axis direction of the space 23 located between the movable electrode 31 and the upper electrode 21, and is the distance in the z-axis direction between the movable electrode 31 and the upper electrode 21. Since the movable electrode 31 is tilted by being rotated about the rotation axis AX1, the thickness in the z-axis direction of the space 23, that is, the distance in the z-axis direction between the movable electrode 31 and the upper electrode 21 varies depending on each position in the x-axis direction. Here, the thickness in the z-axis direction of the space 23 at the center position of the upper electrode 21 in the x-axis direction is defined as a gap length GAPt. That is, the distance in the z-axis direction between the movable electrode 31 and the upper electrode 21 at the center position of the upper electrode 21 in the x-axis direction is defined as a gap length GAPt.

Preferably, the thickness of the gap adjusting films 12a and 12b is greater than the thickness of the gap adjusting films 22a and 22b. In other words, the distance LZb in the z-axis direction between the lower end of the end portion 61 on the rotation axis AX1 side of the movable electrode 31 and the upper surface of the lower electrode 11 is longer than the distance LZt in the z-axis direction between the upper end of the end portion 61 on the rotation axis AX1 side of the movable electrode 31 and the lower surface of the upper electrode 21. Thus, as compared to the case where the thickness of the gap adjusting films 12a and 12b is equal to the thickness of the gap adjusting films 22a and 22b, a difference between the gap length GAPb and the gap length GAPt when gravitational acceleration GR is applied can be made close to zero.

In Embodiment 1, the thickness of the gap adjusting films 12a and 12b can be made greater than the thickness of the gap adjusting films 22a and 22b, for example, by 2 μm. In this case, the distance LZb can be set to 6 μm, the distance LZt can be set to 4 μm, and the gap length GAPt and the gap length GAPb when the gravitational acceleration is applied can be made equal.

In addition, the distance LZb can be defined as a distance in the z-axis direction between the rotation axis AX1 and the upper surface of the lower electrode 11, and the distance LZt can be defined as a distance in the z-axis direction between the rotation axis AX1 and the lower surface of the upper electrode 21. Even in such a case, the distance LZb is preferably longer than the distance LZt.

Further, in FIG. 2 and FIG. 3, in order to simplify understanding, the distance LZb is indicated as a distance in the z-axis direction between the upper surface of the gap adjusting film 12a or 12b and the upper surface of the lower electrode 11, and the distance LZt is indicated as a distance in the z-axis direction between the lower surface of the gap adjusting film 22a or 22b and the lower surface of the upper electrode 21 (This also applies to the following each cross-sectional view).

The lower electrode 11 and the upper electrode 21 are disposed to be parallel to each other, as illustrated in FIG. 2 to FIG. 5. Further, as described above, the lower electrode 11 is disposed to face the lower surface of the movable electrode 31, and the upper electrode 21 is disposed to face the upper surface of the movable electrode 31.

The lower electrode 11 has a rectangular shape, as viewed from the z-axis direction. That is, the lower electrode 11 has a side surface SB1 and a side surface SB2 perpendicular to the x-axis direction and a side surface SB3 and a side surface SB4 perpendicular to the y-axis direction. The side surface SB1 is an end portion 41 on the rotation axis AX1 side of the lower electrode 11, and the side surface SB2 is an end portion 42 on the opposite side of the rotation axis AX1 side of the lower electrode 11. In other words, the side surface SB1 is the end portion 41 on the negative side in the x-axis direction of the lower electrode 11, and the side surface SB2 is the end portion 42 on the positive side in the x-axis direction of the lower electrode 11. Further, the side surface SB3 is the end portion 43 on the negative side in the y-axis direction of the lower electrode 11, and the side surface SB4 is the end portion 44 on the positive side in the y-axis direction of the lower electrode 11.

The upper electrode 21 has a rectangular shape, as viewed from the z-axis direction. That is, the upper electrode 21 has a side surface SC1 and a side surface SC2 perpendicular to the x-axis direction and a side surface SC3 and a side surface SC4 perpendicular to the y-axis direction. The side surface SC1 is an end portion 51 on the rotation axis AX1 side of the upper electrode 21, and the side surface SC2 is an end portion 52 on the opposite side of the rotation axis AX1 side of the upper electrode 21. In other words, the side surface SC1 is the end portion 51 on the negative side in the x-axis direction of the upper electrode 21, and the side surface SC2 is the end portion 52 on the positive side in the x-axis direction of the upper electrode 21. Further, the side surface SC3 is the end portion 53 on the negative side in the y-axis direction of the upper electrode 21, and the side surface SC4 is the end portion 54 on the positive side in the y-axis direction of the upper electrode 21.

A distance in the x-axis direction between the end portion 41 (side surface SB1) on the rotation axis AX1 side of the lower electrode 11 and the rotation axis AX1 is set to a distance LXbs. Further, a distance in the x-axis direction between the end portion 42 (side surface SB2) on the opposite side of the rotation axis AX1 side of the lower electrode 11 and the rotation axis AX1 is set to a distance LXbe. In this case, the distance LXbs can be set to 200 μm, and the distance LXbe can be set to 3810 μm. That is, the difference between distance LXbe and the distance LXbs can be set to 3610 μm.

A distance in the x-axis direction between the end portion 51 (side surface SC1) on the rotation axis AX1 side of the upper electrode 21 and the rotation axis AX1 is set to a distance LXts. Further, a distance in the x-axis direction between the end portion 52 (side surface SC2) on the opposite side of the rotation axis AX1 side of the upper electrode 21 and the rotation axis AX1 is set to a distance LXte. In this case, the distance LXts can be set to 590 μm, and the distance LXte can be set to 4200 µm. That is, the difference between distance LXte and the distance LXts can be set to 3610 µm.

In the acceleration sensor 1 according to Embodiment 1, when the gravitational acceleration GR is applied in the −z-axis direction, the movable electrode 31 is configured to detect acceleration which is applied separately from the gravitational acceleration GR and which includes fine vibration components, with high accuracy. The movable electrode 31 has a sufficiently large mass such that the force applied to the movable electrode 31 due to the acceleration is sufficiently large. If the above-mentioned acceleration including fine vibration components is applied to the movable electrode 31, the force applied to the movable electrode 31 by the acceleration acts on the movable electrode 31 as the torque about the rotation axis AX1, and rotates and displaces the movable electrode 31 about the rotation axis AX1.

A non-parallel plate capacitor is made of the movable electrode 31 and the lower electrode 11, with the space 13 interposed therebetween. As illustrated in FIG. 7, when the movable electrode 31 is rotated and displaced in the clockwise direction as viewed from the negative side to the positive side of the y-axis direction, the capacitance Cb between the movable electrode 31 and the lower electrode 11 is increased. When the movable electrode 31 is rotated and displaced in the counterclockwise direction as viewed from the negative side to the positive side of the y-axis direction, the capacitance Cb between the movable electrode 31 and the lower electrode 11 is decreased.

A non-parallel plate capacitor is made of the movable electrode 31 and the upper electrode 21, with the space 23 interposed therebetween. As illustrated in FIG. 7, when the movable electrode 31 is rotated and displaced in the clockwise direction as viewed from the negative side to the positive side of the y-axis direction, the capacitance Ct between the movable electrode 31 and the upper electrode 21 is decreased, in contrast to the capacitance Cb between the movable electrode 31 and the lower electrode 11. Meanwhile, when the movable electrode 31 is rotated and displaced in the counter clockwise direction as viewed from the negative side to the positive side of the y-axis direction, the capacitance Ct between the movable electrode 31 and the upper electrode 21 is increased, in contrast to the capacitance Cb between the movable electrode 31 and the lower electrode 11.

In a case where the vibration acceleration in the vertical direction smaller than the gravitational acceleration GR is input to the acceleration sensor 1 of Embodiment 1, the movable electrode 31 vibrates in the rotation displacement direction. Therefore, the capacitance value of the capacitance Cb and the capacitance value of the capacitance Ct have opposite phases to each other. Therefore, the acceleration sensor 1 detects acceleration vibration in a vertical direction smaller than the gravity, based on the output ΔC calculated by the capacitance difference between the capacitance Cb detected by the detection circuit and the capacitance Ct detected by the detection circuit, that is, ΔC=Cb−Ct. That is, the acceleration sensor 1 detects acceleration, based on the capacitance Cb and the capacitance Ct.

<Regarding Effects of Gravitational Acceleration at Stationary Position>

Next, the effects of gravitational acceleration at a stationary position will be described, with reference to FIG. 8 to FIG. 15, while comparing with Comparative example 1.

FIG. 8 is a cross-sectional view of the acceleration sensor of Comparative example 1. FIG. 9 to FIG. 11 are plan views of the acceleration sensor of Comparative example 1. FIG. 12 is a cross-sectional view of the acceleration sensor of Comparative example 1.

FIG. 8 and FIG. 12 are cross-sectional views taken along line B-B of FIG. 9. FIG. 8 illustrates a state where the gravitational acceleration GR is not applied in the z-axis direction, FIG. 12 illustrates a state where the gravitational acceleration GR is applied in the −z-axis direction. That is, FIG. 12 illustrates a state in which the movable electrode 31 is rotationally displaced about the rotation axis AX 1 by the gravitational acceleration GR.

As illustrated in FIG. 8, the acceleration sensor 101 of Comparative example 1 includes a base layer BL, a membrane layer ML, and a cap layer CL, similar to the acceleration sensor 1 of Embodiment 1. The base layer BL include a base substrate 10, a lower electrode 11, gap adjusting films 12a and 12b, and a space 13. The cap layer CL includes a cap substrate 20, an upper electrode 21, gap adjusting films 22a and 22b, and a space 23. The membrane layer ML includes a movable electrode 31, torsion springs 32a and 32b, a fixed portion 33, and a frame 34.

As illustrated in FIG. 11, the movable electrode 31 included in the membrane layer ML is made of a single crystal silicon substrate with low resistance, and has, for example, a rectangular shape, as viewed from the z-axis direction, similar to the movable electrode 31 of the acceleration sensor 1 of Embodiment 1. The planar dimension of the movable electrode 31 as viewed from the z-axis direction can be set to 4.0 mm (x-axis direction)×3.5 mm (y-axis direction). Further, the thickness of the movable electrode 31 in the z-axis direction can be set to 0.25 mm.

The gap length GAPb is the thickness in the z-axis direction of the space 13 located between the movable electrode 31 and the lower electrode 11, and is the distance in the z-axis direction between the movable electrode 31 and the lower electrode 11. Further, similar to Embodiment 1, even in Comparative example 1, the thickness in the z-axis direction of the space 13 at the center position of the lower electrode 11 in the x-axis direction is defined as a gap length GAPb.

The gap length GAPt is the thickness in the z-axis direction of the space 23 located between the movable electrode 31 and the upper electrode 21, and is the distance in the z-axis direction between the movable electrode 31 and the upper electrode 21. Further, similar to Embodiment 1, even in Comparative example 1, the thickness in the z-axis direction of the space 23 at the center position of the upper electrode 21 in the x-axis direction is defined as a gap length GAPt.

The lower electrode 11 and the upper electrode 21 are disposed at positions facing each other with the movable electrode 31 interposed therebetween, as illustrated in FIG. 8 to FIG. 11.

A distance in the x-axis direction between the end portion 41 (side surface SB1) on the rotation axis AX1 side of the lower electrode 11 and the rotation axis AX1 is set to a distance LXbs. Further, a distance in the x-axis direction between the end portion 42 (side surface SB2) on the opposite side of the rotation axis AX1 side of the lower electrode 11 and the rotation axis AX1 is set to a distance LXbe. In this case, in Comparative example 1, the distance LXbs can be set to 200 µm, and the distance LXbe can be set to 4200 µm.

A distance in the x-axis direction between the end portion 51 (side surface SC1) on the rotation axis AX1 side of the upper electrode 21 and the rotation axis AX1 is set to a distance LXts. Further, a distance in the x-axis direction between the end portion 52 (side surface SC2) on the opposite side of the rotation axis AX1 side of the upper electrode 21 and the rotation axis AX1 is set to a distance LXte. In this case, the distance LXts is set to 200 µm, which is equal to the distance LXbs, and the distance LXte is set to 4200 µm, which is equal to the distance LXbe.

In the acceleration sensor 101 of Comparative example 1, similar to the acceleration sensor 1 of Embodiment 1, the mass of the movable electrode 31 and the spring constant of the torsion springs 32a and 32b are set such that in a state where the gravitational acceleration is applied, the end portion 62 on the opposite side of the fixed portion 33 side of the movable electrode 31 is moved by 2 µm to the negative side in the z-axis direction, compared to a state where the gravitational acceleration is not applied.

In the acceleration sensor 101 of Comparative example 1, the thickness of the gap adjusting films 12a and 12b is equal to the thickness of the gap adjusting films 22a and 22b. Therefore, the distance LZb in the z-axis direction between the lower end of the end portion 61 on the rotation axis AX1 side of the movable electrode 31 and the upper surface of the lower electrode 11 is equal to the distance LZt in the z-axis direction between the upper end of the end portion 61 on the rotation axis AX1 side of the movable electrode 31 and the lower surface of the upper electrode 21.

In Comparative example 1, any one of the distance LZb and the distance LZt is set to 5 µm, and the gap length GAPt and the gap length GAPb when the gravitational acceleration is applied in the −z-axis direction are respectively set to 6 µm and 4 µm.

FIG. 13 is a graph illustrating gap length dependence of a capacitance between the movable electrode and the lower electrode, and a capacitance between the movable electrode and the upper electrode, in Comparative example 1. The horizontal axis of FIG. 13 indicates a change amount ΔGAPb of the gap length GAPb when the gravitational acceleration GR is applied in the −z-axis direction and the movable electrode 31 is not vibrating, that is, in the stationary state where the gravitational acceleration GR is applied, with the gap length GAPb as a reference. Further, the horizontal axis of FIG. 13 indicates a change amount ΔGAPt of the gap length GAPt when the gravitational acceleration GR is applied in the −z-axis direction and the movable electrode 31 is not vibrating, that is, in the stationary state where the gravitational acceleration GR is applied, with the gap length GAPt as a reference.

In other words, the change amount ΔGAPb is the shift amount of the gap length GAPb when the movable electrode 31 is rotationally displaced about the rotation axis AX1, from the stationary state where the gravitational acceleration GR is applied. Further, the change amount ΔGAPt is the shift amount of the gap length GAPt when the movable electrode 31 is rotationally displaced about the rotation axis AX1, from the stationary state where the gravitational acceleration GR is applied.

In FIG. 13, the dependence of the change amount ΔGAPb of the capacitance Cb (in FIG. 13, expressed as capacitance Cb with gravity) in a state where the gravitational acceleration GR applied is indicated by a solid line, and the dependence of the change amount ΔGAPt of the capacitance Ct (in FIG. 13, expressed as capacitance Ct with gravity) is indicated by a one-dot chain line.

Further, in FIG. 13, the dependence of the change amount ΔGAPb of the capacitance Cb and the dependence of the change amount ΔGAPt of the capacitance Ct in a state where the gravitational acceleration is not applied are indicated by a a broken line (in FIG. 13, expressed as capacitance Cb and Ct without gravity). In a case where the gravitational acceleration is not applied, as illustrated in FIG. 8, since the movable electrode 31 is stationary at an intermediate position between the lower electrode 11 and the upper electrode 21, the dependence of the change amount ΔGAPb of the capacitance Cb and the dependence of the change amount ΔGAPt of the capacitance Ct match.

In a case where the gravitational acceleration is applied in the vertical direction (−z-axis direction), when viewed from the negative side to the positive side of the y-axis direction as illustrated in FIG. 12, the movable electrode 31 is rotationally displaced clockwise, the gap length GAPb decreases by about 1 µm, and the gap length GAPt increases by about 1 µm. Therefore, in a case of ΔGAPb=ΔGAPt=0, that is, in the stationary state where the gravitational acceleration GR is applied, the capacitance value of the capacitance Cb is different from the capacitance value of the capacitance Ct.

As described above, the acceleration sensor detects acceleration, based on the capacitance difference between the capacitance value of the capacitance Cb and the capacitance value of the capacitance Ct. That is, the output ΔC of the acceleration sensor is the capacitance difference between the capacitance value of the capacitance Cb and the capacitance value of the capacitance Ct, and acceleration is detected, based on the output ΔC. Therefore, in the capacitance difference between the capacitance value of the capacitance Ct and the capacitance value of the capacitance Cb, it is desired that the capacitance value of the capacitance Ct corresponding to the gravitational acceleration GR and the capacitance value of the capacitance Cb corresponding to the gravitational acceleration GR are cancelled. That is, when the movable electrode 31 is in a stationary state in a state where the gravitational acceleration GR is applied, and a vibration acceleration in the vertical direction smaller than the gravitational acceleration GR is not applied, it is desirable that the capacitance value of the capacitance Cb corresponding to the gravitational acceleration GR is equal to the capacitance value of the capacitance Ct corresponding to the gravitational acceleration GR.

Here, when the movable electrode 31 is in a stationary state in a state where the gravitational acceleration GR is applied, and a vibration acceleration in the vertical direction smaller than the gravitational acceleration GR is not applied, if the capacitance value of the capacitance Cb and the capacitance value of the capacitance Ct are not canceled, the accuracy of detecting the vibration acceleration in the vertical direction smaller than the gravitational acceleration GR significantly decreases.

For example, a case is considered in which the capacitance value of the capacitance Cb and the capacitance value of the capacitance Ct are different by the capacitance value corresponding to the gravitational acceleration GR, when the movable electrode 31 is in a stationary state in a state where the gravitational acceleration GR is applied, and a vibration acceleration in the vertical direction smaller than the gravitational acceleration GR is not applied. In such a case, when the vibration of an amplitude corresponding to the acceleration of one-thousandth of the gravitational acceleration GR, that is, GR/1000, with 1% measurement accuracy, since it is necessary to separate (1+1/1000−1/100000) GR and (1+1/1000+1/100000) GR from each other, as a detector, a detector with six-digit measurement accuracy is required.

In contrast, a case is considered in which the capacitance value of the capacitance Cb and the capacitance value of the capacitance Ct are equal, when the movable electrode 31 is in a stationary state in a state where the gravitational acceleration GR is applied, and a vibration acceleration in the vertical direction smaller than the gravitational acceleration GR is not applied. That is, a case is considered in which the capacitance value of the capacitance Ct and the capacitance value of the capacitance Cb are cancelled. In such a case, when the vibration of an amplitude corresponding to the acceleration of one-thousandth of the gravitational acceleration GR, that is, GR/1000, with 1% measurement accuracy, it is sufficient to use a detector with three-digit measurement accuracy, in order to separate (0+1/1000−1/100000) GR and (0+1/1000+1/100000) GR from each other, as detectors.

That is, as a capacitance difference between the capacitance value of the capacitance Cb and the capacitance value of the capacitance Ct increases in the stationary state where the gravitational acceleration is applied, it is necessary to increase the dynamic range of the acceleration sensor, and there is a possibility that the power consumption of the detection circuit of the acceleration sensor increases. On the other hand, in a case where it is not possible to increase the dynamic range, there is a possibility that the acceleration measurement accuracy of the acceleration sensor is degraded, or the sensitivity of the acceleration is degraded.

Here, according to the technique described in PTL 2 above, as a method for solving the above-mentioned problems of an increase in power consumption or a decrease in measurement accuracy or sensitivity, a method of moving the rotation axis AX1 of the movable electrode 31 in the +z-axis direction is considered. However, that fact the problem cannot be solved by this method will be described below while comparing it with Comparative example 2.

FIG. 14 is a cross-sectional view of the acceleration sensor of Comparative example 2.

As illustrated in FIG. 14, the acceleration sensor 201 of Comparative example 2 includes a base layer BL, a membrane layer ML, and a cap layer CL, similar to the acceleration sensor 1 of Embodiment 1. The base layer BL include a base substrate 10, a lower electrode 11, gap adjusting films 12a and 12b (see FIG. 2), and a space 13. The cap layer CL includes a cap substrate 20, an upper electrode 21, gap adjusting films 22a and 22b (see FIG. 2), and a space 23. The membrane layer ML includes a movable electrode 31, torsion springs 32a and 32b, a fixed portion 33 (see FIG. 2), and a frame 34.

In the acceleration sensor 201 of Comparative example 2, the thickness of the gap adjusting film 12a is greater than the thickness of the gap adjusting film 22a. Therefore, the distance LZb in the z-axis direction between the lower end of the end portion 61 on the rotation axis AX1 side of the movable electrode 31 and the upper surface of the lower electrode 11 is longer than the distance LZt in the z-axis direction between the upper end of the end portion 61 on the rotation axis AX1 side of the movable electrode 31 and the lower surface of the upper electrode 21.

Similar to Embodiment 1, even in Comparative example 2, the distance in the z-axis direction between the movable electrode 31 and the lower electrode 11 at the center position of the lower electrode 11 in the x-axis direction is defined as a gap length GAPb. Similar to Embodiment 1, even in Comparative example 2, the distance in the z-axis direction between the movable electrode 31 and the upper electrode 21 at the center position of the upper electrode 21 in the x-axis direction is defined as a gap length GAPt.

In Comparative example 2, the thickness of the gap adjusting film 12a is made greater than the thickness of the gap adjusting film 22a, for example, by 2 µm. In this case, the distance LZb is 6 µm, the distance LZt is 4 µm, and the gap length GAPt and the gap length GAPb are equal when the gravitational acceleration GR in the −z-axis direction is applied.

The inventors of the present invention have examined in detail the dependence of the rotation angle θ of the capacitance value of the capacitance Cb between the movable electrode 31 and the lower electrode 11, and the capacitance value of electro capacitance Ct between the movable electrode 31 and the upper electrode 21, when the rotation angle of the movable electrode 31 is defined as the rotation angle θ, in the acceleration sensor 201 of Comparative example 2. As a result, it is found that the capacitance value of the capacitance Ct and the capacitance value of the capacitance Cb satisfy the following Equations (1) to (5).

[Expression 1]

$$Cb = \frac{\varepsilon(Sb)\ln(1 + \gamma_b)}{\{(LXbe) - (LXbs)\}\tan\theta} \qquad (1)$$

$$Ct = \frac{\varepsilon(Sc)\ln(1 + \gamma_t)}{\{(LXte) - (LXts)\}\tan\theta} \qquad (2)$$

Here,

[Expression 2]

$$\gamma_b = \frac{\{(LXbe) - (LXbs)\}\tan\theta}{(LZb) - (LXbe)\tan\theta} \qquad (3)$$

$$\gamma_t = \frac{\{(LXte) - (LXts)\}\tan\theta}{(LZt) + (LXts)\tan\theta} \qquad (4)$$

Further,

[Expression 3]

$$\tan\theta = \frac{2(GAPt)}{(LXts) + (LXte)} = \frac{2(GAPb)}{(LXbs) + (LXbe)} \qquad (5)$$

Furthermore, ε is the dielectric constant of gas occupying the spaces 13 and 23, Sb is the effective electrode area corresponding to the capacitance Cb, and Sc is the effective electrode area corresponding to the capacitance Ct. In Comparative example 2, the area of the lower electrode 11 is smaller than the area of the movable electrode 31, and the area of the upper electrode 21 is smaller than the area of the movable electrode 31. Therefore, the effective electrode area corresponding to the capacitance Cb is the area of the lower electrode 11, and the effective electrode area corresponding to the capacitance Ct is the area of the upper electrode 21.

In Equations (1) to (5), when the rotation angle θ approaches 0, the capacitance value of the capacitance Cb expressed in Equation (1) and the capacitance value of the capacitance Ct expressed in Equation (2) asymptotically approaches Equations (1) and (2) of PTL 2 above. Therefore, Equation (1) to Equation (5) in the present specification can be regarded as equations in which the tilting of the movable electrode is considered.

FIG. 15 is a graph illustrating gap length dependence of a capacitance between the movable electrode and the lower electrode, and a capacitance between the movable electrode and the upper electrode, in Comparative example 2. Similar to the horizontal axis of FIG. 13, the horizontal axis of FIG. 15 indicates the change amount ΔGAPb of the gap length GAPb and the change amount ΔGAPt of the gap length GAPt.

As illustrated in FIG. 15, in Comparative example 2, in a case of ΔGAPb=ΔGAPt=0, the capacitance value of the capacitance Cb is equal to the capacitance value of the capacitance Ct. However, in a case of ΔGAPt=ΔGAPb≠0, the capacitance value of the capacitance Cb is different from the capacitance value of the capacitance Ct. This is because in a condition of ΔGAPb=ΔGAPt=0, the first derivative Cb' of the capacitance Cb is not equal to the first derivative Ct' of the capacitance Ct, and in a condition of ΔGAPb=ΔGAPt=0, the second derivative Ct" of the capacitance Ct is not equal to the second derivative Cb" of the capacitance Cb. This is a result different from PTL 2, but as described by using Equations (1) to (5) above, and this is because the present inventors considers the tilting of the movable electrode 31, and this phenomenon is caused by the tilting of the movable electrode.

As described above, in the seismic reflection method, the acceleration sensor used for the seismic reflection method needs to detect acceleration which is applied in the vertical direction, that is, in the same direction as of the gravitational acceleration, and is smaller than gravitational acceleration. That is, in the acceleration sensor used in the seismic reflection method, it is necessary to improve the sensitivity of acceleration in the vertical direction. Therefore, in the acceleration sensor used for the seismic reflection method, the mass of the movable portion may be increased, or the spring constant of the elastic deformation portion connecting the movable portion to the fixed portion may be reduced, in order to improve the sensitivity of acceleration.

However, the movable portion having one end portion connected to the fixed portion is tilted by its own weight. The present inventors have found that in a case where acceleration smaller than the gravitational acceleration applied in the vertical direction is detected in a state where the movable electrode is inclined due to its own weight, the power consumption of the acceleration sensor increases or the linearity of the output of the acceleration sensor with respect to the applied acceleration decreases.

In the technology described in PTL 1 and PTL 2, an increase in power consumption of the acceleration sensor and a decrease in the linearity of the output of the acceleration sensor with respect to acceleration, by the movable electrode being inclined due to its own weight are not considered sufficiently.

Meanwhile, in the acceleration sensor 1 of Embodiment 1, the distance LXbs is smaller than the distance LXts, and the distance LXbe is smaller than the distance LXte.

FIG. 16 is a graph illustrating gap length dependence of a capacitance between the movable electrode and the lower electrode, and a capacitance between the movable electrode and the upper electrode, in Embodiment 1. Similar to the horizontal axis of FIG. 13, the horizontal axis of FIG. 16 indicates the change amount ΔGAPb of the gap length GAPb and the change amount ΔGAPt of the gap length GAPt.

In the acceleration sensor 1 of Embodiment 1, as described above, the distance LXbs is smaller than the distance LXts, and the distance LXbe is smaller than the distance LXte. Therefore, in a position satisfying ΔGAPb=ΔGAPt=0, that is, in the stationary position of the movable electrode 31 in a state where the gravitational acceleration GR is applied in the vertical direction (−z-axis direction), the first derivative Cb' of the capacitance Cb is equal to the first derivative Ct' of the capacitance Ct, and the second derivative Cb" of the capacitance Cb is equal to the second derivative Ct" of the capacitance Ct. Therefore, the capacitance Cb is equal to the capacitance Ct, in a wide range (less than ±1 μm) of the change amount ΔGAPb of the gap length GAPb and the change amount ΔGAPt of the gap length GAPt.

Further, as described also in PTL 2, if a difference occurs between the second derivative Cb" of the capacitance Cb and the second derivative Ct" of the capacitance Ct, the linearity of the output ΔC corresponding to the capacity difference between the capacitance Cb and the capacitance Ct of the acceleration sensor with respect to the change amount ΔGAPb and ΔGAPt may decrease.

FIG. 17 is a graph illustrating non-linearity of an output ΔC when acceleration is applied to each of the acceleration sensors of Embodiment 1, Comparative example 1, and Comparative example 2. The horizontal axis of FIG. 17 illustrates applied acceleration which is normalized by the gravitational acceleration GR. The vertical axis of FIG. 17 indicates the non-linearity of the output ΔC, when the output ΔC is taken as full scale (FS), with the gravitational acceleration as GR, in a ±0.95 GR range with the stationary position as the center (hereinafter, also referred to as "full scale (FS)±0.95 GR").

As illustrated in FIG. 17, the non-linearity of the output ΔC in Comparative example 2 is smaller than the non-linearity of the output ΔC in Comparative example 1, and the non-linearity of the output ΔC in Embodiment 1 is smaller than the non-linearity of the output ΔC in Comparative example 2. As illustrated in FIG. 17, the non-linearity at full scale (FS)±0.95 GR is 14.2% FS in Comparative example 1, 4.5% FS in Comparative example 2, and 2.2% FS in Embodiment 1, and the non-linearity in Embodiment 1 is smaller than that of both Comparative example 1 and Comparative example 2, such that the effect of Embodiment 1 is obvious.

FIG. 18 is a graph illustrating a relationship between the output ΔC and a difference (LXts−LXbs) between a distance LXts and a distance LXbs. FIG. 18 illustrates the output ΔC in a case of ignoring the fact that the movable electrode 31 is not parallel to the lower electrode 11 and the upper electrode 21, in addition to the output ΔC in Embodiment 1, as Comparative example 3. Comparative example 3 corresponds to the relationship indicated by Equation (3) of PTL 2. In the graph illustrating the non-linearity of Embodiment 1, data indicated by white circles at the left end (LXts−LXbs=0) corresponds to data of Comparative example 2.

In addition, in FIG. 18, the distance LXbe is set to 3810 μm, and the distance LXte is set to 4200 μm.

In the graph illustrating the non-linearity of Comparative example 3, since the fact that the movable electrode 31 is not parallel to the lower electrode 11 and the upper electrode 21 is ignored, even if the difference (LXts−LXbs) between the distance LXts and the distance LXbs is changed, the non-linearity of the output ΔC does not change, and it is constant. Meanwhile, in the graph illustrating the non-linearity of Embodiment 1, the non-linearity of the output ΔC can be adjusted by varying the difference (LXts−LXbs) between the distance LXts and the distance LXbs. That is, in Embodiment 1, it is obvious that there is an effect of improving the linearity of the output ΔC, by making the distance LXbs shorter to some extent than the distance LXts.

In addition, in the example illustrated in FIG. 18, when the difference (LXts−LXbs) between the distance LXts and the distance LXbs is about 550 μm, the non-linearity of the output ΔC is minimum.

In this way, the adjustment of the non-linearity of the output ΔC by adjusting the difference between the distance LXts and the distance LXbs, that the present inventors have found, is a phenomenon which became clear for the first time by considering the fact that the movable electrode 31 is not parallel to any one of the lower electrode 11 and the upper electrode 21.

In other words, the magnitude of contribution to the change of the capacitance Cb and the capacitance Ct when the movable electrode 31 is rotationally displaced about the rotation axis AX1 depends on the distance from the rotation axis AX1. The contribution of the movable electrode 31 on the opposite side of the rotation axis AX1 side, and the lower electrode 11 on the opposite side of the rotation axis AX1 side to the capacitance Cb, the first derivative Cb' of the capacitance Cb, and the second derivative Cb" of the capacitance Cb is greater, as compared to the movable electrode 31 on the rotation axis AX1 side, and the lower electrode 11 on the rotation axis AX1 side. The contribution of the movable electrode 31 on the rotation axis AX1 side, and the upper electrode 21 on the rotation axis AX1 side to the capacitance Ct, the first derivative Ct' of the capacitance Ct, and the second derivative Ct" of the capacitance Ct is greater, as compared to the movable electrode 31 on the opposite side of the rotation axis AX1 side, and the upper electrode 21 on the opposite side of the rotation axis AX1 side.

As illustrated in Comparative example 2, when the distance LXbs is equal to the distance LXts and the distance LXbe is equal to the distance LXte, the first derivative Ct' of the capacitance Ct is smaller than the first derivative Cb' of the capacitance Cb, and the second derivative Ct" of the capacitance Ct is smaller than the second derivative Cb" of the capacitance Cb.

Meanwhile, as illustrated in Embodiment 1, the distance LXbs is made smaller than the distance LXts, and the distance LXbe is made smaller than the distance LXte. In this case, the contribution of the movable electrode 31 on the opposite side of the rotation axis AX1 side to the capacitance Cb, the first derivative Cb' of the capacitance Cb, and the second derivative Cb" of the capacitance Cb decreases. Further, the contribution of the movable electrode 31 on the rotation axis AX1 side to the capacitance Ct, the first derivative Ct' of the capacitance Ct, and the second derivative Ct" of the capacitance Ct decreases. Therefore, in Embodiment 1, a difference between the first derivative Ct' and the first derivative Cb', and a difference between the second derivative Ct" and the second derivative Cb" made be smaller, as compared to Comparative example 2.

This makes it possible to improve the linearity of the output ΔC corresponding to the capacitance difference between the capacitance Cb and the capacitance Ct of the acceleration sensor, with respect to the change amount ΔGAPb and ΔGAPt. Therefore, it is possible to reduce the dynamic range of the acceleration sensor, and to reduce the power consumption of the acceleration sensor detection circuit. Alternatively, the accuracy of the acceleration measurement by the acceleration sensor can be improved, and the sensitivity of the acceleration can be improved.

In the technique described in PTL 2 above, although an example in which the distance LXbe is shorter than the distance LXte is presented, but there is no description of an example in which the distance LXbs is shorter than the distance LXts.

Main Features and Effects of this Embodiment

As described above, in the acceleration sensor 1 of Embodiment 1, the distance LXbs is smaller than the distance LXts, and the distance LXbe is smaller than the distance LXte. Thus, in the stationary position of the movable electrode 31 when the gravitational acceleration GR is applied, the first derivative Cb' of the capacitance Cb can be made equal to the first derivative Ct' of the capacitance Ct, the second derivative Cb" of the capacitance Cb can be made equal to the second derivative Ct" of the capacitance Ct, and the output ΔC that is excellent in linearity can be output. Therefore, it is possible to provide an acceleration sensor with high sensitivity, low power consumption, and high output linearity with respect to applied acceleration.

In the acceleration sensor 1 of Embodiment 1, unlike the acceleration sensor 1b of Embodiment 2 described later, the distance LZt is smaller than distance LZb. Thus, the gap length GAPb can be made equal to the gap length GAPt in the stationary position of the movable electrode 31 when the gravitational acceleration GR is applied.

In Embodiment 1, the case has been described where the movable electrode 31 which is the movable portion is rotatable and displaceable about an axis along the y-axis direction, in plan view, with respect to the fixed portion 33. However, a portion of the movable electrode 31 may be displaced at least in the z-axis direction, and the movable electrode 31 may be a so-called cantilever beam, for example, by the end portion 61 on the fixed portion 33 side of the movable electrode 31 in the x-axis direction being directly connected to the fixed portion 33.

In such as case, the distance LXbs is a distance in the x-axis direction between the end portion 41 on the fixed portion 33 side of the lower electrode 11 and the fixed portion 33, and the distance LXbe is a distance in the x-axis direction between the end portion 42 on the opposite side of the fixed portion 33 side of the lower electrode 11 and the fixed portion 33. Further, the distance LXts is a distance in the x-axis direction between the end portion 51 on the fixed portion 33 side of the upper electrode 21 and the fixed portion 33, and the distance LXte is a distance in the x-axis direction between the end portion 52 on the opposite side of the fixed portion 33 side of the upper electrode 21 and the fixed portion 33.

Modification Example of Embodiment 1

As a method of measuring the acceleration in the vertical direction with high precision, a servo control method is considered which controls the position of the movable electrode by Coulomb force generated by applying a voltage between the movable electrode and the fixed electrode. An acceleration sensor that detects acceleration by using a servo control method will be described as a modification example of Embodiment 1 below.

FIG. 19 and FIG. 20 are plan views of the acceleration sensor of a modification example of Embodiment 1.

As illustrated in FIG. 19, in the acceleration sensor 1a of the modification example of Embodiment 1, the base layer BL includes a servo control lower electrode 14 in addition to the lower electrode 11. Like the lower electrode 11 illustrated in FIG. 2, the servo control lower electrode 14 is formed, on the upper surface of the base substrate 10, that is, on the base substrate 10, in a region other than the region where the gap adjusting film 12b is formed, of the region AR1. The servo control lower electrode 14 is disposed on one side in the y-axis direction of the lower electrode 11 in plan view.

As illustrated in FIG. 20, in the acceleration sensor 1a of the modification example of Embodiment 1, the cap layer CL includes a servo control upper electrode 24 in addition to the upper electrode 21. Like the upper electrode 21 illustrated in FIG. 2, the servo control upper electrode 24 is formed, under the lower surface of the cap substrate 20, that is, under the cap substrate 20, in a region other than the region where the gap adjusting film 22b is formed, of the region AR1. The servo control upper electrode 24 is disposed on one side in the y-axis direction of the upper electrode 21 in plan view.

In addition, the structure of the acceleration sensor 1a of the modification example 1 of Embodiment 1 has the same structure as the acceleration sensor 1 of Embodiment 1, the servo control lower electrode may also be used as the lower electrode 11, and the servo control upper electrode may also be used as the upper electrode 21. Alternatively, the acceleration sensor 1a of the modification example 1 of Embodiment 1 may include a servo control movable electrode in addition to the movable electrode 31.

That is, the servo control lower electrode and the lower electrode 11 may be provided separately or integrally, and in either case, the same effect is obtained. That is, the servo control upper electrode and the upper electrode 21 may be provided separately or integrally, and in either case, the same effect is obtained. Further, the servo control movable electrode and the movable electrode 31 may be provided separately or integrally, and in either case, the same effect is obtained.

Coulomb force used in servo control is proportional to the first derivative Cb' of the capacitance Cb, and is proportional to the first derivative Ct' of the capacitance Ct. Therefore, in a case where the dependence of the change amount ΔGAPt of the first derivative Ct' is different from the dependence of the change amount ΔGAPb of the first derivative Cb', it is necessary to control the servo voltage applied to the servo control lower electrode and the servo voltage applied to the servo control upper electrode so as to have different values, which results in complicated servo control. Further, since it is necessary to determine the maximum servo voltage in accordance with the smaller one of the first derivative Cb' and the first derivative Ct', there is a possibility that the servo voltage becomes high. Accordingly, the fine vibration acceleration applied in the vertical direction (−z-axis direction) cannot be detected with high accuracy, or there is a possibility that the power consumption of the acceleration sensor increases.

Meanwhile, even in the acceleration sensor 1a of the modification example, like the acceleration sensor 1 of Embodiment 1, the distance LXbs is smaller than the distance LXts, and the distance LXbe is smaller than the distance LXte.

The gap length dependence of the capacitance value of the capacitance Cb between the movable electrode 31 and the lower electrode 11 in the acceleration sensor 1a of the modification example can be equal to the gap length dependence of the capacitance value of the capacitance Cb between the movable electrode 31 and the lower electrode 11 in Embodiment 1 illustrated in FIG. 16. The gap length dependence of the capacitance value of the capacitance Ct between the movable electrode 31 and the upper electrode 21 in the acceleration sensor 1a of the modification example can be equal to the gap length dependence of the capacitance value of the capacitance Ct between the movable electrode 31 and the upper electrode 21 in Embodiment 1 illustrated in FIG. 16.

Here, similar to the relationship of this modification example with respect to Embodiment 1, aspects in which a servo control lower electrode and a servo control upper electrode are formed in Comparative example 1 and Comparative example 2 are regarded as Comparative example 4 and Comparative example 5, respectively. For ease of understanding, the servo control lower electrode and the servo control upper electrode of Comparative example 4 and Comparative example 5 are set to have the same area as that of the lower electrode and the upper electrode of Comparative example 1 and Comparative example 2.

For example, since the absolute value of the Coulomb force generated in the lower electrode 11 and the upper electrode 21 when a servo voltage of 1 V is applied is the ratio of the capacitance value to the gap amount, it is 4.6 μN in the lower electrode 11, and 1.6 μN in the upper electrode 21 in Comparative example 4, and it is 2.9 μN in the lower electrode 11, and 2.3 μN in the upper electrode 21 in Comparative example 5.

On the other hand, in this modification example, the absolute value of the Coulomb force generated in the lower electrode 11 and the upper electrode 21 when the servo voltage of 1 V is applied is 2.5 μN in the lower electrode 11 and 2.5 μN in the upper electrode 21. In this manner, in this modification example, since for example, the Coulomb force generated in the lower electrode 11 is equal to the Coulomb force generated in the upper electrode 21 when the servo voltage of 1 V is applied, so servo control is not complicated and the servo voltage can be lowered.

That is, even in this modification example, similar to Embodiment 1, in the stationary position of the movable electrode 31 when the gravitational acceleration GR is applied, the first derivative Cb' of the capacitance Cb can be made equal to the first derivative Ct' of the capacitance Ct, and the second derivative Cb" of the capacitance Cb can be made equal to the second derivative Ct" of the capacitance Ct. Thus, the servo control is not complicated and the servo voltage can be lowered. Therefore, the fine vibration acceleration applied in the vertical direction (−z-axis direction) can be detected with high accuracy, or the power consumption of the acceleration sensor can be reduced.

Embodiment 2

Next, an acceleration sensor of Embodiment 2 will be described. In the acceleration sensor of Embodiment 2, the area of the lower electrode is smaller than the area of the upper electrode.

<Configuration of Acceleration Sensor>

FIG. 21 and FIG. 22 are cross-sectional views of the acceleration sensor of Embodiment 2. FIG. 23 and FIG. 24 are plan views of the acceleration sensor of Embodiment 2.

FIG. 21 and FIG. 22 are cross-sectional views taken along line B-B of FIG. 23 and FIG. 24. FIG. 21 illustrates a state where the gravitational acceleration is not applied in the z-axis direction, and FIG. 22 illustrates a state where the gravitational acceleration is applied in the −z-axis direction. That is, FIG. 22 illustrates a state in which the movable electrode 31 is rotationally displaced about the rotation axis AX1 by the gravitational acceleration GR.

As illustrated in FIG. 21 and FIG. 22, the acceleration sensor 1b of Embodiment 2 includes a base layer BL, a membrane layer ML, and a cap layer CL. Further, the acceleration sensor 1b of Embodiment 2 has a structure similar to that of the acceleration sensor 101 of Comparative example 1, except for the planar shapes of the lower electrode 11 and the upper electrode 21.

Similar to the acceleration sensor 1 of Embodiment 1, the acceleration sensor 1b of Embodiment 2 is also able to detect fine vibration acceleration applied in ±z-axis direction, with high accuracy, in a state where the gravitational acceleration GR (see FIG. 22) is applied in the −z-axis direction.

Even in Embodiment 2, similar to Embodiment 1, the mass of the movable electrode 31 and the spring constant of the torsion springs 32a and 32b are adjusted such that in a state where the gravitational acceleration GR is applied, the end portion 62 on the opposite side of the rotation axis AX1 side of the movable electrode 31 is moved by 2 μm to the negative side in the z-axis direction, compared to a state where the gravitational acceleration GR is not applied.

The gap length GAPb is the thickness in the z-axis direction of the space 13 located between the movable electrode 31 and the lower electrode 11, and is the distance in the z-axis direction between the movable electrode 31 and the lower electrode 11. Further, similar to Embodiment 1, even in Embodiment 2, the distance in the z-axis direction between the movable electrode 31 and the lower electrode 11 at the center position of the lower electrode 11 in the x-axis direction is defined as a gap length GAPb.

The gap length GAPt is the thickness in the z-axis direction of the space 23 located between the movable electrode 31 and the upper electrode 21. Further, similar to Embodiment 1, even in Embodiment 2, the distance in the z-axis direction between the movable electrode 31 and the upper electrode 21 at the center position of the upper electrode 21 in the x-axis direction is defined as a gap length GAPt.

In the acceleration sensor 1b of Embodiment 2, the thickness of the gap adjusting film 12a is equal to the thickness of the gap adjusting film 22a. Therefore, the distance LZb in the z-axis direction between the lower end of the end portion 61 on the rotation axis AX1 side of the movable electrode 31 and the upper surface of the lower electrode 11 is equal to the distance LZt in the z-axis direction between the upper end of the end portion 61 on the rotation axis AX1 side of the movable electrode 31 and the lower surface of the upper electrode 21.

In Embodiment 1, the gap lengths GAPb and GAPt are made to coincide in the state where the gravity GR is applied, by adjusting the distance LZb and the distance LZt by ±20% from the average value of the distance LZb and the distance LZt. In Embodiment 2, a fact that the distance LZb is equal to the distance LZt means that a difference between each of the distance LZb and the distance LZt and the average value of the distance LZb and the distance LZt is 20% or less, respectively.

In Embodiment 2, any one of the distance LZb and the distance LZt can be set to 5 μm, and the gap length GAPt and the gap length GAPb when the gravitational acceleration is applied in the −z-axis direction can respectively be set to 6 μm and 4 μm.

The lower electrode 11 and the upper electrode 21 are disposed to be parallel to each other and perpendicular to the z-axis, as illustrated in FIG. 21 to FIG. 24. In addition, the lower electrode 11 and the upper electrode 21 are disposed to face each other in the z-axis direction.

A distance in the x-axis direction between the end portion 41 (side surface SB1) on the rotation axis AX1 side of the lower electrode 11 and the rotation axis AX1 is set to a distance LXbs. Further, a distance in the x-axis direction between the end portion 42 (side surface SB2) on the opposite side of the rotation axis AX1 side of the lower electrode 11 and the rotation axis AX1 is set to a distance LXbe. In this case, the distance LXbs can be set to 200 μm, and the distance LXbe can be set to 3810 μm. That is, the difference between distance LXbe and the distance LXbs can be set to 3610 μm.

A distance in the x-axis direction between the end portion 51 (side surface SC1) on the rotation axis AX1 side of the upper electrode 21 and the rotation axis AX1 is set to a distance LXts. Further, a distance in the x-axis direction between the end portion 52 (side surface SC2) on the opposite side of the rotation axis AX1 side of the upper electrode 21 and the rotation axis AX1 is set to a distance LXte. In this case, the distance LXts can be set to 590 μm, and the distance LXte can be set to 4200 μm. That is, the difference between distance LXte and the distance LXts can be set to 3610 μm.

Meanwhile, the length LYb in the y-axis direction of the lower electrode 11 is smaller than the length LYt in the y-axis direction of the upper electrode 21. That is, the area of the lower electrode 11 is smaller than the area of the upper electrode 21. In the acceleration sensor 1b according to Embodiment 2, the length LYb and the length LYt satisfy the following Equation 6.

[Expression 4]

$$\frac{\ln(1+\gamma_b)LYb}{\ln(1+\gamma_t)LYt} = 1 \qquad (6)$$

This makes it possible to equalize the capacitance value of the capacitance Cb represented by Equation (1) and the capacitance value of the capacitance Ct represented by Equation (2).

Main Features and Effects of this Embodiment

Even in the acceleration sensor 1b of Embodiment 2, like the acceleration sensor 1 of Embodiment 1, the distance LXbs is smaller than the distance LXts, and the distance LXbe is smaller than the distance LXte.

Meanwhile, in the acceleration sensor 1b of Embodiment 2, unlike the acceleration sensor 1 of Embodiment 1, the distance LZb is equal to the distance LZt, and the length LYb is smaller than the length LYt. That is, the area of the lower electrode 11 is smaller than the area of the upper electrode 21.

In such a case, the gap length GAPb is smaller than the gap length GAPt in the stationary position of the movable electrode 31 when the gravitational acceleration GR is applied. However, in a case where Equation (1) to Equation (6) are satisfied, in the stationary position when the gravitational acceleration GR is applied, the first derivative Ct' of the capacitance Ct can be made equal to the first derivative Ct' of the capacitance Cb, the second derivative Cb" of the capacitance Cb can be made equal to the second derivative Ct" of the capacitance Ct, and the output ΔC that is excellent in linearity can be output. Therefore, even in Embodiment 2, it is possible to provide an acceleration sensor, from which the same effect as that of Embodiment 1 is achieved, and which has high sensitivity, low power consumption, and high output linearity with respect to applied acceleration.

Modification Example of Embodiment 2

In the acceleration sensor 1b of Embodiment 2, as an easy-to-understand example, all of a difference between the distance LXbe and the distance LXbs and a difference between the distance LXte and the distance LXts are set to 3610 μm. However, the distance LXbs may be shorter than the distance LXts and the distance LXbe may be shorter than the distance LXte, and it is not necessary to make the difference between the distance LXbe and the distance LXbs equal to the difference between the distance LXte and the distance LXts. Such an example in which the difference between the distance LXbe and the distance LXbs is different from the difference between the distance LXte and the distance LXts is illustrated in FIG. 25 and FIG. 26, as a modification example of Embodiment 2. FIG. 25 and FIG. 26 are plan views of the acceleration sensor of a modification example of Embodiment 2.

As illustrated in FIG. 25 and FIG. 26, in the acceleration sensor 1c of the modification example, a difference (LXbe-LXbs) between the distance LXbe and the distance LXbs is smaller than a difference (LXte-LXts) between the distance LXte and the distance LXts. Even in such as case, by setting the distance LXbs, the distance LXbe, the distance LXts, the distance LXte, the length LYb and the length LYt so as to satisfy Equation (6), the same effect as in Embodiment 2 can be obtained.

Even if the left side of Equation (6) is not equal to 1, approximately the same effect as in Embodiment 1 can be obtained. For example, in the case of the acceleration sensor 1c of the modification example, since the value on the left side is about 0.8 in a case where the gravity is not applied ($\theta=0$), if it is close to 1, that is 0.8 to 1.2, approximately the same effect as in Embodiment 1 can be obtained.

Embodiment 3

Next, an acceleration sensor of Embodiment 3 will be described. In the acceleration sensor of Embodiment 3, the movable electrode 31 includes a right movable electrode 31R and a left movable electrode 31L which are disposed on both sides with the rotation axis AX1 interposed therebetween, as seen from the z-axis direction.

<Configuration of Acceleration Sensor>

FIG. 27 and FIG. 28 are cross-sectional views of the acceleration sensor of Embodiment 3. FIG. 29 and FIG. 30 are plan views of the acceleration sensor of Embodiment 3. FIG. 31 is a cross-sectional view of the acceleration sensor of Embodiment 3.

FIG. 27 is a cross-sectional view taken along line A-A of FIG. 29 and FIG. 30, and FIG. 28 and FIG. 31 are cross-sectional views taken along line B-B of FIG. 29 and FIG. 30. FIG. 27 and FIG. 28 illustrate a state where a gravitational acceleration is not applied in the z-axis direction, and FIG. 31 illustrates a state where the gravitational acceleration GR is applied in the −z-axis direction. That is, FIG. 31 illustrates a state in which the movable electrode 31 is rotationally displaced about the rotation axis AX 1 by the gravitational acceleration GR.

As illustrated in FIG. 27 and FIG. 28, the acceleration sensor 1d of Embodiment 3 includes a base layer BL, a membrane layer ML, and a cap layer CL.

As illustrated in FIG. 27 to FIG. 29, the base layer BL includes a base substrate 10 which is a base, gap adjusting films 12a and 12b, and a space 13.

The base substrate 10 has a region AR1 which is a region of the upper surface as the main surface of the base substrate 10 and a central region on the center side of the base substrate 10, and a region AR2 which is a region of the upper surface of the base substrate 10 and is a peripheral region on the peripheral side of the base substrate 10 rather than the region AR1.

The two directions which intersect with each other, preferably are perpendicular to each other, in plan view, are set to the x-axis direction and the y-axis direction, and a direction perpendicular to the main surface of the base substrate 10 is set to the z-axis direction.

The gap adjusting film 12a is formed, on the upper surface of the base substrate 10, that is, on the base substrate 10, in the region AR2. Further, the gap adjusting film 12b is formed in the same layer as the gap adjusting film 12a, on the upper surface of the base substrate 10, that is, on the base substrate 10, even in some regions of the region AR1.

On the other hand, the gap adjusting film 12b is not formed, on the upper surface of the base substrate 10, that is, on the base substrate 10, in a region other than the region where the gap adjusting film 12b is formed, of the region AR1. In Embodiment 3, unlike Embodiment 1, the lower electrode 11 (see FIG. 2) is not formed, in a region other than the region where the gap adjusting film 12b is formed, of the region AR1. Therefore, in the region AR1, the space 13 is formed on the base substrate 10. That is, the gap adjusting film 12b is used for forming the space 13 on the base substrate 10. The space 13 is filled with gas having sufficiently lower pressure than the atmospheric pressure.

As illustrated in FIG. 27, FIG. 28, and FIG. 30, the cap layer CL includes a cap substrate 20 which is a base, an upper left electrode 21L, an upper right electrode 21R, gap adjusting films 22a and 22b, and a space 23.

The region AR1 is a region of the lower surface as the main surface of the cap substrate 20, and is also the region of a central region on the center side of the cap substrate 20. Further, the region AR2 is a region of the lower surface of the cap substrate 20, and is also the region of a peripheral region on the peripheral side of the cap substrate 20 rather than the region AR1. Further, the x-axis direction and the y-axis direction are two directions which intersect with each other, preferably are perpendicular to each other, in the lower surface as the main surface of the cap substrate 20, and the z-axis direction is a direction perpendicular to the main surface of the cap substrate 20.

The gap adjusting film 22a is formed, under the lower surface of the cap substrate 20, that is, under the cap substrate 20, in the region AR2. Further, a gap adjusting film 22b is formed in the same layer as the gap adjusting film 22a, under the lower surface of the cap substrate 20, that is, under the cap substrate 20, in some regions of the region AR1.

On the other hand, the gap adjusting film 22b is not formed but rather the upper left electrode 21L is formed, under the lower surface of the cap substrate 20, that is, under the cap substrate 20, in a region on one side (left side in FIG. 27) in the x-axis direction rather than the region where the gap adjusting film 22b is formed, of the region AR1. The upper left electrode 21L is disposed on one side (left side in FIG. 27) of the gap adjusting film 22b in the x-axis direction, in plan view, in the region AR1. The upper left electrode 21L is disposed to face the upper surface of the left movable electrode 31L which is the movable portion.

On the other hand, the gap adjusting film 22b is not formed but rather the upper right electrode 21R is formed, under the lower surface of the cap substrate 20, that is, under the cap substrate 20, in a region on the other side (right side in FIG. 27) in the x-axis direction rather than the region where the gap adjusting film 22b is formed, of the region AR1. The upper right electrode 21R is disposed on the opposite side (right side in FIG. 27) of the upper left electrode 21L with the gap adjusting film 22b interposed therebetween, in the region AR1, in plan view. The upper right electrode 21R is disposed to face the upper surface of the right movable electrode 31R which is the movable portion.

The thickness of the gap adjusting films 22a and 22b is greater than the thickness of the upper left electrode 21L and the upper right electrode 21R. Therefore, a space 23 is formed under the upper left electrode 21L, the upper right electrode 21R, and the cap substrate 20, in the region AR1. That is, the gap adjusting films 22a and 22b are used for forming the space 23 under the upper left electrode 21L and the upper right electrode 21R. The space 23 is filled with gas having sufficiently lower pressure than the atmospheric pressure.

The cap substrate 20 is made of a single crystal silicon substrate and a silicon oxide film (not illustrated) formed on the surface of the single crystal silicon substrate. The upper left electrode 21L and the upper right electrode 21R are electrically insulated from the single crystal silicon substrate of the cap substrate 20, through the silicon oxide film. In addition, each of the upper left electrode 21L and the upper right electrode 21R is electrically connected to, for example, a detection circuit through an electrical connection line (not illustrated). In addition, the base substrate 10 is also made of a single crystal silicon substrate.

As illustrated in FIG. 27, FIG. 28, and FIG. 30, the membrane layer ML includes a movable electrode 31 which is a movable portion, torsion springs 32a and 32b, a fixed portion 33, and a frame 34. All of the movable electrode 31, the torsion springs 32a and 32b, the fixed portion 33, and the frame 34 are made of a single crystal silicon substrate with low resistance, and they are formed by etching the single crystal silicon substrate using DRIE, for example, in a thickness direction (z-axis direction) to form a hole penetrating the single crystal silicon substrate. Incidentally, a space 35 is formed between an outer surface of the movable electrode 31 and the inner surface of the frame 34.

The fixed portion 33 is sandwiched between the gap adjusting film 12b and the gap adjusting film 22b, as illustrated in FIG. 27. The lower end of the fixed portion 33 is mechanically connected to the gap adjusting film 12b, and the upper end of the fixed portion 33 is mechanically connected to the gap adjusting film 22b. Since the gap adjusting film 12b is mechanically connected to the base substrate 10, the fixed portion 33 is mechanically fixed to the base substrate 10 after all. That is, the fixed portion 33 is fixed on the upper surface which is the main surface of the base substrate 10. Further, since the gap adjusting film 22b is mechanically connected to the cap substrate 20, the fixed portion 33 is mechanically fixed to the cap substrate 20 after all. The fixed portion 33 is electrically connected to, for example, a detection circuit through an electrical connection line (not illustrated).

The torsion spring 32a extends in the y-axis direction, the end portion 36a on one side in the y-axis direction of the torsion spring 32a is connected to the fixed portion 33, and the end portion 37a on the other side in the y-axis direction of the torsion spring 32a is connected to the movable electrode 31. Further, the torsion springs 32b extends in the y-axis direction, the end portion 36b of one side in the y-axis direction of the torsion spring 32b is connected to the fixed portion 33, and the end portion 37b on the other side in the y-axis direction of the torsion spring 32b is connected to the movable electrode 31.

The torsion spring 32a is provided such that the end portion 37a is rotatable and displaceable about the rotation axis AX1 along the y-axis direction, with respect to the end portion 36a, by the torsion spring 32a being elastically deformed, and the end portion 37a being twisted with respect to the end portion 36a. The torsion spring 32b is provided such that the end portion 37b is rotatable and displaceable about the same rotation axis AX1 as the rotation axis AX1 of the torsion spring 32a, with respect to the end portion 36b, by the torsion spring 32b being elastically deformed, and the end portion 37b being twisted with respect to the end portion 36b. Therefore, each of the torsion springs 32a and 32b is an elastic deformation portion.

As illustrated in FIG. 27 to FIG. 31, the movable electrode 31 includes a left movable electrode 31L, a right movable electrode 31R, and connecting portions 38a and 38b.

The left movable electrode 31L is disposed on one side (left side in FIG. 27) of the fixed portion 33 in the x-axis direction, in plan view, in the region AR1. Further, the right movable electrode 31R is disposed on the other side (right side in FIG. 27) of the fixed portion 33 in the x-axis direction, in plan view, in the region AR1. That is, the right movable electrode 31R is disposed on the opposite side of the left movable electrode 31L with the fixed portion 33 interposed therebetween, in plan view.

The end portion 61L on the rotation axis AX1 side of the left movable electrode 31L and the end portion 61R on the rotation axis AX1 side of the right movable electrode 31R are connected by the connecting portion 38a and the connecting portion 38b which are provided apart from each other in the y-axis direction. The torsion spring 32a that is rotatable and displaceable about the rotation axis AX1 extending in the y-axis direction is connected to the connecting portion 38a, and the torsion spring 32b that is rotatable and displaceable about the rotation axis AX1 extending in the y-axis direction is connected to the connecting portion 38b. Therefore, the end portion 61L on the fixed portion 33 side of the left movable electrode 31L is connected to the fixed portion 33 through the connecting portion 38a and the connecting portion 38b, and the end portion 61R on the fixed portion 33 side of the right movable electrode 31R is connected to the fixed portion 33 through the connecting portion 38a and the connecting portion 38b. Further, the left movable electrode 31L and the right movable electrode 31R which are connected by the connecting portion 38a and the connecting portion 38b are integrally rotatable and displaceable about the rotation axis AX1 of the torsion springs 32a and 32b, with respect to the fixed portion 33.

Any one of the left movable electrode 31L and the right movable electrode 31R has, for example, a rectangular shape, as viewed from the z-axis direction. That is, the left movable electrode 31L includes, for example, a side surface SM1L and a side surface SM2L perpendicular to the x-axis direction, and a side surface SM3L and a side surface SM4L perpendicular to the y-axis direction, and the right movable electrode 31R includes, for example, a side surface SM1R and a side surface SM2R perpendicular to the x-axis direction, and a side surface SM3R and a side surface SM4R perpendicular to the y-axis direction.

The side surface SM1L is an end portion 61L on the rotation axis AX1 side of the left movable electrode 31L, and the side surface SM2L is an end portion 62L on the opposite side of the rotation axis AX1 side of the left movable electrode 31L. Further, the side surface SM3L is the end portion 63L on the negative side in the y-axis direction of the left movable electrode 31L, and the side surface SM4L is the end portion 64L on the positive side in the y-axis direction of the left movable electrode 31L.

The side surface SM1R is an end portion 61R on the rotation axis AX1 side of the right movable electrode 31R, and the side surface SM2R is an end portion 62R on the opposite side of the rotation axis AX1 side of the right movable electrode 31R. Further, the side surface SM3R is the end portion 63R on the negative side in the y-axis direction of the right movable electrode 31R, and the side surface SM4R is the end portion 64R on the positive side in the y-axis direction of the right movable electrode 31R.

As an example, the planar dimension of the left movable electrode 31L as viewed from the z-axis direction can be set to 4.0 mm (x-axis direction)×3.9 mm (y-axis direction), and the planar dimension of the right movable electrode 31R as viewed from the z-axis direction can be set to 4.0 mm (x-axis direction)×3.9 mm (y-axis direction).

Since the torsion spring 32a is connected to the connecting portion 38a and the torsion spring 32b is connected to the connecting portion 38b, the left movable electrode 31L and the right movable electrode 31R can be rotated about the rotation axis AX1 like a seesaw.

A distance in the x-axis direction between the end portion 61L (side surface SM1L) on the rotation axis AX1 side of the left movable electrode 31L and the rotation axis AX1 is set to a distance LXLms, and a distance in the x-axis direction between the end portion 62L (side surface SM2L) on the opposite side of the rotation axis AX1 side of the left movable electrode 31L and the rotation axis AX1 is set to a distance LXLme. Further, a distance in the x-axis direction between the end portion 61R (side surface SM1R) on the rotation axis AX1 side of the right movable electrode 31R and the rotation axis AX1 is set to a distance LXRms, and a distance in the x-axis direction between the end portion 62R (side surface SM2R) on the opposite side of the rotation axis AX1 side of the right movable electrode 31R and the rotation axis AX1 is set to a distance LXRme.

Specifically, the distance LXLms can be set to 200 μm, and the distance LXLme can be set to 4200 μm. In addition, the distance LXRms can be set to 200 μm, and the distance LXRme can be set to 4200 μm.

As illustrated in FIG. 30, the left movable electrode 31L and the right movable electrode 31R have the same planar shape as viewed from the z-axis direction. However, as illustrated in FIG. 27 and FIG. 28, the thickness in the z-axis direction of the left movable electrode 31L is smaller than the thickness in the z-axis direction of the right movable electrode 31R. Thus, the mass MSL of the left movable electrode 31L can be made smaller than the mass MSR of the right movable electrode 31R. The thickness in the z-axis direction of the left movable electrode 31L can easily be made smaller than the thickness in the z-axis direction of the right movable electrode 31R, by forming the membrane layer ML by using, for example, a silicon on insulator (SOI) substrate.

Specifically, in Embodiment 3, since gravity is applied in the −z-axis direction, the thickness in the z-axis direction of the left movable electrode 31L can be set to, for example, half the thickness in the z-axis direction of the right movable electrode 31R, and the thickness in the z-axis direction of the left movable electrode 31L can be set to, for example, 125 μm, and the thickness in the z-axis direction of the right movable electrode 31R can be set to, for example, 250 μm. However, in a case where gravity is applied in the +z-axis direction, the thickness in the z-axis direction of the left movable electrode 31L can be set to, for example, 250 μm, and the thickness in the z-axis direction of the right movable electrode 31R can be set to, for example, 125 μm, so the same effect can be obtained.

The distance in the x-axis direction between the center of gravity GCL of the left movable electrode 31L and the rotation axis AX1 is set to the distance LXL. Further, the distance in the x-axis direction between the center of gravity GCR of the right movable electrode 31R and the rotation axis AX1 is set to the distance LXR. In Embodiment 3, in a case where the direction of gravity is the direction (−z-axis direction) from the upper left electrode 21L to the left movable electrode 31L, the product of the mass MSL and the distance LXL is smaller than the product of the mass MSR and the distance LXR. Thus, when the gravitational acceleration GR is applied in the vertical direction (−z-axis direction), the movable electrode 31 is rotated in the clockwise direction, as viewed from the negative side to the positive side of the y-axis direction. In addition, in a case where the direction of gravity is the direction (+z-axis direction) from the left movable electrode 31L to the upper left electrode 21L, the product of the mass MSL and the distance LXL is greater than the product of the mass MSR and the distance LXR.

Similar to the acceleration sensor 1 of Embodiment 1, the acceleration sensor 1d of Embodiment 3 is also able to detect fine vibration acceleration applied in ±z-axis direction, with high accuracy, in a state where the gravitational acceleration GR (see FIG. 31) is applied in the −z-axis direction.

In the acceleration sensor 1d of Embodiment 3, the mass of the left movable electrode 31L and the right movable electrode 31R, and the spring constant of the torsion springs 32a and 32b are adjusted such that in a state where the gravitational acceleration GR (see FIG. 31) is applied, the end portion 62R on the opposite side of the rotation axis AX1 side of the right movable electrode 31R is moved by 2 μm to the negative side in the z-axis direction, compared to a state where the gravitational acceleration GR is not applied.

The gap length GAPLt is the thickness in the z-axis direction of the space 23 located between the left movable electrode 31L and the upper left electrode 21L, and is the distance in the z-axis direction between the left movable electrode 31L and the upper left electrode 21L. Since the left movable electrode 31L is tilted by being rotated about the rotation axis AX1, the thickness in the z-axis direction of the space 23, that is, the distance in the z-axis direction between the left movable electrode 31L and the upper left electrode 21L varies depending on each position in the x-axis direction. Here, the thickness in the z-axis direction of the space 23 at the center position of the upper left electrode 21L in the x-axis direction is defined as a gap length GAPLt. That is, the distance in the z-axis direction between the left movable electrode 31L and the upper left electrode 21L at the center position of the upper left electrode 21L in the x-axis direction is defined as a gap length GAPLt.

The gap length GAPRt is the thickness in the z-axis direction of the space 23 located between the right movable electrode 31R and the upper right electrode 21R, and is the distance in the z-axis direction between the right movable electrode 31R and the upper right electrode 21R. Since the right movable electrode 31R is tilted by being rotated about the rotation axis AX1, the thickness in the z-axis direction of the space 23, that is, the distance in the z-axis direction between the right movable electrode 31R and the upper right electrode 21R varies depending on each position in the x-axis direction. Here, the thickness in the z-axis direction of the space 23 at the center position of the upper right electrode 21R in the x-axis direction is defined as a gap length GAPRt. That is, the distance in the z-axis direction between the right movable electrode 31R and the upper right electrode 21R at the center position of the upper right electrode 21R in the x-axis direction is defined as a gap length GAPRt.

The distance LZt which is the distance in the z-axis direction between the upper end of the end portion 61L on the rotation axis AX1 side of the left movable electrode 31L and the lower surface of the upper left electrode 21L and the distance in the z-axis direction between the upper end of the end portion 61R on the rotation axis AX1 side of the right movable electrode 31R and the lower surface of the upper right electrode 21R is adjusted, by adjusting the thickness of the gap adjusting films 22a and 22b.

In Embodiment 3, the distance LZt can be set to 5 µm, and the gap length GAPLt and the gap length GAPRt when the gravitational acceleration GR is applied can respectively be set to 4 µm and 6 µm.

The upper left electrode 21L and the upper right electrode 21R are disposed in the same layer, as illustrated in FIG. 27, FIG. 28, and FIG. 31. Further, as described above, the upper left electrode 21L is disposed to face upper surface of the left movable electrode 31L, and the upper right electrode 21R is disposed to face upper surface of the right movable electrode 31R.

A distance in the x-axis direction between the end portion 51L (side surface SC1L) on the rotation axis AX1 side of the upper left electrode 21L and the rotation axis AX1 is set to a distance LXLts. Further, a distance in the x-axis direction between the end portion 52L (side surface SC2L) on the opposite side of the rotation axis AX1 side of the upper left electrode 21L and the rotation axis AX1 is set to a distance LXLte. In this case, the distance LXLts can be set to 200 µm, and the distance LXLte can be set to 3810 µm. That is, the difference between distance LXLte and the distance LXLts can be set to 3610 µm. Further, the side surface SC3L is the end portion 53L on the negative side in the y-axis direction of the upper left electrode 21L, and the side surface SC4L is the end portion 54L on the positive side in the y-axis direction of the upper left electrode 21L.

Further, a distance in the x-axis direction between the end portion 51R (side surface SC1R) on the rotation axis AX1 side of the upper right electrode 21R and the rotation axis AX1 is set to a distance LXRts. Further, a distance in the x-axis direction between the end portion 52R (side surface SC2R) on the opposite side of the rotation axis AX1 side of the upper right electrode 21R and the rotation axis AX1 is set to a distance LXRte. In this case, the distance LXRts can be set to 590 µm, and the distance LXRte can be set to 4200 µm. That is, the difference between distance LXRte and the distance LXRts can be set to 3610 µm. Further, the side surface SC3R is the end portion 53R on the negative side in the y-axis direction of the upper right electrode 21R, and the side surface SC4R is the end portion 54R on the positive side in the y-axis direction of the upper right electrode 21R.

Meanwhile, the length LYLt in the y-axis direction of the upper left electrode 21L is smaller than the length LYRt in the y-axis direction of the upper right electrode 21R. That is, the area of the upper left electrode 21L is smaller than the area of the upper right electrode 21R. In the acceleration sensor 1d according to Embodiment 3, the length LYRt and the length LYLt satisfy the following Equation 7.

[Expression 5]

$$\frac{\ln(1+\gamma_b)LYLt}{\ln(1+\gamma_t)LYRt} = 1 \tag{7}$$

It is satisfied that
Here,

[Expression 6]

$$\gamma_L = \frac{\{(LXLte)-(LXLts)\}\tan\theta}{(LZt)-(LXLte)\tan\theta} \tag{8}$$

$$\gamma_R = \frac{\{(LXRte)-(LXRts)\}\tan\theta}{(LZt)+(LXRts)\tan\theta} \tag{9}$$

[Expression 7]

$$\tan\theta = \frac{2(GAPRt)}{(LXRts)+(LXRte)} = \frac{2(GAPLt)}{(LXLts)+(LXLte)} \tag{10}$$

This makes it possible to equalize the capacitance value of the capacitance Cb represented by Equation (1) and the capacitance value of the capacitance Ct represented by Equation (2).

In the acceleration sensor 1d according to Embodiment 3, when the gravitational acceleration GR is applied in the −z-axis direction, the movable electrode 31 including the left movable electrode 31L and the right movable electrode 31R is configured to detect acceleration which is applied separately from the gravitational acceleration GR and which includes fine vibration components, with high accuracy. The mass difference between the mass of the left movable electrode 31L and the mass of the right movable electrode 31R has a sufficiently large value such that a difference between the force applied to the left movable electrode 31L by acceleration and the force applied to the right movable electrode 31R by acceleration becomes sufficiently large. If the above-mentioned acceleration including fine vibration components is applied to the movable electrode 31, the force applied to the movable electrode 31 by the acceleration acts on the right movable electrode 31R and the left movable electrode 31L as the torque about the rotation axis AX1, and integrally rotates and displaces the right movable electrode 31R and the left movable electrode 31L about the rotation axis AX1.

A non-parallel plate capacitor is made of the left movable electrode 31L and the upper left electrode 21L, with the space 23 interposed therebetween, and a non-parallel plate capacitor is made of the right movable electrode 31R and the upper right electrode 21R, with the space 23 interposed therebetween.

As illustrated in FIG. 31, when the movable electrode 31 is rotated and displaced in the clockwise direction as viewed from the negative side to the positive side of the y-axis direction, the capacitance Cb between the left movable electrode 31L and the upper left electrode 21L is increased. Meanwhile, when the movable electrode 31 is rotated and displaced in the counter clockwise direction as viewed from the negative side to the positive side of the y-axis direction, the capacitance Cb between the left movable electrode 31L and the upper left electrode 21L is decreased.

As illustrated in FIG. 31, when the movable electrode 31 is rotated and displaced in the clockwise direction as viewed from the negative side to the positive side of the y-axis direction, the capacitance Ct between the right movable electrode 31R and the upper right electrode 21R is decreased. Meanwhile, when the movable electrode 31 is rotated and displaced in the counter clockwise direction as viewed from the negative side to the positive side of the y-axis direction, the capacitance Ct between the right movable electrode 31R and the upper right electrode 21R is increased.

The capacitance Cb of the acceleration sensor 1d of Embodiment 3 corresponds to the capacitance Cb of the acceleration sensor 1 of Embodiment 1, and the capacitance Ct of the acceleration sensor 1d of Embodiment 3 corresponds to the capacitance Ct of the acceleration sensor 1 of Embodiment 1. In other words, the acceleration sensor 1d detects acceleration vibration in a vertical direction smaller than the gravitational acceleration, based on the output ΔC calculated by the capacity difference between the capacitance Cb detected by the detection circuit and the capacitance Ct detected by the detection circuit, that is, ΔC=Cb−Ct. That is, the acceleration sensor 1d detects the acceleration, based on the capacitance Cb and the capacitance Ct.

Main Features and Effects of this Embodiment

The fact that the distance LXLts is shorter than the distance LXRts and the distance LXLte is shorter than the distance LXRte in the acceleration sensor 1d of Embodiment 3 corresponds to the fact that the distance LXbs is shorter than the distance LXts and the distance LXbe is shorter than the distance LXte in the acceleration sensor 1 of Embodiment 1. Therefore, even in Embodiment 3, it is possible to provide an acceleration sensor, from which an effect corresponding to the effect of Embodiment 1 is achieved, and which has high sensitivity, low power consumption, and high output linearity with respect to applied acceleration.

On the other hand, in the acceleration sensor 1d of Embodiment 3, the base layer BL does not include an electrode corresponding to the lower electrode 11 (see FIG. 2) of Embodiment 1. This can reduce the number of manufacturing steps of the acceleration sensor, and the manufacturing cost of the acceleration sensor.

Modification Example of Embodiment 3

In the acceleration sensor 1d of Embodiment 3, the mass MSL of the left movable electrode 31L is made smaller than the mass MSR of the right movable electrode 31R, by making the thickness in the z-axis direction of the left movable electrode 31L thinner than the thickness in the z-axis direction of the right movable electrode 31R. However, the force applied to the movable electrode 31 by the acceleration may be applied to the movable electrode 31 as a torque about the rotation axis AX1, by making the product of the mass MSL and the distance LXL smaller than the product of the mass MSR and the distance LXR. Therefore, it is not necessary to make the thickness in the z-axis direction of the left movable electrode 31L thinner than the thickness in the z-axis direction of the right movable electrode 31R. Thus, an example in which the thickness in the z-axis direction of the left movable electrode 31L is made equal to the thickness in the z-axis direction of the right movable electrode 31R, and the distance LXL is made smaller than the distance LXR is illustrated in FIG. 32, as the modification example of Embodiment 3. FIG. 32 is a plan view of the acceleration sensor of a modification example of Embodiment 3.

As illustrated in FIG. 32, in the acceleration sensor 1e of this modification example, the product of the mass MSL and the distance LXL is made smaller than the product of the mass MSR and the distance LXR, by making the distance LXL smaller than the distance LXR. Thus, the same effect as that of the acceleration sensor 1d of Embodiment 3 is achieved.

In addition, in Embodiment 3, as an easy-to-understand example, all of a difference (LXLte-LXLts) between the distance LXLte and the distance LXLts and a difference (LXRte-LXRts) between the distance LXRte and the distance LXRts are set to 3610 μm. However, the distance LXLts may be shorter than the distance LXRts and the distance LXLte may be shorter than the distance LXRte, and it is not necessary to make the difference between the distance LXLte and the distance LXLts equal to the difference between the distance LXRte and the distance LXRts. The same effect as in Embodiment 3 is obtained by setting the gap length GAPLt and GAPRt, the distance LXLts, LXLte, LXRts and LXRte, and the length LYLt and LYRt so as to satisfy Equation (7) to Equation (10), in the stationary state where the gravitational acceleration GR is applied.

Embodiment 4

Next, an acceleration sensor of Embodiment 4 will be described. In the acceleration sensor of Embodiment 4, the height of the upper surface of the lower electrode 11 on the rotation axis AX1 side is higher than the height of the upper surface of the lower electrode 11 on the opposite side of the rotation axis AX1 side, and the height of the lower surface of the upper electrode 21 on the rotation axis AX1 side is higher than the height of the lower surface of the upper electrode 21 on the opposite side of the rotation axis AX1 side.

<Configuration of Acceleration Sensor>

FIG. 33 is a cross-sectional view of an acceleration sensor of Embodiment 4. FIG. 33 is a cross-sectional view corresponding to the cross-sectional view of FIG. 7 of Embodiment 1.

As illustrated in FIG. 33, an acceleration sensor if of Embodiment 4 includes a base layer BL, a membrane layer ML, and a cap layer CL. Further, the acceleration sensor if of Embodiment 4 has a structure similar to that of the acceleration sensor 201 of Comparative example 2, except for the shapes of the spaces 13 and 23 and the length in the y-axis direction of the movable electrode 31.

That is, the acceleration sensor if also includes the base substrate 10, the fixed portion 33 (see FIG. 6) fixed on the upper surface which is the main surface of the base substrate 10, the movable electrode 31 disposed on one side of the fixed portion 33 in the x-axis direction in plan view, the lower electrode 11 disposed to face the lower surface of the movable electrode 31, and the upper electrode 21 disposed to face the upper surface of the movable electrode 31. The end portion 61 on the fixed portion 33 side of the movable electrode 31 is fixed to the fixed portion 33. Further, the movable electrode 31 is rotatable and displaceable about the rotation axis AX1 of the torsion springs 32a and 32b (see FIG. 6).

Further, in the acceleration sensor if of Embodiment 4, the length in y-axis direction of the movable electrode 31 is set to 3.1 mm, and is set to approximately the same capacitance value as that of the acceleration sensor 1 of Embodiment 1.

The lower electrode 11 includes a region 11a and a region 11b. The region 11a is a region on the rotation axis AX1 side of the lower electrode 11, that is, a region on the fixed portion 33 side. The region 11b is a region on the opposite side of the rotation axis AX1 side of the lower electrode 11, that is, a region on the opposite side of the fixed portion 33 side, and is disposed on the opposite side of the fixed portion 33 with the region 11a interposed therebetween, in plan view.

The upper electrode 21 includes a region 21a and a region 21b. The region 21a is a region on the rotation axis AX1 side of the upper electrode 21, that is, a region on the fixed portion 33 side. The region 21b is a region on the opposite side of the rotation axis AX1 side of the upper electrode 21, that is, a region on the opposite side of the fixed portion 33 side, and is disposed on the opposite side of the fixed portion 33 with the region 21a interposed therebetween, in plan view.

In this case, the height of the upper surface of the region 11a is higher than the height of the upper surface of the region 11b, and the height of the lower surface of the region 21a is higher than the height of the lower surface of the region 21b.

A distance in the z-axis direction between the lower end of the end portion 61 on the rotation axis AX1 side (the left side in FIG. 33) of the movable electrode 31 and the upper surface of the region 11a is defined as a distance LZb1. A distance in the z-axis direction between the upper end of the end portion 61 on the rotation axis AX1 side (the left side in FIG. 33) of the movable electrode 31 and the upper surface of the region 11b is defined as a distance LZb2. In this case, the distance LZb1 is shorter than the distance LZb2.

Meanwhile, a distance in the z-axis direction between the upper end of the end portion 61 on the rotation axis AX1 side (the left side in FIG. 33) of the movable electrode 31 and the lower surface of the region 21a is set to a distance LZt1. Further, a distance in the z-axis direction between the upper end of the end portion 61 on the rotation axis AX1 side (the left side in FIG. 33) of the movable electrode 31 and the upper surface of the region 21b is defined as a distance LZt2. In this case, the distance LZt1 is longer than the distance LZt2.

For example, a step with a height of 1.2 μm is formed between the region 11a and the region 11b, and a step with a height of 1.2 μm is formed between the region 21a and the region 21b.

In addition, the distance LZb1 may be defined as a distance in the z-axis direction between the rotation axis AX1 and the upper surface of the region 11a, and the distance LZb2 may be defined as a distance in the z-axis direction between the rotation axis AX1 and the upper surface of the region 11b. In addition, the distance LZt1 may be defined as a distance in the z-axis direction between the rotation axis AX1 and the lower surface of the region 21a, and the distance LZt2 may be defined as a distance in the z-axis direction between the rotation axis AX1 and the lower surface of the region 21b.

Thus, even in Embodiment 4, similar to Embodiment 1, the contribution of the movable electrode 31 on the opposite side of the rotation axis AX1 side to the capacitance Cb, the first derivative Cb' of the capacitance Cb, and the second derivative Cb'' of the capacitance Cb decreases. Further, the contribution of the movable electrode 31 on the rotation axis AX1 side to the capacitance Ct, the first derivative Ct' of the capacitance Ct, and the second derivative Ct'' of the capacitance Ct decreases. Therefore, even in Embodiment 4, a difference between the first derivative Cb' and the first derivative Ct', and a difference between the second derivative Cb'' and the second derivative Ct'' can be made smaller, as compared to Comparative example 2.

Further, a distance in the z-axis direction between the movable electrode 31 and the region 11a, at the center position of the region 11a in the x-axis direction is defined as a gap length GAPb1, and a distance in the z-axis direction between the movable electrode 31 and the region 11b, at the center position of the region 11b in the x-axis direction is defined as a gap length GAPb2. Further, a distance in the z-axis direction between the movable electrode 31 and the region 21a, at the center position of the region 21a in the x-axis direction is defined as a gap length GAPt1, and a distance in the z-axis direction between the movable electrode 31 and the region 21b, at the center position of the region 21b in the x-axis direction is defined as a gap length GAPt2.

FIG. 34 is a graph illustrating gap length dependence of a capacitance between the movable electrode and the lower electrode, and a capacitance between the movable electrode and the upper electrode, in Embodiment 4. Similar to the horizontal axis of FIG. 13, the horizontal axis of FIG. 34 indicates the change amount ΔGAPb of the gap length GAPb and the change amount ΔGAPt of the gap length GAPt.

In FIG. 34, the gap length GAPb is defined as the larger one of the gap lengths GAPb1 and GAPb2, and the gap length GAPt is defined as the larger one of the gap lengths GAPt1 and GAPt2.

In the acceleration sensor if of Embodiment 4, as described above, the distance LZb1 is shorter than the distance LZb2, and the distance LZt1 is longer than the distance LZt2. Therefore, in a position satisfying ΔGAPb=ΔGAPt=0, that is, in the stationary position of the movable electrode 31 in a state where the gravitational acceleration GR is applied in the vertical direction (−z-axis direction), the first derivative Cb' of the capacitance Cb is equal to the first derivative Ct' of the capacitance Ct, and the second derivative Cb'' of the capacitance Cb is equal to the second derivative Ct'' of the capacitance Ct. Therefore, the capacitance Cb is equal to the capacitance Ct, in a wide range (less than ±1 μm) of the change amount ΔGAPb of the gap length GAPb and the change amount ΔGAPt of the gap length GAPt. Accordingly, the acceleration sensor if of Embodiment 4 also has the same effect as the acceleration sensor 1 of Embodiment 1.

FIG. 35 is a graph illustrating non-linearity of an output ΔC when acceleration is applied to the acceleration sensor of Embodiment 4. The horizontal axis of FIG. 35 illustrates applied acceleration which is normalized by the gravitational acceleration GR. The vertical axis of FIG. 35 indicates the non-linearity of the output ΔC, when the output ΔC is taken as full scale (FS), with the gravitational acceleration as GR, in a ±0.95 GR range with the stationary position as the center.

The non-linearity of the output ΔC in Embodiment 4 illustrated in FIG. 35 is made smaller than the non-linearity of the output ΔC in either of Comparative example 1 and Comparative example 2 illustrated in FIG. 17. As illustrated in FIG. 35, the non-linearity at full scale (FS)±0.95 GR is 2.4% FS in Embodiment 4, and the non-linearity in Embodiment 4 is smaller than that of both Comparative example 1 and Comparative example 2 illustrated in FIG. 17, such that the effect of Embodiment 4 is obvious.

In addition, preferably, the distance LZb1 is longer than the distance LZt1. In this way, since each of the distance LZb1 and the distance LZb2 is longer than either of the distance LZt1 and the distance LZt2, the capacitance Cb and the capacitance Ct can be easily adjusted so as to be equal to each other, in the stationary state where the gravitational acceleration GR is applied.

FIG. 36 and FIG. 37 are plan views of the acceleration sensor of Embodiment 4.

As illustrated in FIG. 36 and FIG. 37, the length LYb in the y-axis direction of the lower electrode 11 may be smaller than the length LYt in the y-axis direction of the upper electrode 21. That is, the area of the lower electrode 11 may be smaller than the area of the upper electrode 21. Thus, in the stationary state where the gravitational acceleration GR is not applied, easy adjustment can be performed such that the capacitance Cb is equal to the capacitance Ct, the first derivative Cb' of the capacitance Cb is equal to the first derivative Ct' of the capacitance Ct, and the second derivative Cb" of the capacitance Cb is equal to the second derivative Ct" of the capacitance Ct.

In addition, as illustrated in FIG. 36 and FIG. 37, the distance LXbs can be made equal to the distance LXts, and the distance LXbe can be made equal to the distance LXte. Thus, the length in the x-axis direction of the movable electrode can be shortened and the acceleration sensor can be downsized.

In addition, a fact that the distance LXbs is equal to the distance LXts means that a difference between each of the distance LXbs and the distance LXts and the average value of the distance LXbs and the distance LXts is 20% or less, respectively. In addition, a fact that the distance LXbe is equal to the distance LXte means that a difference between each of the distance LXbe and the distance LXte and the average value of the distance LXbe and the distance LXte is 20% or less, respectively.

Main Features and Effects of this Embodiment

In the acceleration sensor if of Embodiment 4, the height of the upper surface of the lower electrode 11 on the rotation axis AX1 side is higher than the height of the upper surface of the lower electrode 11 on the opposite side of the rotation axis AX1 side, and the height of the lower surface of the upper electrode 21 on the rotation axis AX1 side is higher than the height of the lower surface of the upper electrode 21 on the opposite side of the rotation axis AX1 side. Thus, in the stationary position of the movable electrode 31 when the gravitational acceleration GR is applied, the first derivative Cb' of the capacitance Cb can be made equal to the first derivative Ct' of the capacitance Ct, the second derivative Cb" of the capacitance Cb can be made equal to the second derivative Ct" of the capacitance Ct, and the output ΔC that is excellent in linearity can be output. Therefore, it is possible to provide an acceleration sensor with high sensitivity, low power consumption, and high output linearity with respect to applied acceleration.

First Modification Example of Embodiment 4

Even in Embodiment 4, it is possible to detect acceleration by using a servo control method, as in Embodiment 1. An acceleration sensor that detects acceleration by using a servo control method will be described as a first modification example of Embodiment 4 below.

For example, since the absolute value of the Coulomb force generated in the lower electrode 11 and the upper electrode 21 when the servo voltage of 1 V is applied is the ratio of the capacitance value to the gap amount, it is 2.9 μN in the lower electrode 11, and 2.9 μN in the upper electrode 21 in this first modification example. In this manner, in this first modification example, since for example, the Coulomb force generated in the lower electrode 11 is equal to the Coulomb force generated in the upper electrode 21 when the servo voltage of 1V is applied, so servo control is not complicated and the servo voltage can be lowered.

Therefore, even in this first modification example, similar to Embodiment 4, in the stationary position of the movable electrode 31 when the gravitational acceleration GR is applied, the first derivative Cb' of the capacitance Cb can be made equal to the first derivative Ct' of the capacitance Ct, and the second derivative Cb" of the capacitance Cb can be made equal to the second derivative Ct" of the capacitance Ct. Thus, the servo control is not complicated and the servo voltage can be lowered. Therefore, the fine vibration acceleration applied in the vertical direction (−z-axis direction) can be detected with high accuracy, or the power consumption of the acceleration sensor can be reduced.

Second Modification Example of Embodiment 4

In Embodiment 4, the effective distance obtained by converting the distance LZb1 into the vacuum permittivity may be shorter than the effective distance obtained by converting the distance LZb2 into the vacuum permittivity, by forming an insulating film having a relative permittivity higher than at least the relative permittivity of air on the region 11a. Further, the effective distance obtained by converting the distance LZt1 into the vacuum permittivity may be shorter than the effective distance obtained by converting the distance LZt2 into the vacuum permittivity, by forming an insulating film having a relative permittivity higher than at least the relative permittivity of air under the region 21b. Such an example is illustrated in FIG. 38, as the second modification example of Embodiment 4. FIG. 38 is a cross-sectional view of the acceleration sensor of a second modification example of Embodiment 4. FIG. 38 is a cross-sectional view corresponding to the cross-sectional view of FIG. 33.

In the second modification example, the height of the upper surface of the region 11a is equal to the height of the upper surface of the region 11b, but a lower insulation film 15 is formed on the region 11a. Therefore, the height of the upper surface of the lower insulation film 15 formed on the region 11a is higher than the height of the upper surface of the region 11b. In the second modification example, the height of the lower surface of the region 21a is equal to the height of the lower surface of the region 21b, but an upper insulation film 25 is formed under the region 21b. Therefore, the height of the lower surface of the region 21a is higher than the height of the lower surface of the upper insulation film 25 formed under the region 21b.

In this second modification example, a distance in the z-axis direction between the lower end of the end portion 61 on the rotation axis AX1 side of the movable electrode 31 and the upper surface of the region 11a is set to a distance LZb1, and a distance in the z-axis direction between the lower end of the end portion 61 on the rotation axis AX1 side of the movable electrode 31 and the upper surface of the region 11b is set to a distance LZb2. In addition, a distance in the z-axis direction between the upper end of the end portion 61 on the rotation axis AX1 side of the movable electrode 31 and the lower surface of the region 21a is set to a distance LZt1, and a distance in the z-axis direction between the upper end of the end portion 61 on the rotation axis AX1 side of the movable electrode 31 and the lower surface of the region 21b is set to a distance LZt2.

Each of the lower insulation film 15 and the upper insulation film 25 is an insulating film having a relative permittivity higher than at least the relative permittivity of air. Further, the effective distance obtained by converting the distance LZb1 into the vacuum permittivity becomes shorter than the effective distance obtained by converting the distance LZb2 into the vacuum permittivity, by forming the lower insulation film 15 and the upper insulation film 25.

In addition, a fact that the height of the upper surface of the region 11a is equal to the height of the upper surface of the region 11b means that a difference between each of the height of the upper surface of the region 11a and the height of the upper surface of the region 11b and the average value of the height of the upper surface of the region 11a and the height of the upper surface of the region 11b is 20% or less, respectively. In addition, a fact that the height of the lower surface of the region 21a is equal to the height of the lower surface of the region 21b means that a difference between each of the height of the lower surface of the region 21a and the height of the lower surface of the region 21b and the average value of the height of the lower surface of the region 21a and the height of the lower surface of the region 21b is 20% or less, respectively.

For example, a lower insulation film 15 of thickness of 1.6 μm made of silicon oxide is formed on the region 11a, and an upper insulation film 25 of thickness of 1.6 μm made of silicon oxide is formed on the region 21b.

FIG. 39 is a graph illustrating gap length dependence of a capacitance between the movable electrode and the lower electrode, and a capacitance between the movable electrode and the upper electrode, in the second modification example of Embodiment 4. Similar to the horizontal axis of FIG. 13, the horizontal axis of FIG. 39 indicates the change amount ΔGAPb of the gap length GAPb and the change amount ΔGAPt of the gap length GAPt. The definition of the gap length GAPb and GAPt can be the same as in Embodiment 1.

In the acceleration sensor 1g of the second modification example of Embodiment 4, the effective distance obtained by converting the distance LZb1 into the vacuum permittivity is shorter than the effective distance obtained by converting the distance LZb2 into the vacuum permittivity. Further, the effective distance obtained by converting the distance LZt1 into the vacuum permittivity is longer than the effective distance obtained by converting the distance LZt2 into the vacuum permittivity. Therefore, in a position satisfying ΔGAPb=ΔGAPt=0, that is, in the stationary position of the movable electrode 31 in a state where the gravitational acceleration GR is applied in the vertical direction (−z-axis direction), the first derivative Cb' of the capacitance Cb is equal to the first derivative Ct' of the capacitance Ct, and the second derivative Cb" of the capacitance Cb is equal to the second derivative Ct" of the capacitance Ct. That is, the capacitance Cb is equal to the capacitance Ct, in a wide range (less than ±1 μm) of the change amount ΔGAPb of the gap length GAPb and the change amount ΔGAPt of the gap length GAPt. Accordingly, the acceleration sensor 1g of the second modification example of Embodiment 4 also has the same effect as the acceleration sensor if of Embodiment 4.

FIG. 40 is a graph illustrating non-linearity of an output ΔC when acceleration is applied to the acceleration sensor of the second modification example of Embodiment 4. The horizontal axis of FIG. 40 illustrates applied acceleration which is normalized by the gravitational acceleration GR. The vertical axis of FIG. 40 indicates the non-linearity of the output ΔC, when the output ΔC is taken as full scale (FS), with the gravitational acceleration as the gravitational acceleration GR, in a ±0.95 GR range with the stationary position as the center (hereinafter, also referred to as "full scale (FS)±0.95 GR").

Similar to the non-linearity of the output ΔC in Embodiment 4 illustrated in FIG. 35, the non-linearity of the output ΔC in the second modification example illustrated in FIG. 40 is made smaller than the non-linearity of the output ΔC in either of Comparative example 1 and Comparative example 2 illustrated in FIG. 17. Therefore, the effect of the second modification example is obvious, similar to the effect of Embodiment 4.

As indicated by the two-dot chain line in FIG. 38, the lower insulation film 15 may be formed on the region 11a and the region 11b, and in this case, the thickness of the portion of the lower insulation film 15 formed on the region 11a may be thicker than the thickness of the portion of the lower insulation film 15 formed on the region 11b. In addition, the upper insulation film 25 may be formed under the region 21a and the region 21b, and in this case, the thickness of the portion of the upper insulation film 25 formed under the region 21a may be thinner than the thickness of the portion of the upper insulation film 25 formed under the region 21b.

Further, the effective distance obtained by converting the distance LZb1 into the vacuum permittivity becomes shorter than the effective distance obtained by converting the distance LZb2 into the vacuum permittivity, by forming such a lower insulation film 15. Further, the effective distance obtained by converting the distance LZt1 into the vacuum permittivity becomes longer than the effective distance obtained by converting the distance LZt2 into the vacuum permittivity, by forming such an upper insulation film 25.

That is, the second modification example is configured to shorten the effective distance obtained by converting the distance between the electrode and the movable electrode into the vacuum permittivity, by forming an insulating film having a relative permittivity higher than at least the relative permittivity of air between the electrode and the movable electrode, as compared to the case where an insulating film is not formed.

Third Modification Example of Embodiment 4

Alternatively, instead of the acceleration sensor of Embodiment 4, in the acceleration sensor of Embodiment 3, the height of the lower surface of the upper left electrode 21L on the rotation axis AX1 side may be lower than the height of the lower surface of the upper left electrode 21L on the opposite side of the rotation axis AX1 side. Further, the height of the lower surface of the upper right electrode 21R on the rotation axis AX1 side may be higher than the height of the lower surface of the upper right electrode 21R on the opposite side of the rotation axis AX1 side. Such an example is illustrated in FIG. 41 and FIG. 42, as the third modification example of Embodiment 4.

FIG. 41 is a cross-sectional view of the acceleration sensor of a third modification example of Embodiment 4. FIG. 42 is a plan view of the acceleration sensor of a third modification example of Embodiment 4. FIG. 41 is a cross-sectional view taken along line B-B of FIG. 42. FIG. 41 illustrates a state where the gravitational acceleration GR is applied in the −z-axis direction. That is, FIG. 41 illustrates a state in which the movable electrode 31 is rotationally displaced about the rotation axis AX 1 by the gravitational acceleration GR.

In the acceleration sensor 1h of the third modification example, the upper left electrode 21L includes a region 21La and a region 21Lb. The region 21La is a region on the rotation axis AX1 side of the upper left electrode 21L, that is, a region on the fixed portion 33 (see FIG. 27) side. The region 21Lb is a region on the opposite side of the rotation axis AX1 side of the upper left electrode 21L, that is, a region on the opposite side of the fixed portion 33 side, and is disposed on the opposite side of the fixed portion 33 with the region 21La interposed therebetween, in plan view.

The upper right electrode 21R includes a region 21Ra and a region 21Rb. The region 21Ra is a region on the rotation axis AX1 side of the upper right electrode 21R, that is, a region on the fixed portion 33 side. The region 21Rb is a region on the opposite side of the rotation axis AX1 side of the upper right electrode 21R, that is, a region on the opposite side of the fixed portion 33 side, and is disposed on the opposite side of the fixed portion 33 with the region 21Ra interposed therebetween, in plan view.

In this case, the height of the lower surface of the region 21La is lower than the height of the lower surface of the region 21Lb, and the height of the lower surface of the region 21Ra is higher than the height of the lower surface of the region 21Rb.

A distance in the z-axis direction between the upper end of the end portion 61L (see FIG. 30) on the rotation axis AX1 side of the left movable electrode 31L and the lower surface of the region 21La is set to a distance LZLt1. In addition, a distance in the z-axis direction between the upper end of the end portion 61L (see FIG. 30) on the rotation axis AX1 side of the left movable electrode 31L and the lower surface of the region 21Lb is set to a distance LZLt2. In this case, the distance LZLt1 is shorter than the distance LZLt2.

Meanwhile, a distance in the z-axis direction between the upper end of the end portion 61R (see FIG. 30) on the rotation axis AX1 side of the right movable electrode 31R and the lower surface of the region 21Ra is set to a distance LZRt1. In addition, a distance in the z-axis direction between the upper end of the end portion 61R (see FIG. 30) on the rotation axis AX1 side of the right movable electrode 31R and the lower surface of the region 21Rb is set to a distance LZRt2. In this case, the distance LZRt1 is longer than the distance LZRt2.

In addition, the distance LZLt1 may be defined as a distance in the z-axis direction between the rotation axis AX1 and the lower surface of the region 21La, and the distance LZLt2 may be defined as a distance in the z-axis direction between the rotation axis AX1 and the lower surface of the region 21Lb. In addition, the distance LZRt1 may be defined as a distance in the z-axis direction between the rotation axis AX1 and the lower surface of the region 21Ra, and the distance LZRt2 may be defined as a distance in the z-axis direction between the rotation axis AX1 and the lower surface of the region 21Rb.

In such a case, the contribution of the region 21Lb to the first derivative Cb' of the capacitance Cb and the second derivative Cb" of the capacitance Cb becomes smaller than that of the region 21La. Further, the contribution of the region 21Rb to the first derivative Ct' of the capacitance Ct and the second derivative Ct" of the capacitance Ct becomes smaller than that of the region 21Ra. Therefore, in the stationary position of the movable electrode 31 when the gravitational acceleration GR is applied, the first derivative Cb' of the capacitance Cb can be made equal to the first derivative Ct' of the capacitance Ct, the second derivative Cb" of the capacitance Cb can be made equal to the second derivative Ct" of the capacitance Ct, and the output ΔC that is excellent in linearity can be output. Therefore, it is possible to provide an acceleration sensor with high sensitivity, low power consumption, and high output linearity with respect to applied acceleration.

In addition, even in the acceleration sensor of Embodiment 3, similar to the second modification example of Embodiment 4, the height of the lower surface of the region 21La may be made equal to the height of the lower surface of the region 21Lb, and an insulating film having a relative permittivity higher than at least the relative permittivity of air may be formed under the region 21La. Thus, the effective distance obtained by converting the distance LZLt1 into the vacuum permittivity can be made shorter than the effective distance obtained by converting the distance LZLt2 into the vacuum permittivity.

Further, the height of the lower surface of the region 21Ra may be made equal to the height of the lower surface of the region 21Rb, and an insulating film having a relative permittivity higher than at least the relative permittivity of air may be formed under the region 21Rb. Thus, the effective distance obtained by converting the distance LZRt1 into the vacuum permittivity can be made longer than the effective distance obtained by converting the distance LZRt2 into the vacuum permittivity.

Hitherto, the invention made by the present inventors has been specifically described based on the embodiments, but the present invention is not limited to the embodiments, and various modifications are possible within a scope without departing from the spirit.

INDUSTRIAL APPLICABILITY

It is effective that the present invention is applied to the acceleration sensor.

REFERENCE SIGNS LIST 1, 1a to 1h ACCELERATION SENSOR
10 BASE SUBSTRATE
11 LOWER ELECTRODE
11a, 11b, 21a, 21b REGION
12a, 12b, 22a, 22b GAP ADJUSTING FILM
13, 23, 35 SPACE
14 SERVO CONTROL LOWER ELECTRODE
15 LOWER INSULATION FILM
20 CAP SUBSTRATE
21 UPPER ELECTRODE
21L UPPER LEFT ELECTRODE
21La, 21Lb, 21Ra, 21Rb REGION
21R UPPER RIGHT ELECTRODE
24 SERVO CONTROL UPPER ELECTRODE
25 UPPER INSULATION FILM
31 MOVABLE ELECTRODE
31L LEFT MOVABLE ELECTRODE
31R RIGHT MOVABLE ELECTRODE
32a, 32b TORSION SPRING
33 FIXED PORTION
34 FRAME
36a, 36b, 37a, 37b END PORTION
38a, 38b CONNECTING PORTION
41 TO 44, 51, 51L, 51R, 52, 52L, 52R END PORTION
53, 53L, 53R, 54, 54L, 54R END PORTION
61, 61L, 61R, 62, 62L, 62R END PORTION
63, 63L, 63R, 64, 64L, 64R END PORTION
AR1, AR2 REGION
AX1 ROTATION AXIS
BL BASE LAYER
CL CAP LAYER
G1 VIBRATION SOURCE
G1a to G2e GEOPHONE
G3 SURFACE OF EARTH
G4a, G4b BOUNDARY
GAPb, GAPb1, GAPb2, GAPLt GAP LENGTH
GAPRt, GAPt, GAPt1, GAPt2 GAP LENGTH
GCL, GCR CENTER OF GRAVITY
GR GRAVITATIONAL ACCELERATION
LXbe, LXbs, LXL, LXLme, LXLms DISTANCE
LXLte, LXLts, LXme DISTANCE
LXms, LXR, LXRme, LXRms DISTANCE
LXRte, LXRts, LXte, LXts DISTANCE
LYb, LYLt, LYRt, LYt LENGTH
LZb, LZb1, LZb2, LZLt1, LZLt2 DISTANCE

LZRt1, LZRt2, LZt, LZt1, LZt2 DISTANCE
ML MEMBRANE LAYER
SB1 to SB4 SIDE SURFACE
SC1, SC1L, SC1R, SC2, SC2L, SC2R SIDE SURFACE
SC3, SC3L, SC3R, SC4, SC4L, SC4R SIDE SURFACE
SM1, SM1L, SM1R, SM2, SM2L, SM2R SIDE SURFACE
SM3, SM3L, SM3R, SM4, SM4L, SM4R SIDE SURFACE

The invention claimed is:

1. An acceleration sensor comprising:
   a substrate;
   a fixed portion fixed on a main surface of the substrate;
   a movable portion that is disposed adjacent to the fixed portion in plan view;
   a first electrode having a first end portion disposed proximate to said fixed portion and a second end portion disposed at a side opposite said fixed portion, and that is disposed to face a lower surface of the movable portion in a cross-section view; and
   a second electrode having a first end portion disposed proximate to said fixed portion and a second end portion disposed at a side opposite said fixed portion, and that is disposed to face an upper surface of the movable portion in the cross-section view,
   wherein the movable portion has a first end portion disposed at a side proximate to the fixed portion and which is connected to the fixed portion via a pair of torsion springs each of which is rotatable about a rotation axis adjacent to said movable portion;
   wherein the movable portion has a second end portion disposed at a side opposite said fixed portion in a first direction,
   wherein acceleration is detected, based on a first capacitance between the movable portion and the first electrode, and a second capacitance between the movable portion and the second electrode, and
   wherein a distance in the first direction between the first end portion of the first electrode and the rotation axis is set to a first distance, a distance in the first direction between the second end portion of the first electrode and the rotation axis is set to a second distance, a distance in the first direction between the first end portion of the second electrode and the rotation axis is set to a third distance, and a distance in the first direction between the second end portion of the second electrode and the rotation axis is set to a fourth distance, and the first distance is shorter than the third distance, and the second distance is shorter than the fourth distance.

2. The acceleration sensor according to claim 1,
   wherein a distance in a second direction perpendicular to the main surface, between a bottom surface of said movable portion and the first electrode, is set to a fifth distance, and a distance in the second direction between a top surface of said movable portion and the second electrode is set to a sixth distance, and the fifth distance is longer than the sixth distance.

3. The acceleration sensor according to claim 1,
   wherein an area of the first electrode is smaller than an area of the second electrode.

* * * * *